United States Patent [19]
Fujioka

[11] Patent Number: 5,818,643
[45] Date of Patent: Oct. 6, 1998

[54] OPTICAL OBJECTIVE LENS SYSTEM WITH VARIABLE DISK THICKNESS FEATURE

[75] Inventor: Yoshisato Fujioka, Higashi-Kurume, Japan

[73] Assignee: Mahk Co., Ltd., Tokyo, Japan

[21] Appl. No.: 740,351

[22] Filed: Nov. 8, 1996

[30] Foreign Application Priority Data

Nov. 14, 1995 [JP] Japan .................................... 7-319546
Jan. 11, 1996 [JP] Japan .................................... 8-020377
Jun. 4, 1996 [JP] Japan .................................... 8-194176

[51] Int. Cl.$^6$ ............................ G02B 27/14; G02B 27/30
[52] U.S. Cl. ........................................ 359/637; 359/641
[58] Field of Search .................................. 359/793, 637, 359/618, 641, 629, 754–786, 797, 813, 814; 369/13, 110, 112, 44.23, 44.39, 44.14, 44.17, 44.18, 44.21

[56] References Cited

U.S. PATENT DOCUMENTS

| | | | |
|---|---|---|---|
| 4,953,959 | 9/1990 | Ishiwata et al. | 350/432 |
| 5,157,555 | 10/1992 | Reno | 359/823 |
| 5,173,809 | 12/1992 | Iwaki et al. | 359/784 |
| 5,467,225 | 11/1995 | Manabe | 359/661 |
| 5,479,296 | 12/1995 | Maruyama et al. | 359/793 |
| 5,491,587 | 2/1996 | Iwaki et al. | 359/641 |
| 5,600,494 | 2/1997 | Kubo et al. | 359/719 |
| 5,629,799 | 5/1997 | Maruyama et al. | 359/565 |
| 5,644,437 | 7/1997 | Maruyama et al. | 359/793 |
| 5,657,168 | 8/1997 | Maruyama et al. | 359/719 |
| 5,657,171 | 8/1997 | Maruyama et al. | 359/793 |

FOREIGN PATENT DOCUMENTS

| | | |
|---|---|---|
| 07098431 A | 4/1995 | Japan . |
| 07153110 A | 6/1995 | Japan . |
| 07198909 | 8/1995 | Japan . |

Primary Examiner—Frank G. Font
Assistant Examiner—Michael P. Stafira
Attorney, Agent, or Firm—Spencer & Frank

[57] ABSTRACT

An objective lens system of a quite simple construction with fewer lenses cyomplying with a continuous variation in thickness of the disk. The system records and reproduces information on a high-density and mass storage optical information medium while providing excellent performance. The system comprises a single positive lens element, a positive objective lens element and a disk arranged in that sequence from the side of a light source, in which the single positive lens is moved on an optical axis to improve the aberration that has increased as a result of a variation in thickness of the disk and the objective lens is moved by a slight distance on the optical axis to be in-focus state in response to the movement of the image point resulting from the variation in the thickness of the disk.

6 Claims, 105 Drawing Sheets

FIG. 1
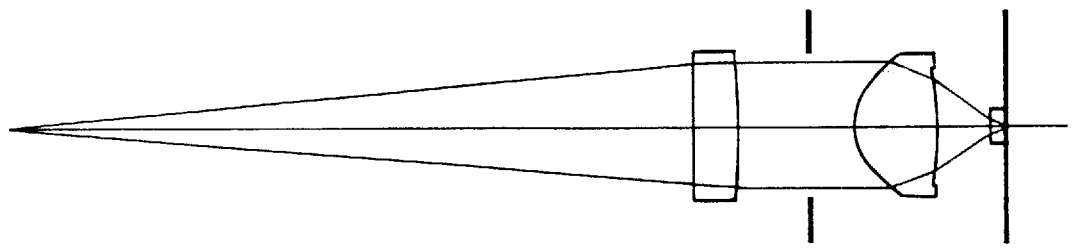
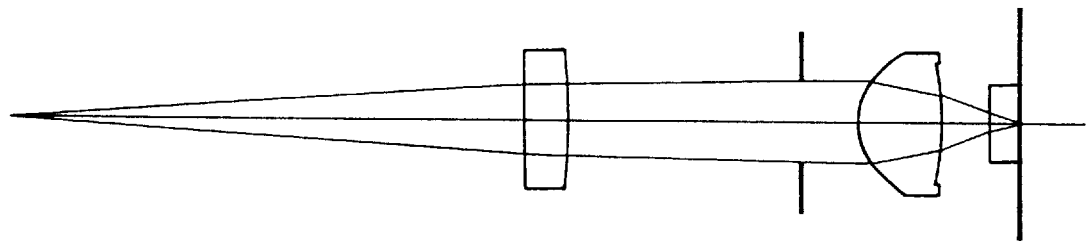

F I G. 3 A
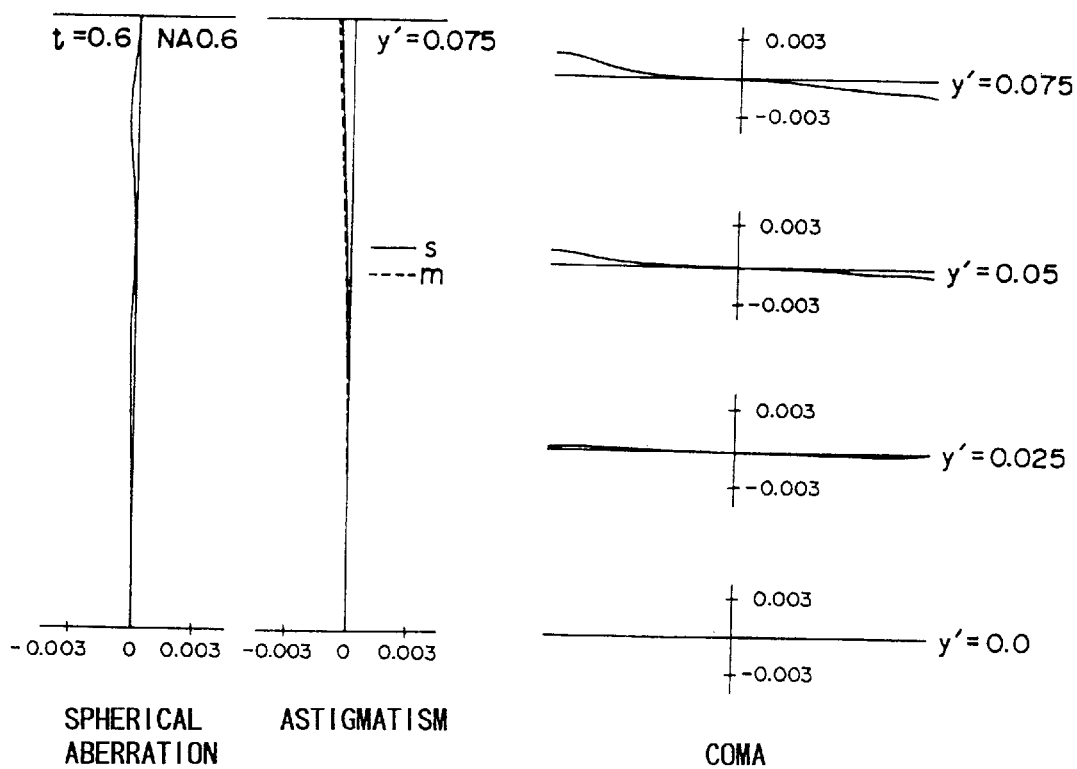

F I G. 3 B
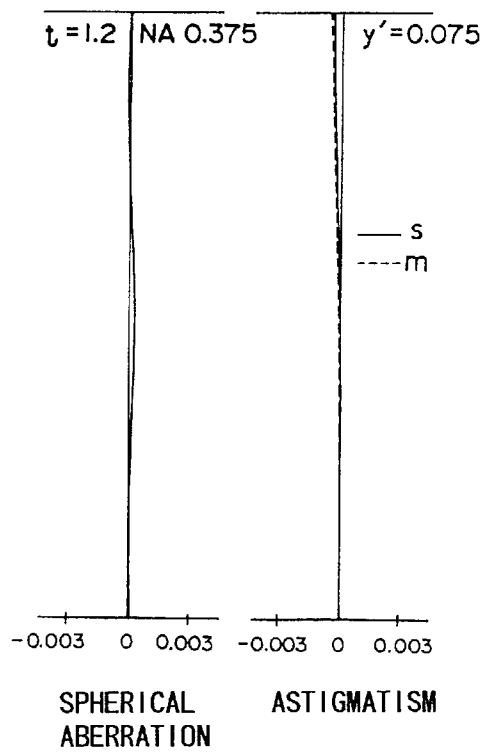
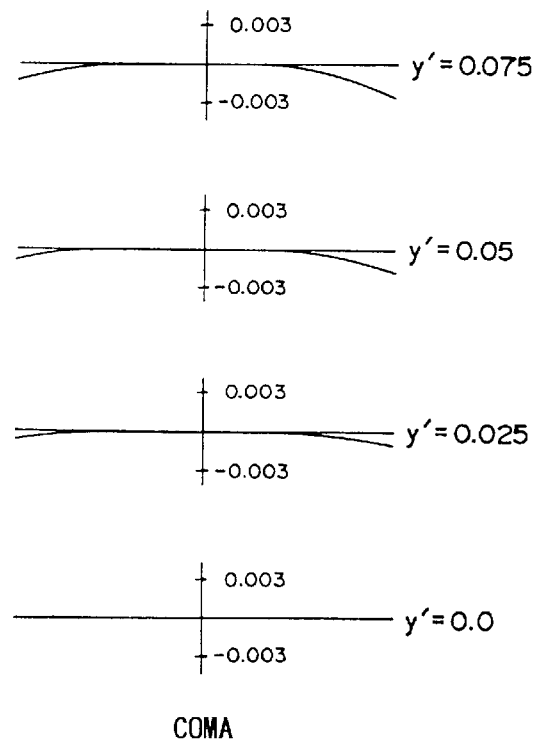

F I G. 4 A
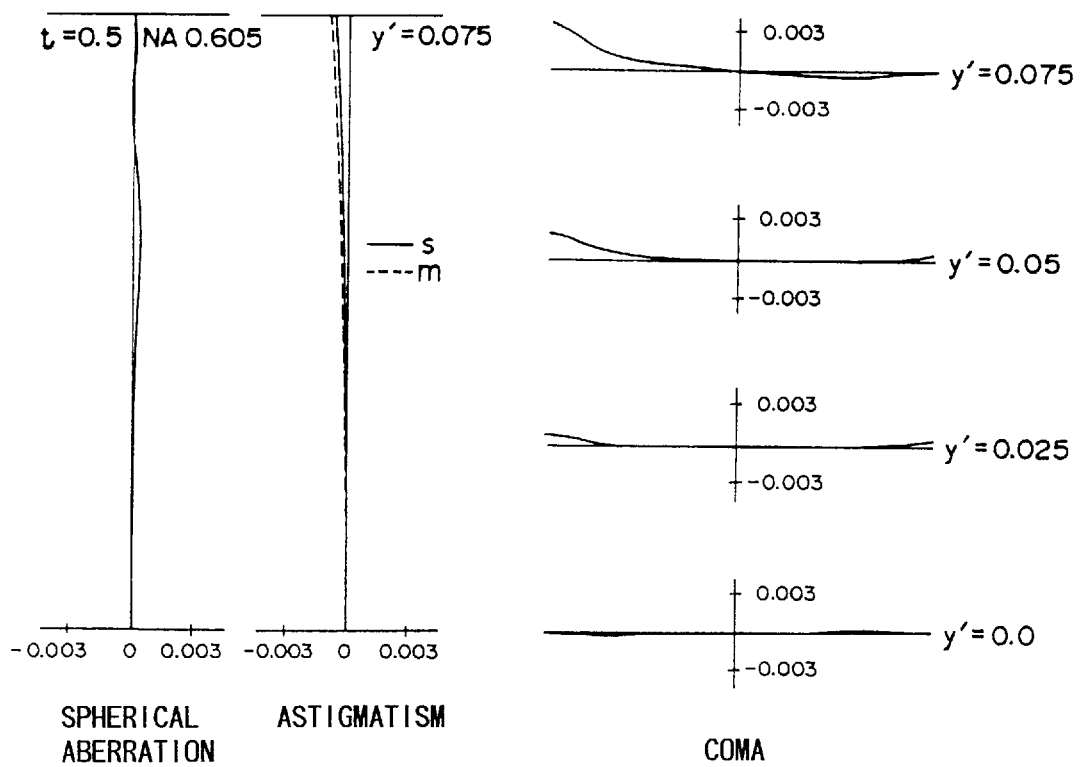

FIG. 4B
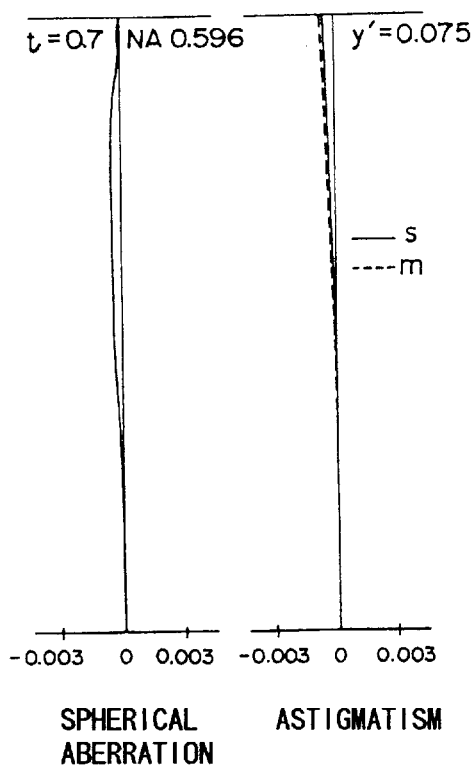
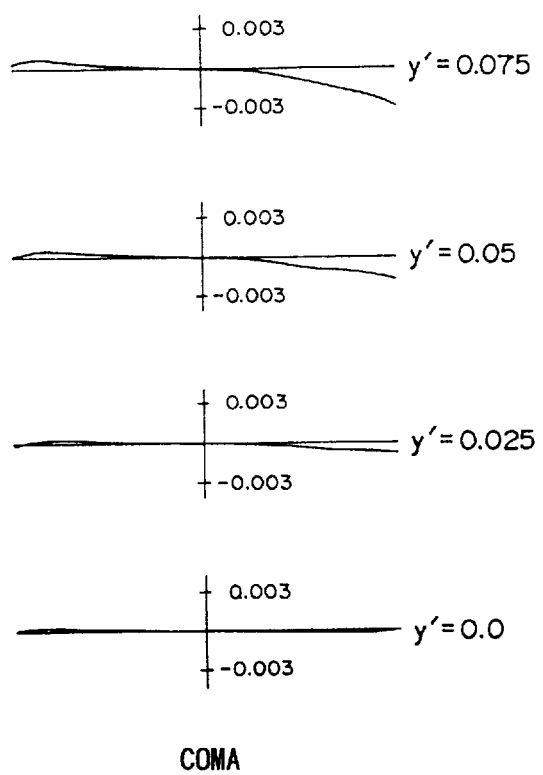

F I G. 5 B
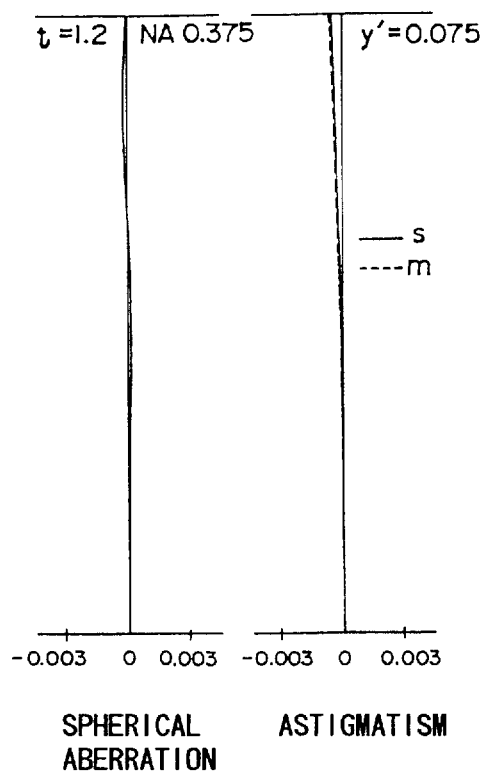
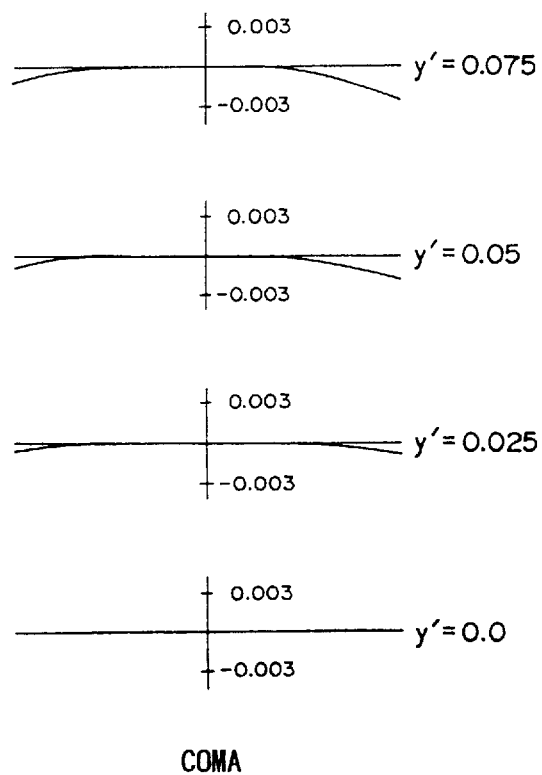

FIG. 6A
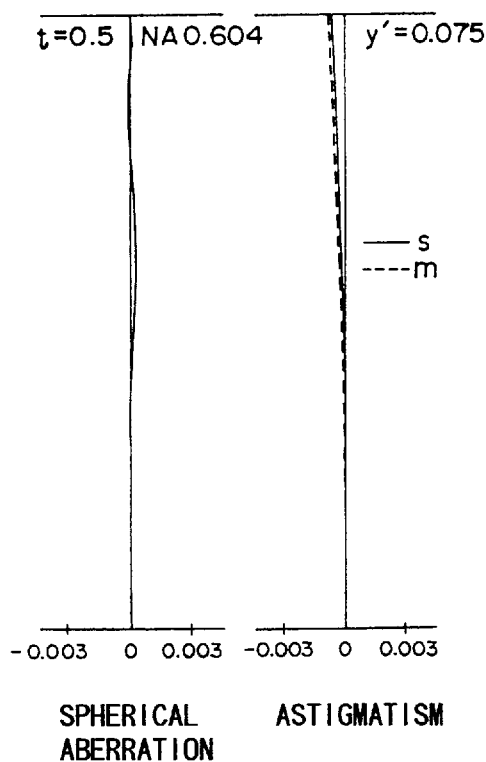
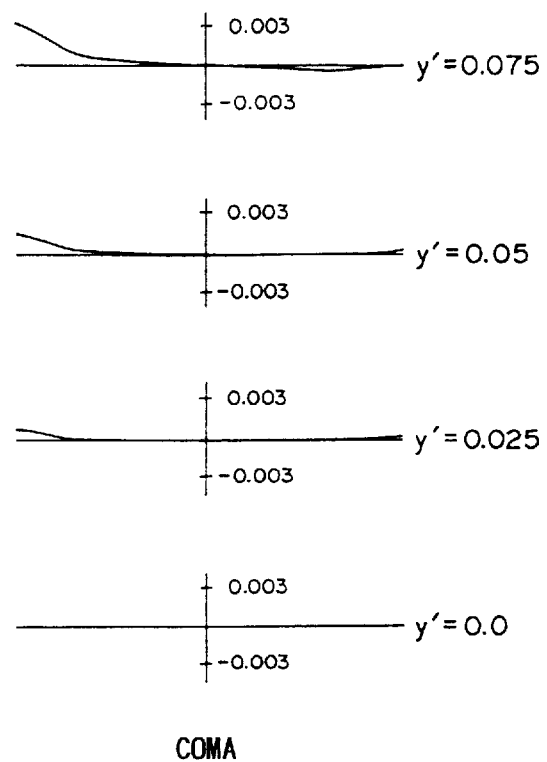

F I G. 6 B
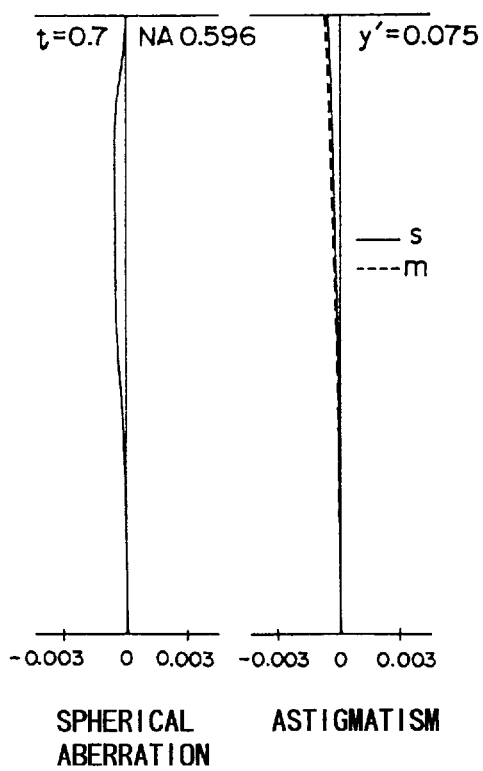
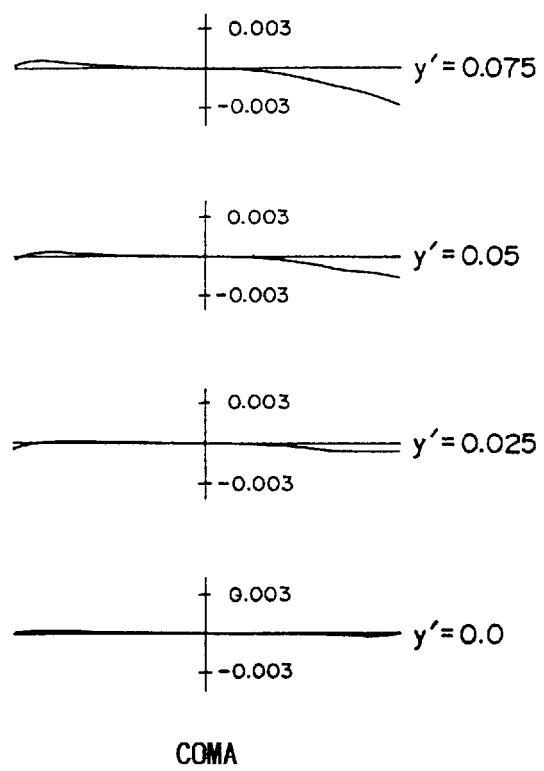

F I G. 7 A
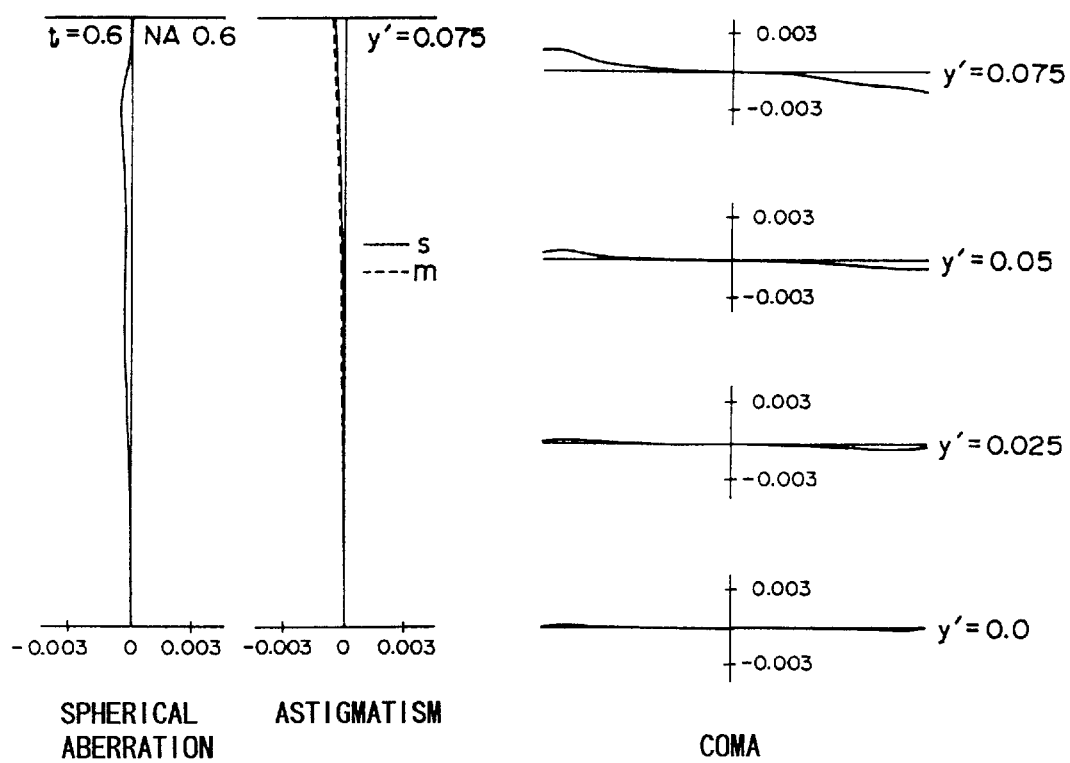

F I G. 7 B
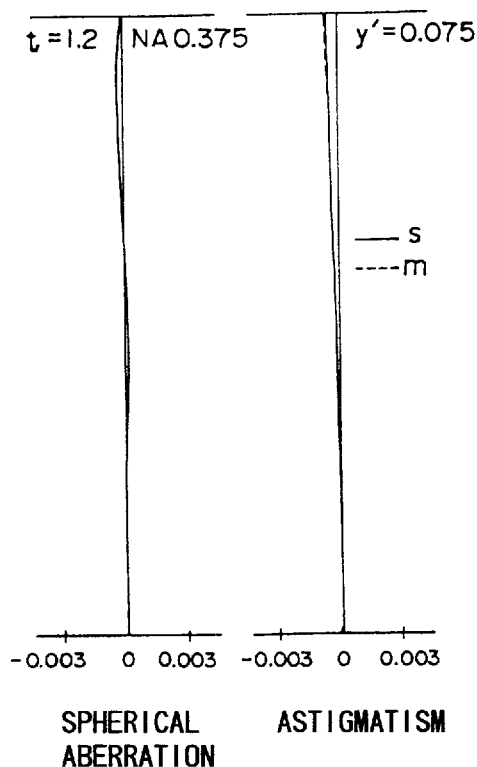
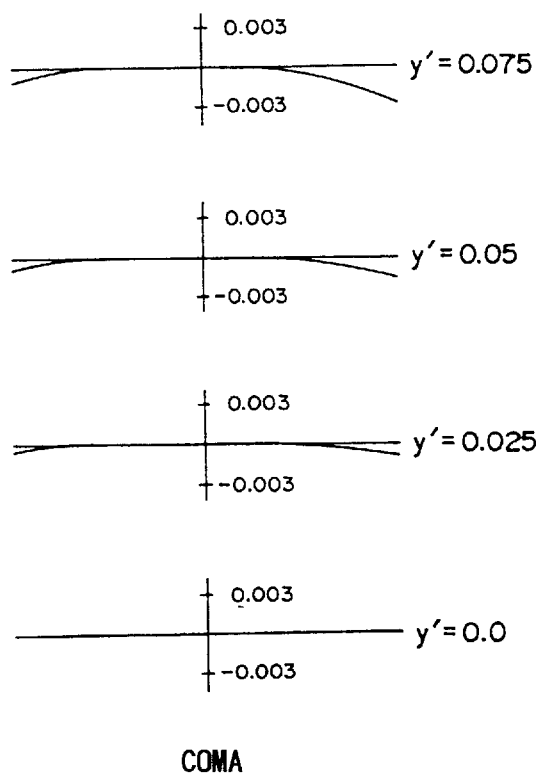
SPHERICAL ASTIGMATISM COMA
ABERRATION

FIG. 8A
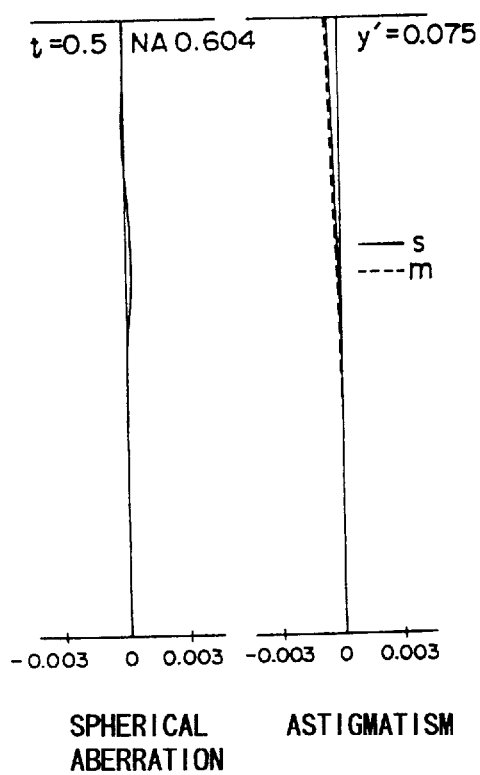
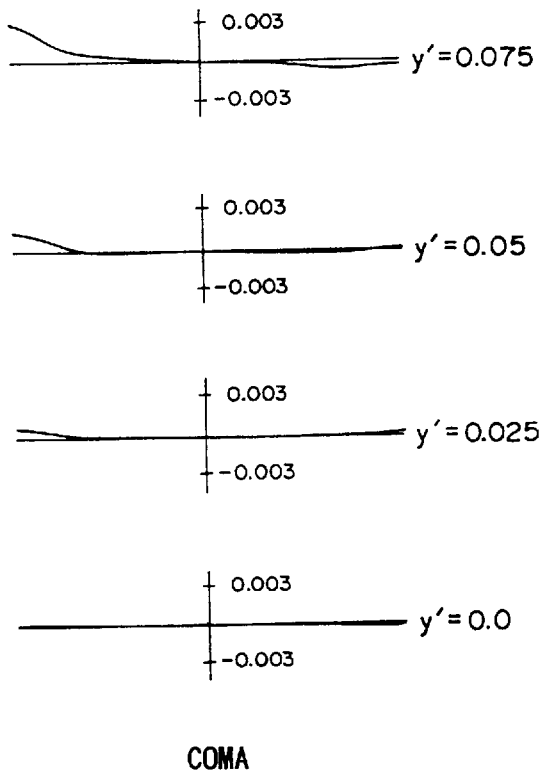
SPHERICAL   ASTIGMATISM            COMA
ABERRATION F I G. 8 B
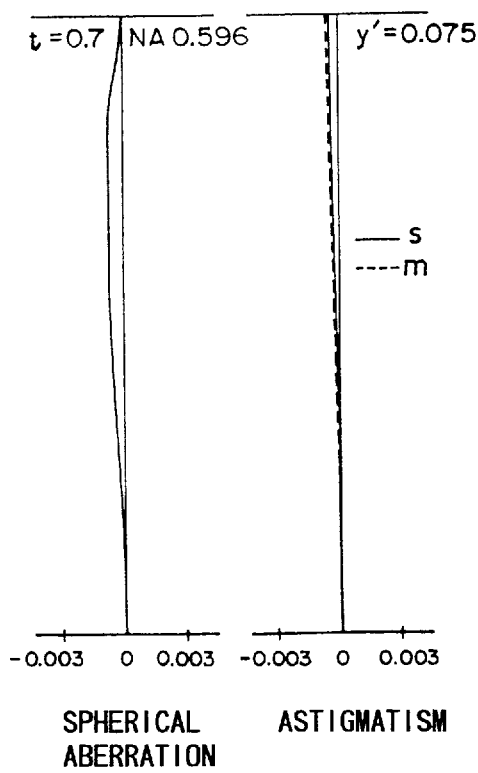
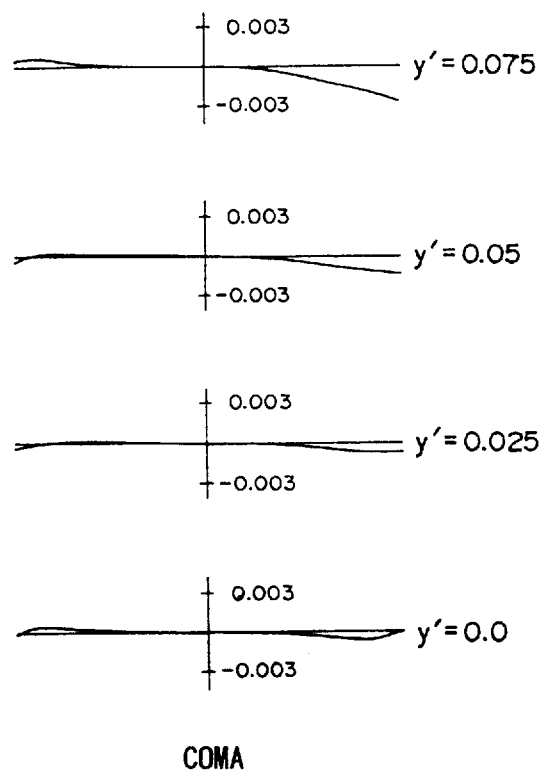

F I G. 9 A
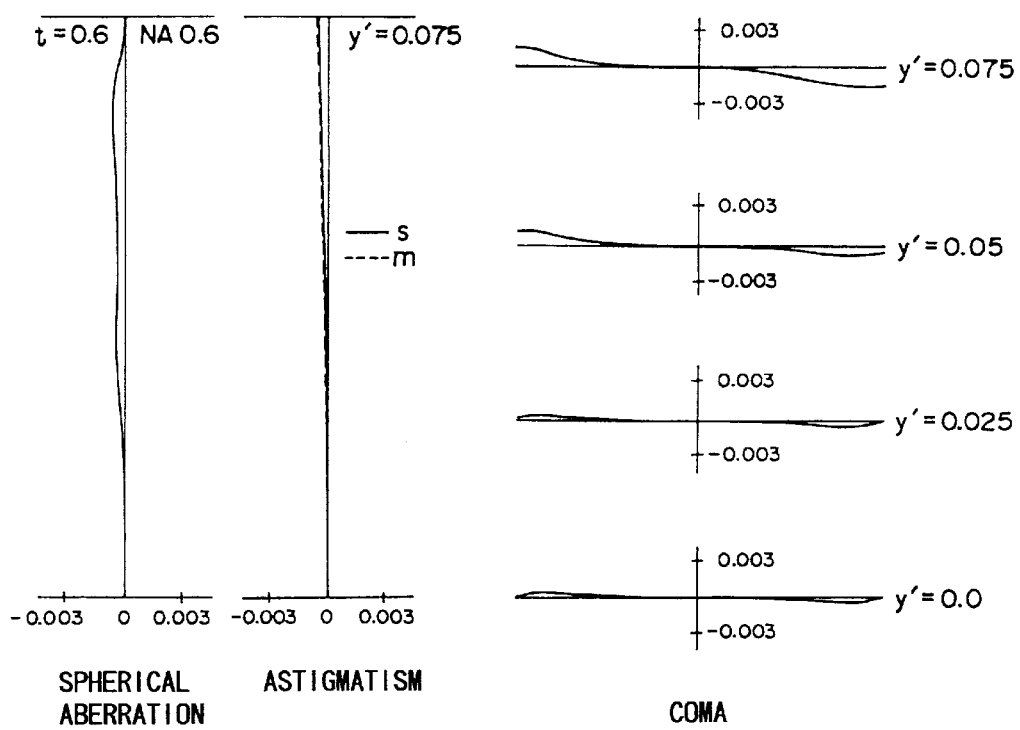

F I G. 9 B
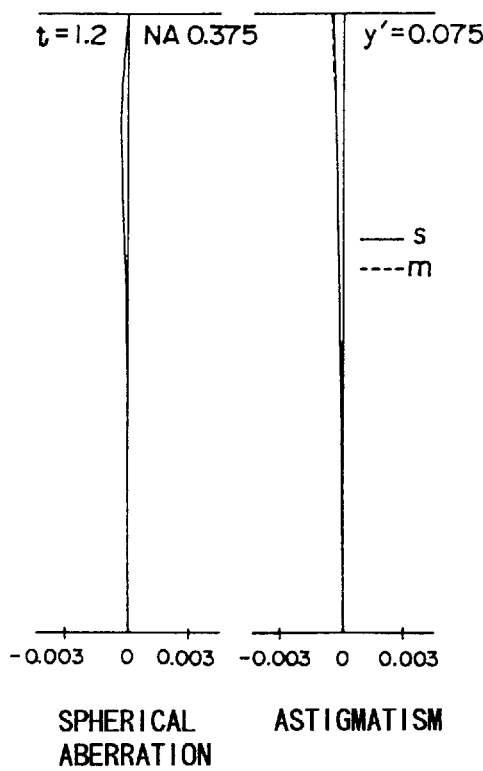
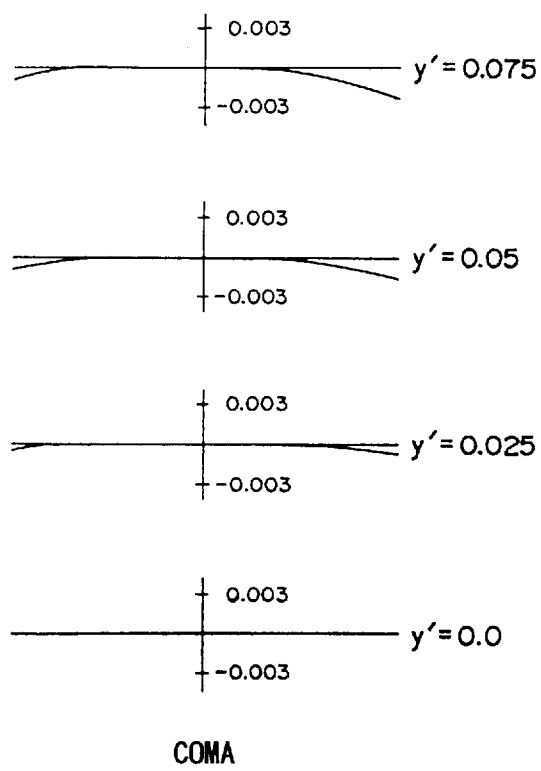

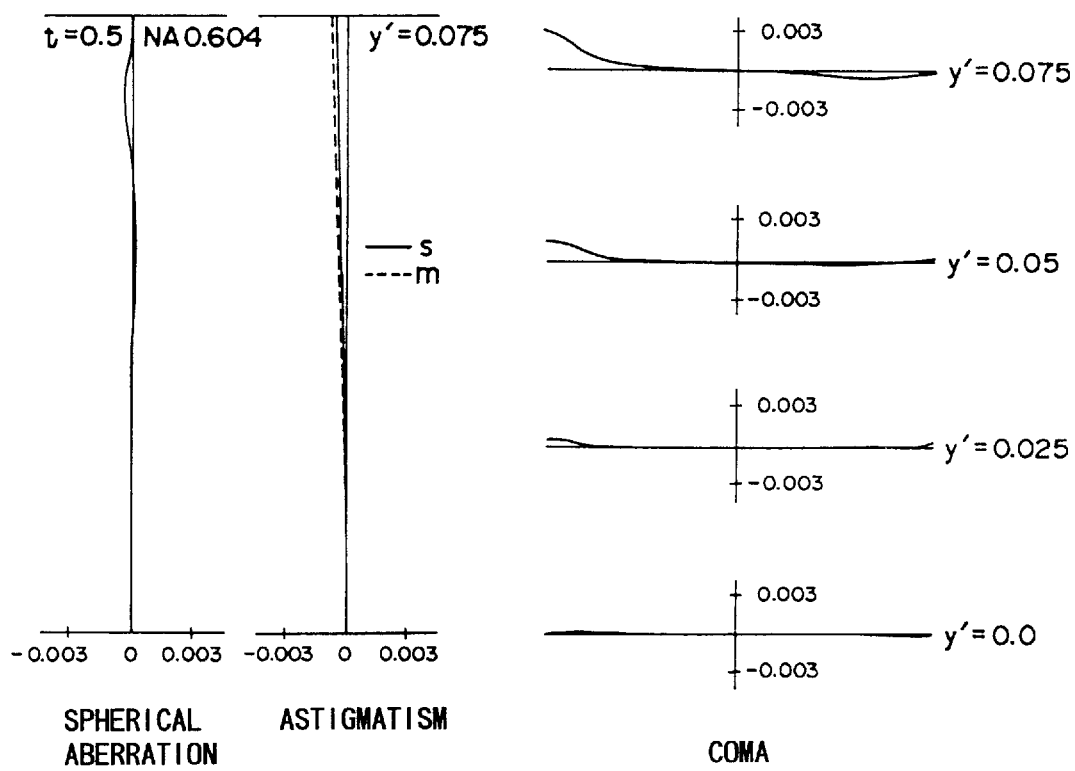
F I G. 1 0 A

F I G. 1 0 B
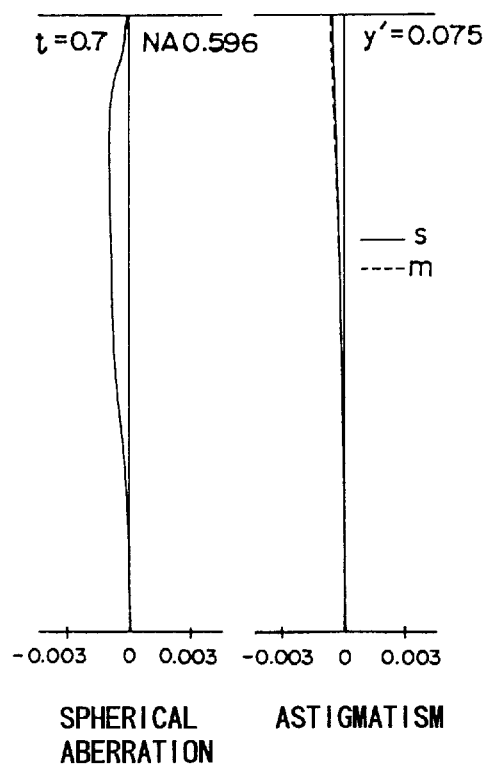
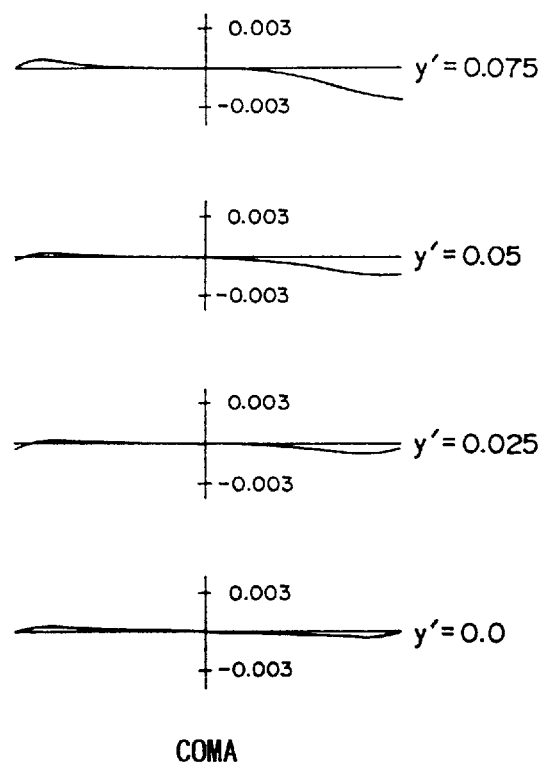

F I G. 1 1 A
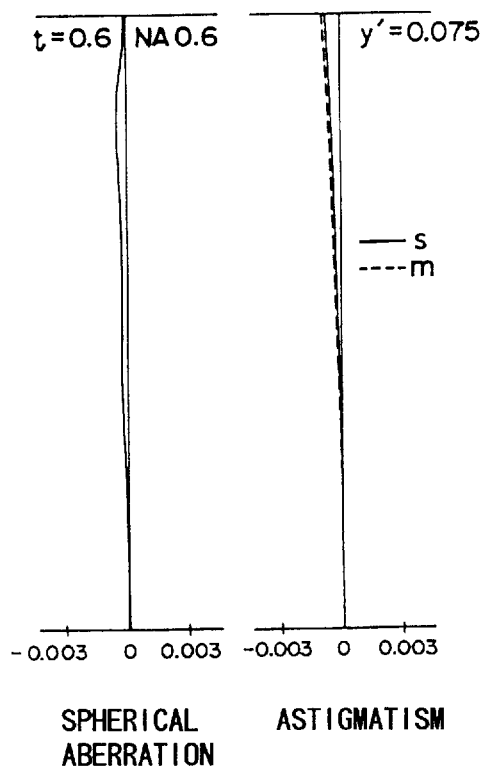
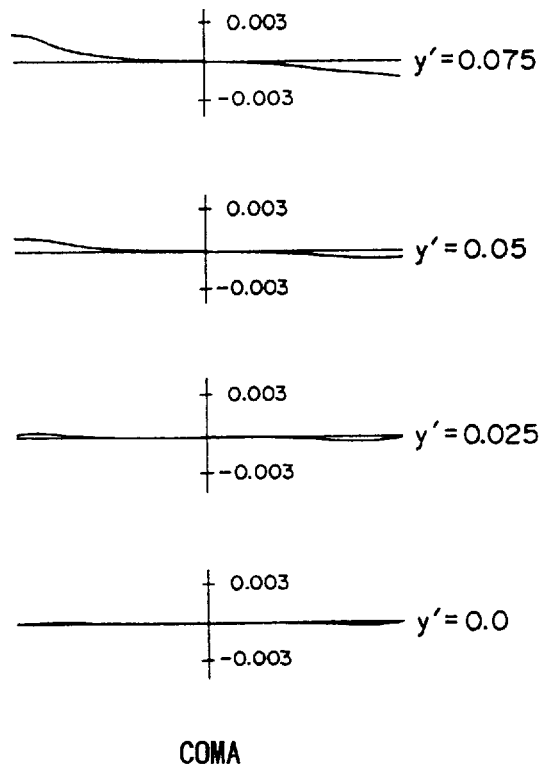

F I G. 1 1 B
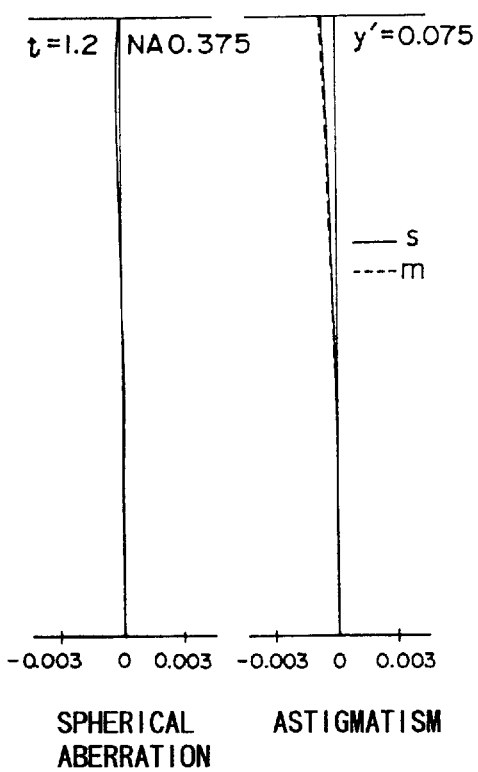
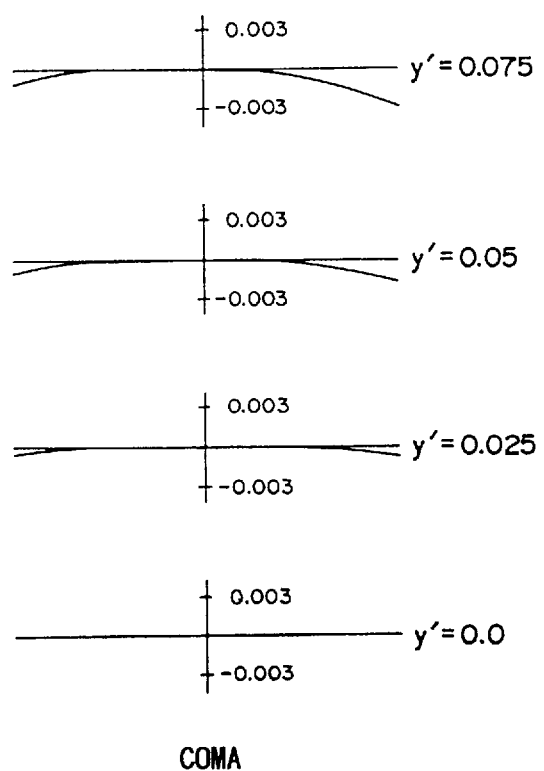

F I G. 1 2 B
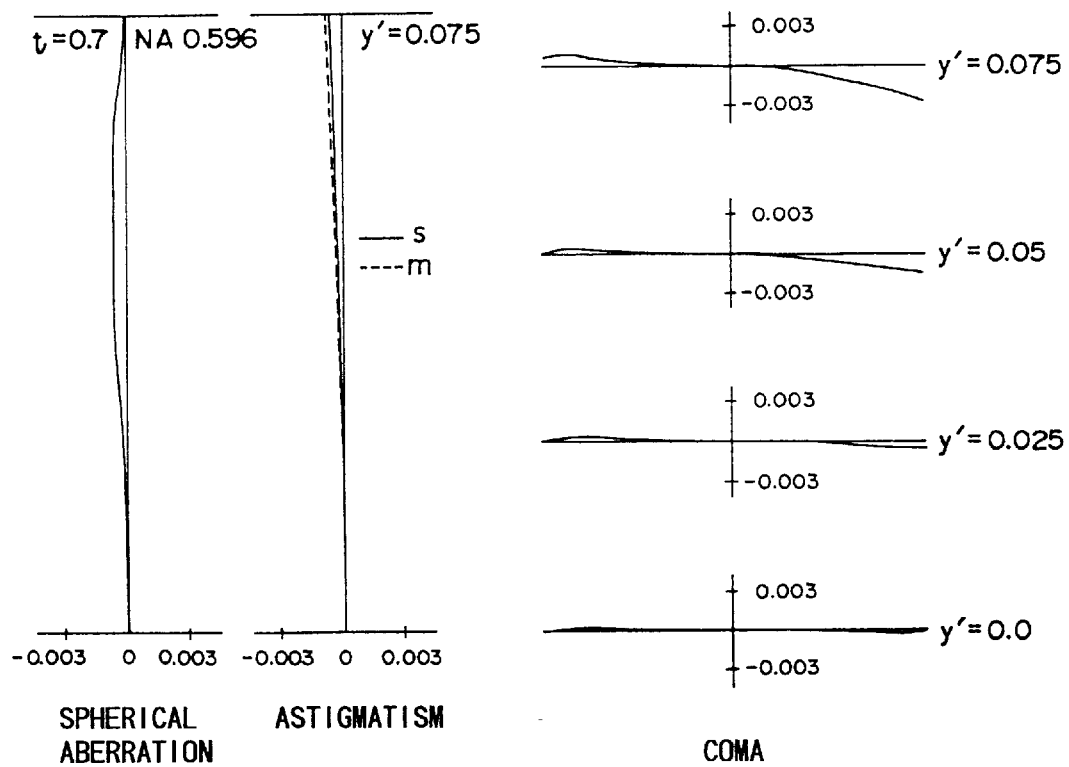

F I G. 1 4 A
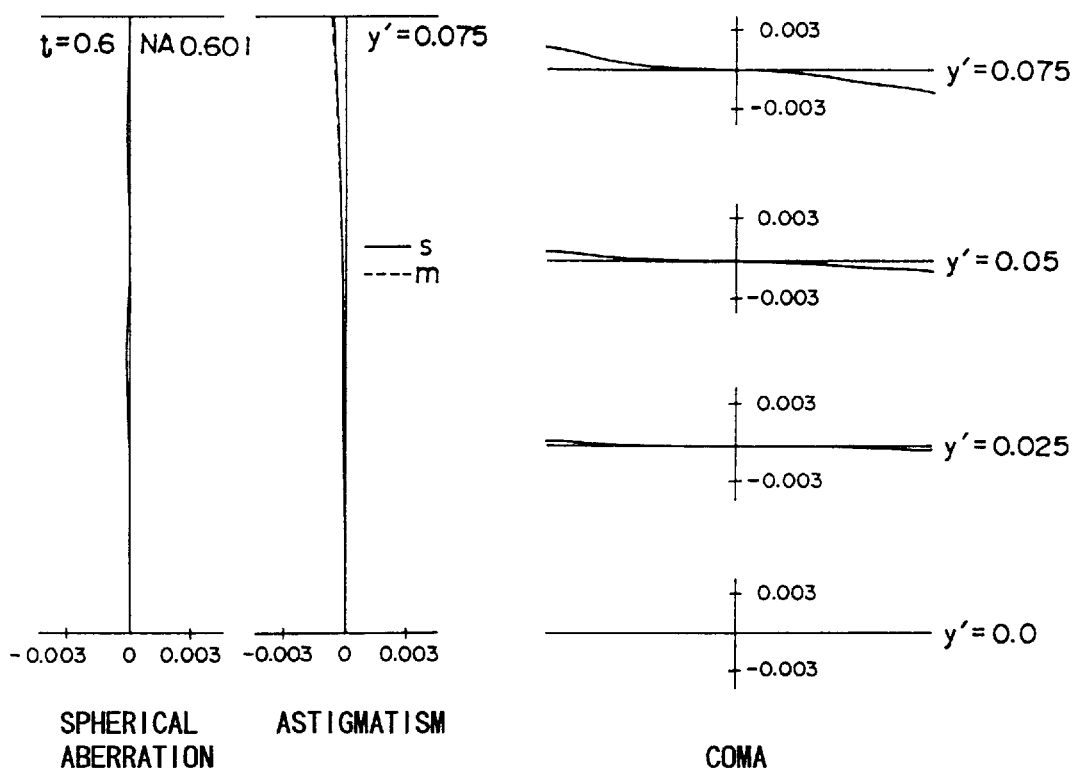

F I G. 1 5 A
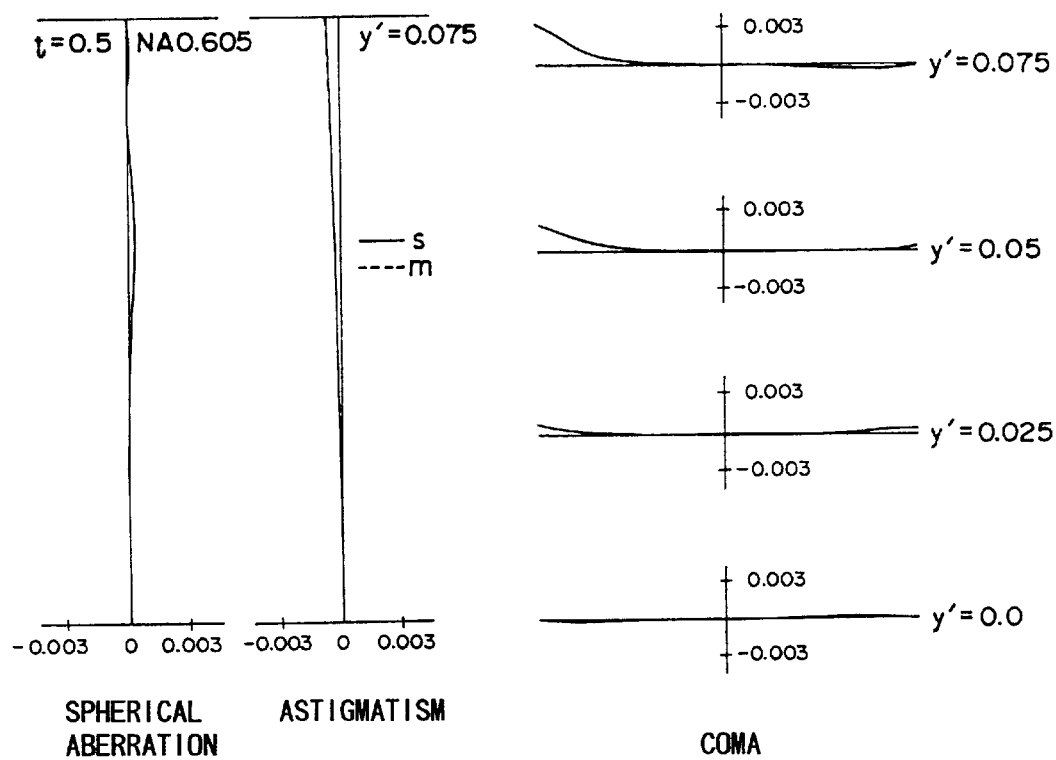

FIG. 15B
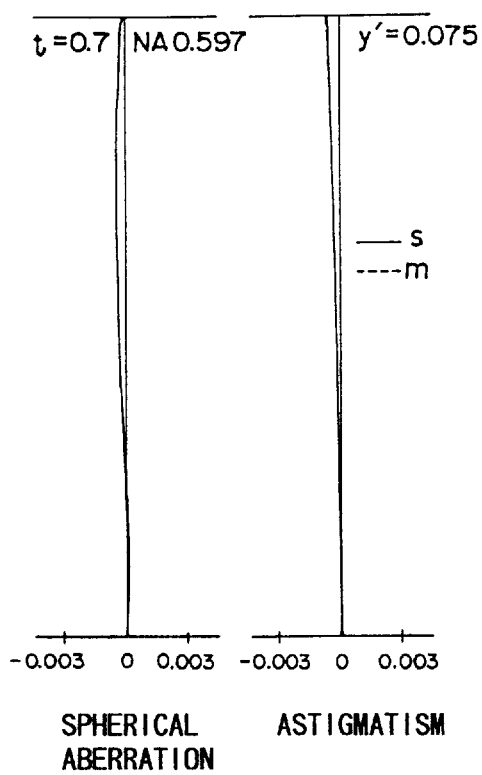
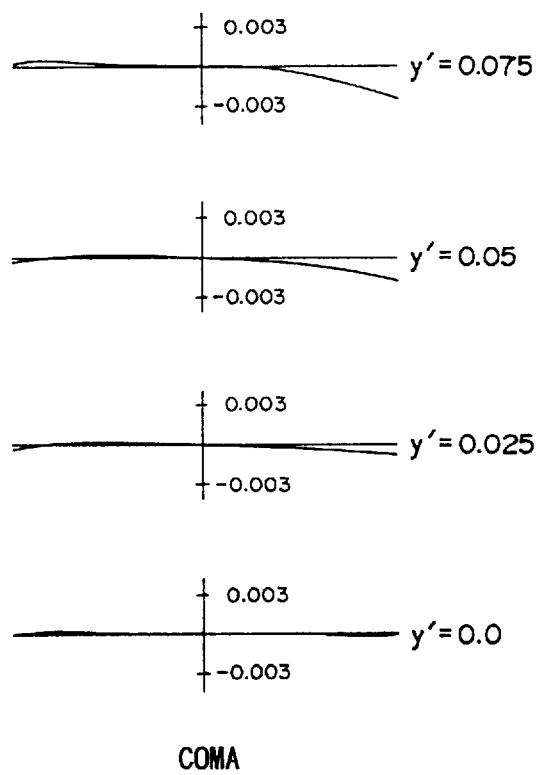

F I G. 1 6
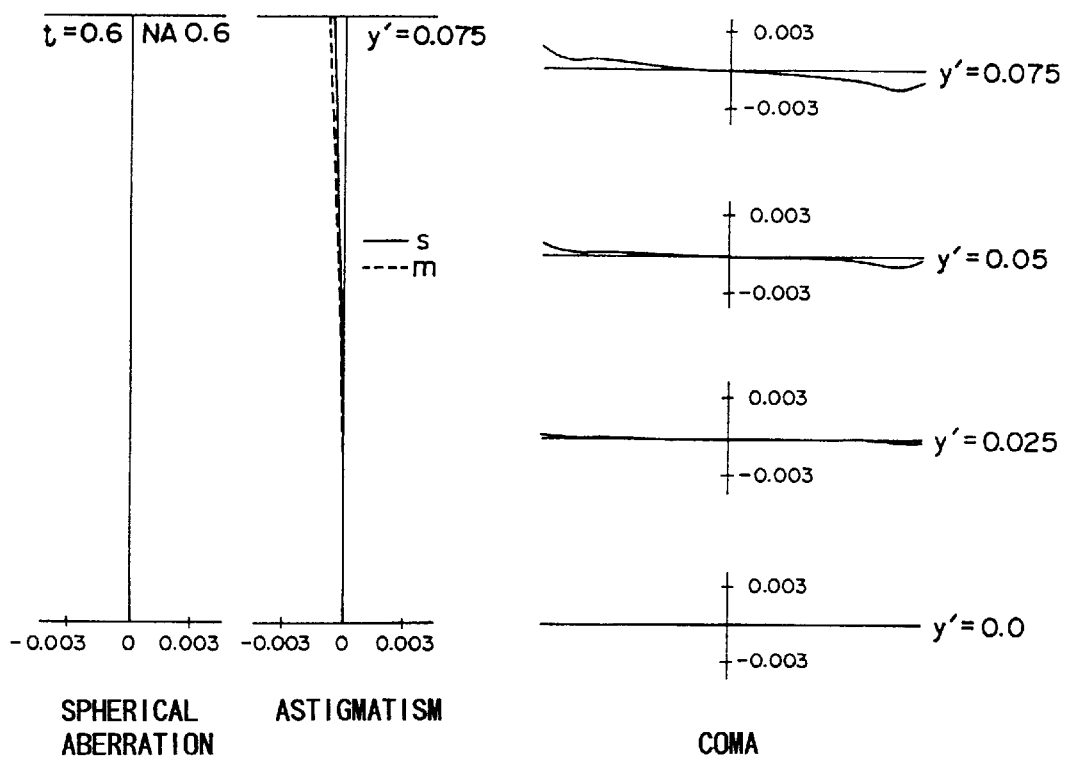

F I G. 1 7 A
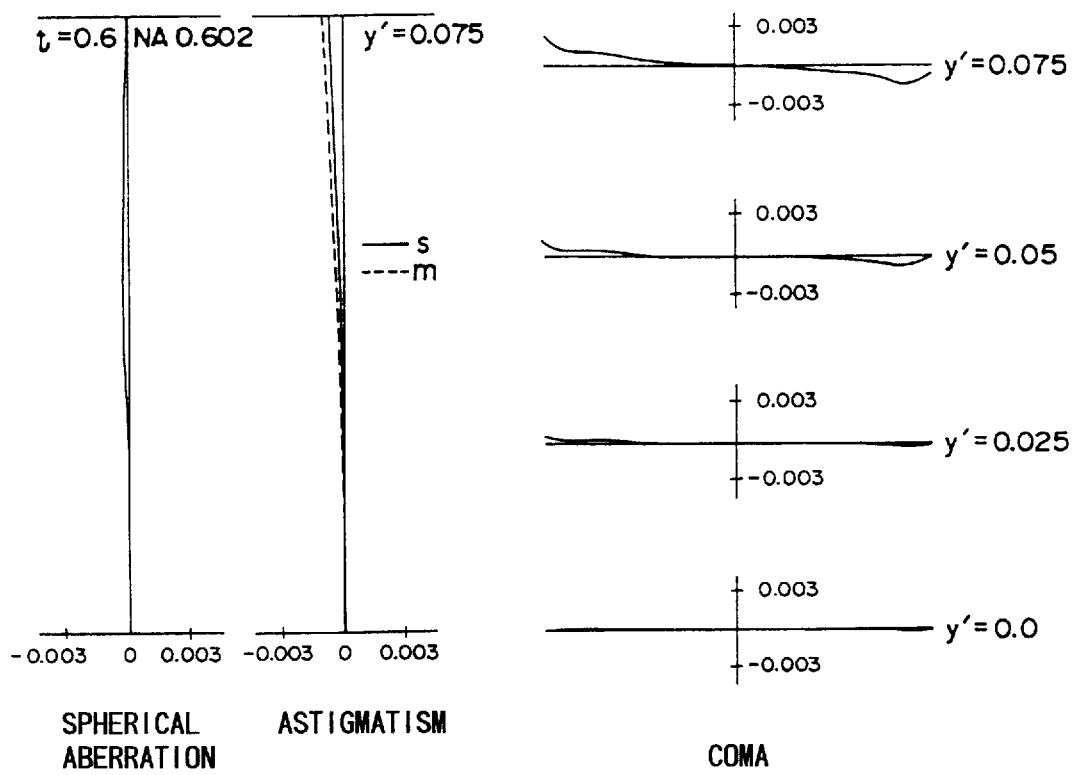

F I G. 1 7 B
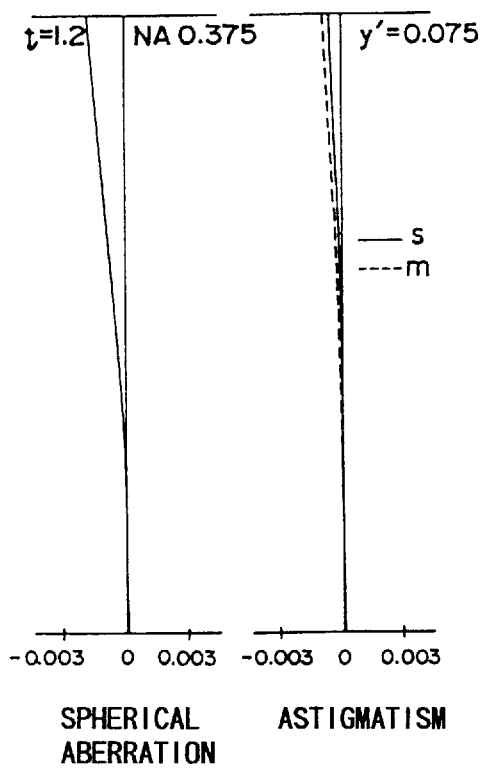
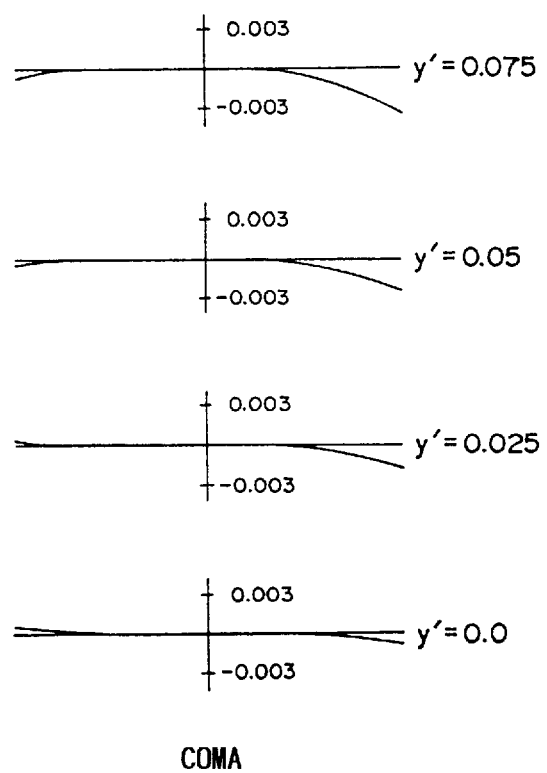

F I G. 1 8 B
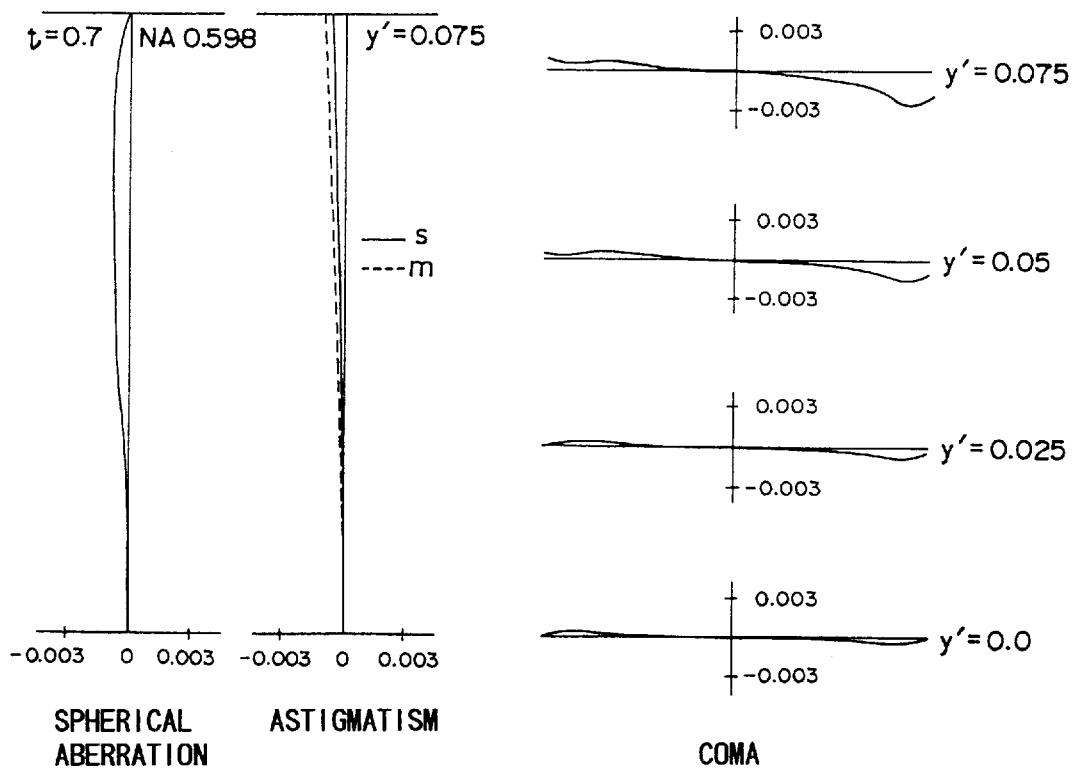

FIG. 19
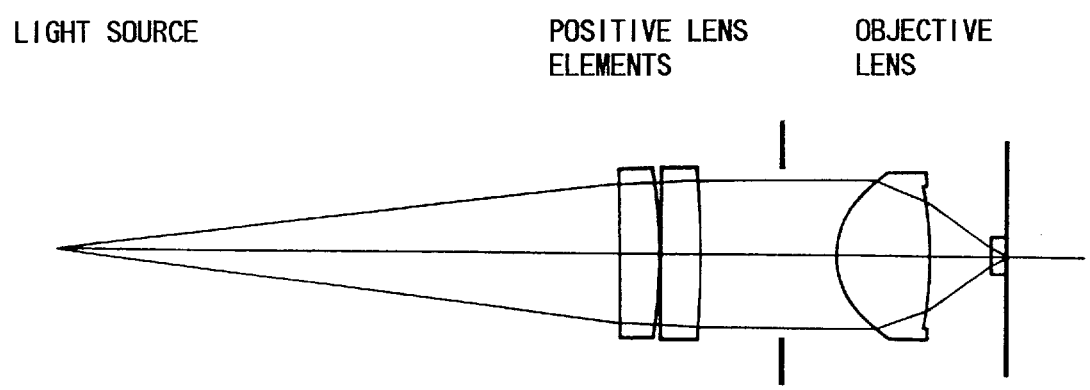
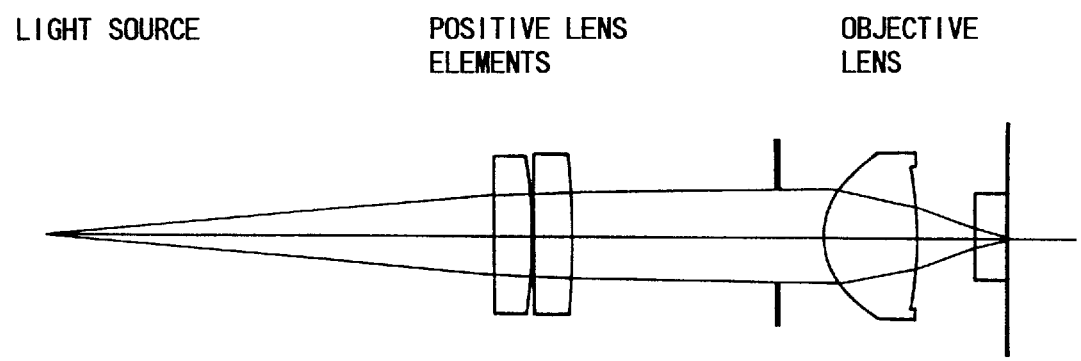

FIG. 20A
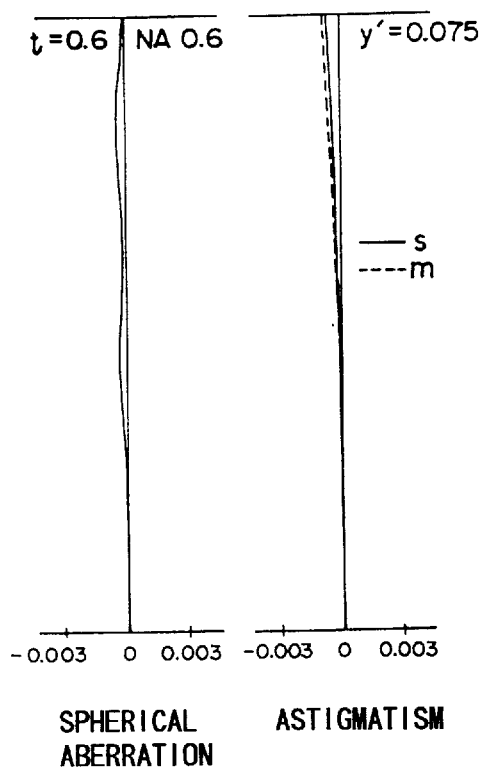
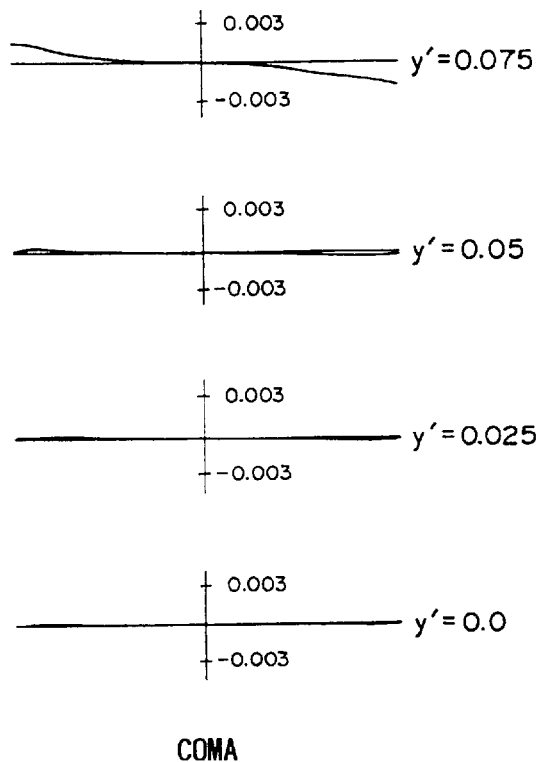

F I G. 2 0 B
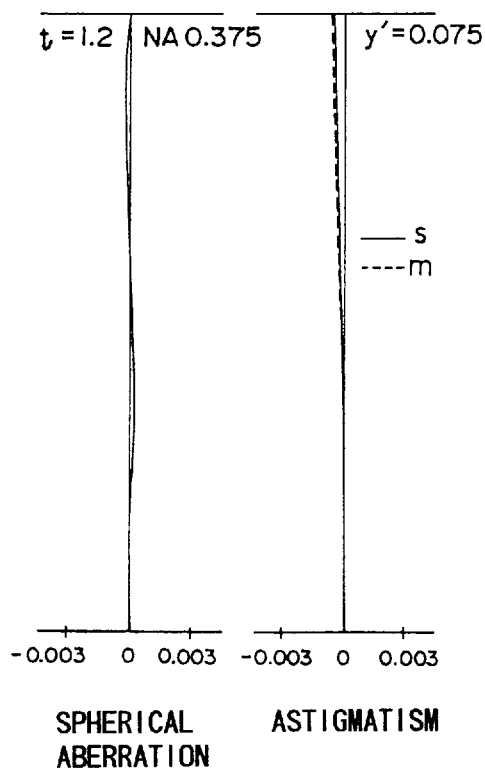
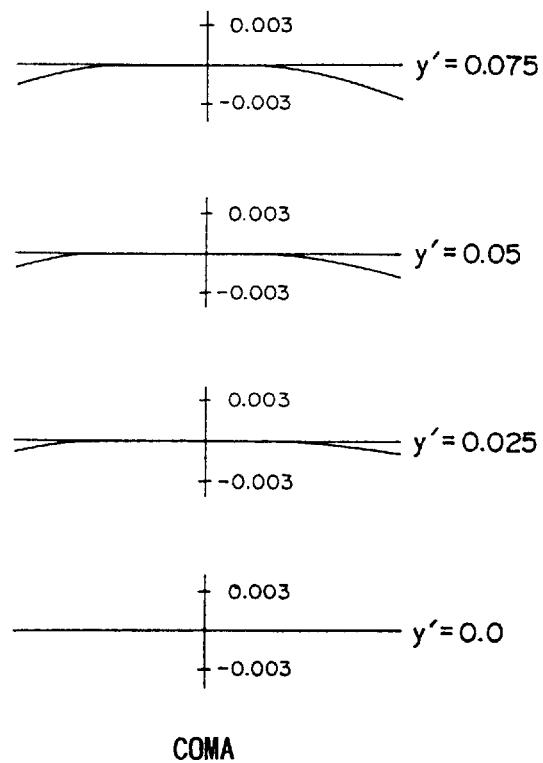

F I G. 2 1 A
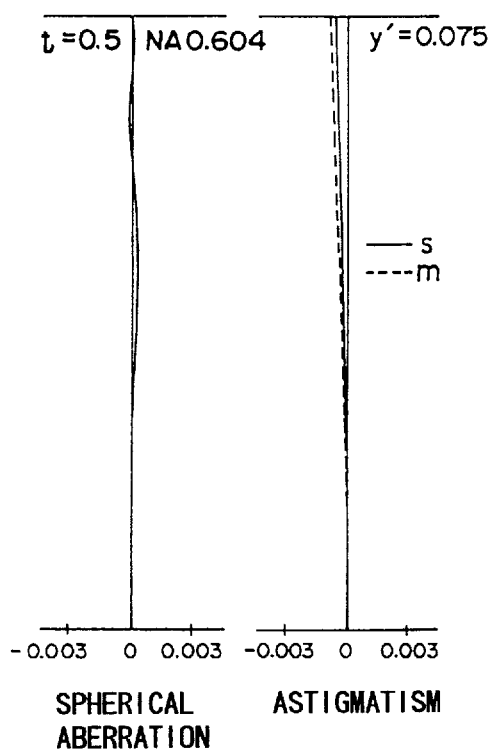
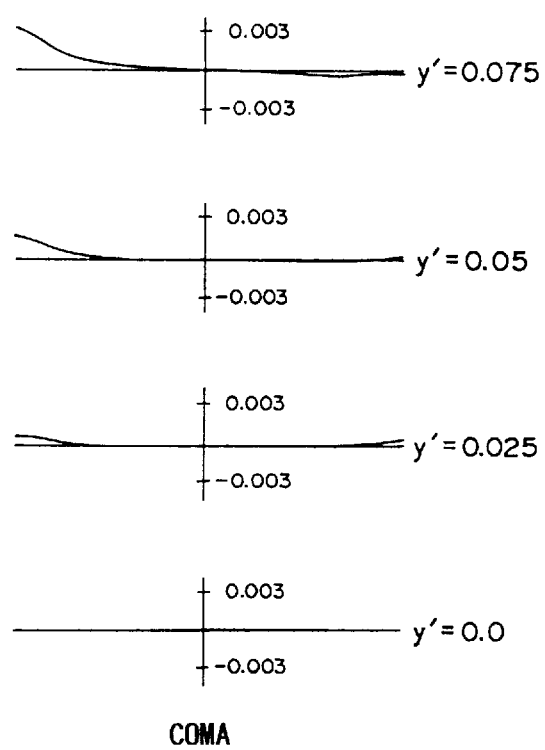

FIG. 21B
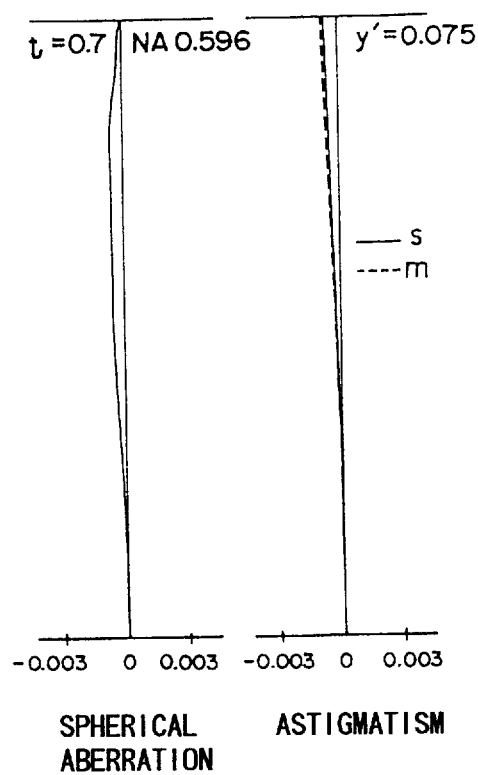
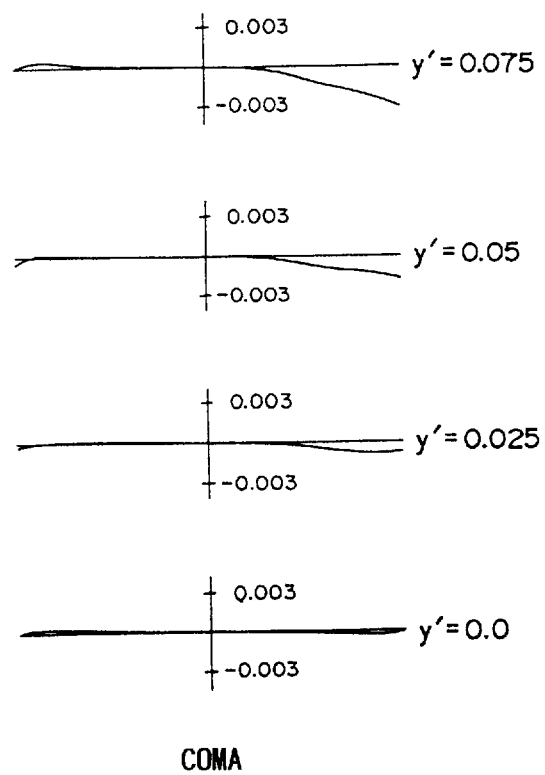
SPHERICAL ASTIGMATISM COMA
ABERRATION

F I G. 2 2
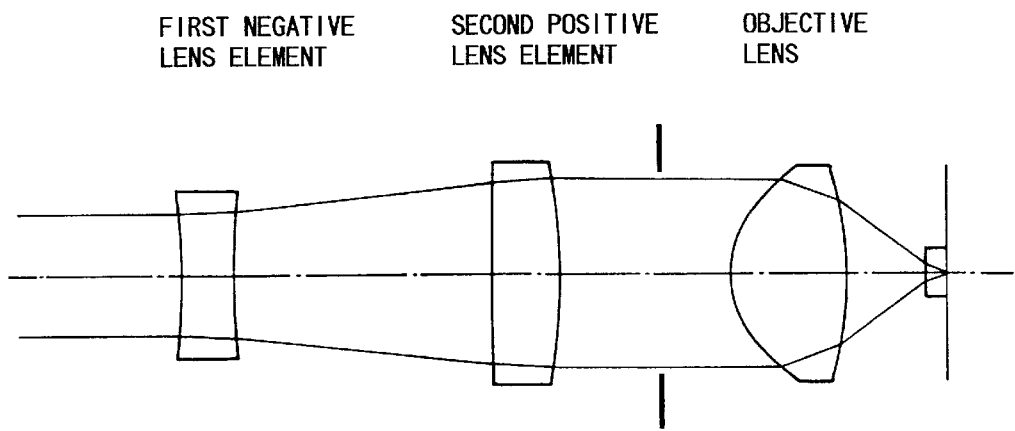
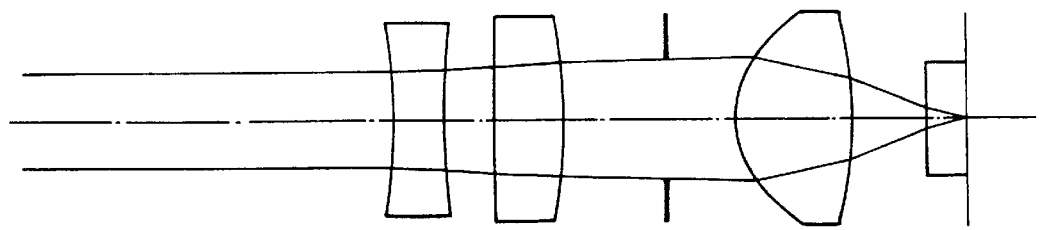

FIG. 24A
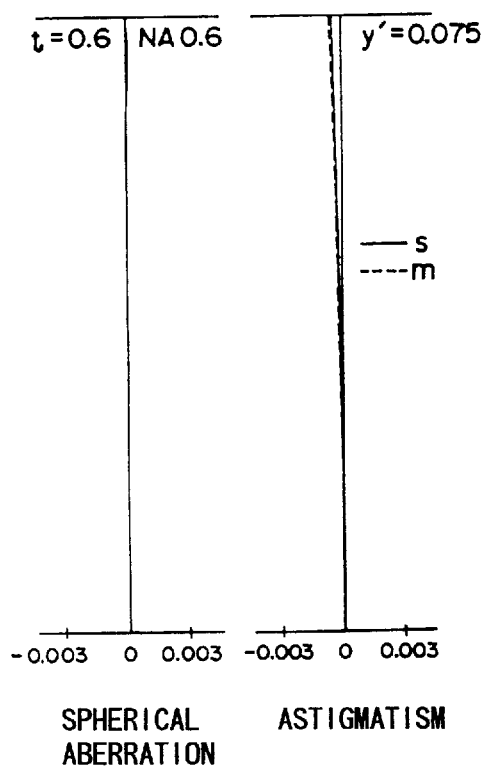
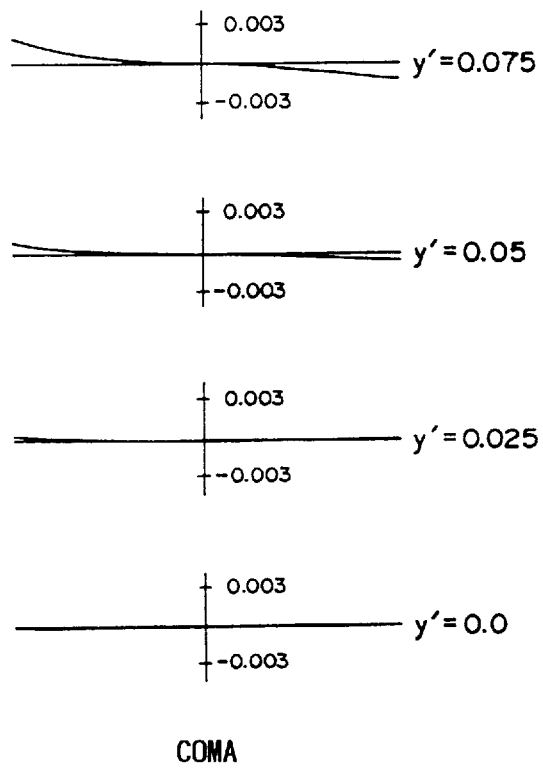

F I G. 2 4 B
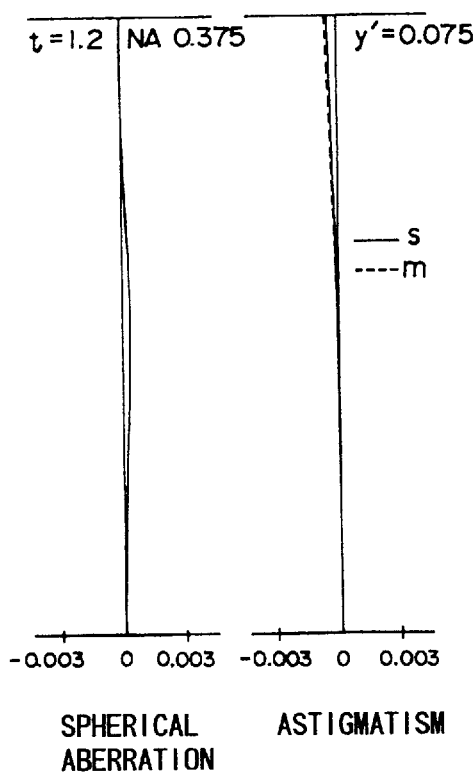
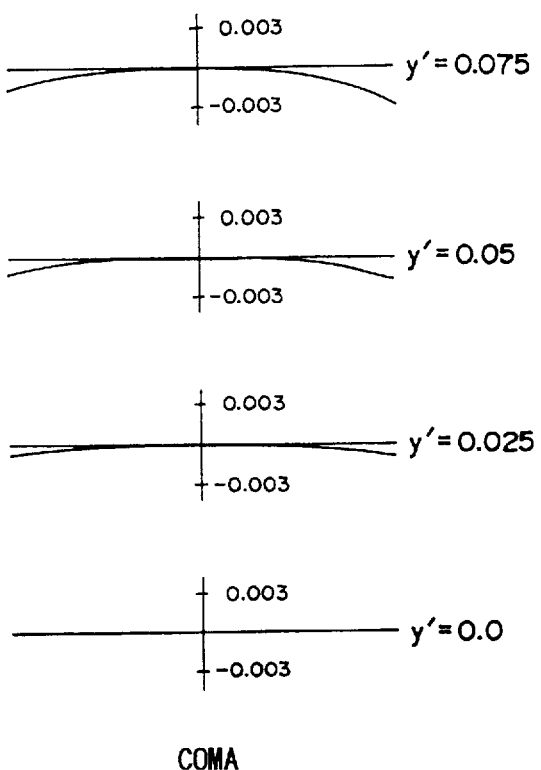

F I G. 2 5 A
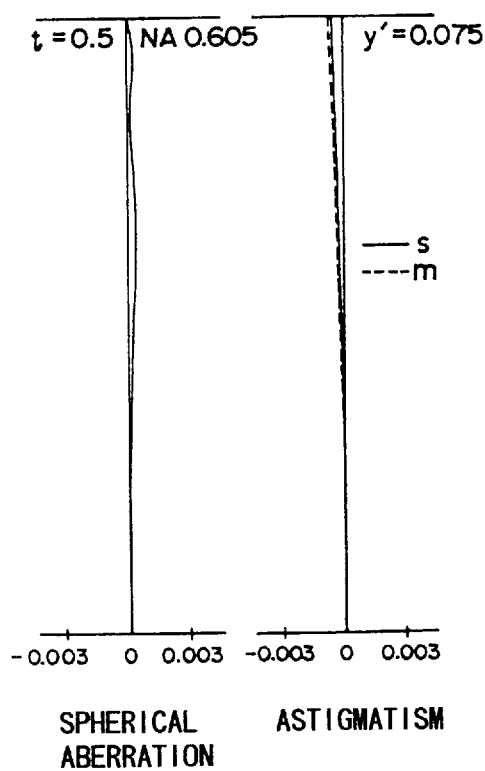
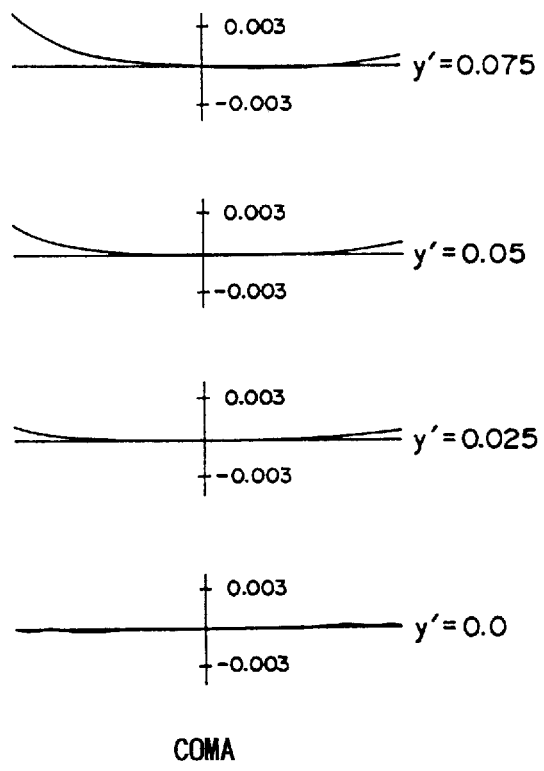

F I G. 2 5 B
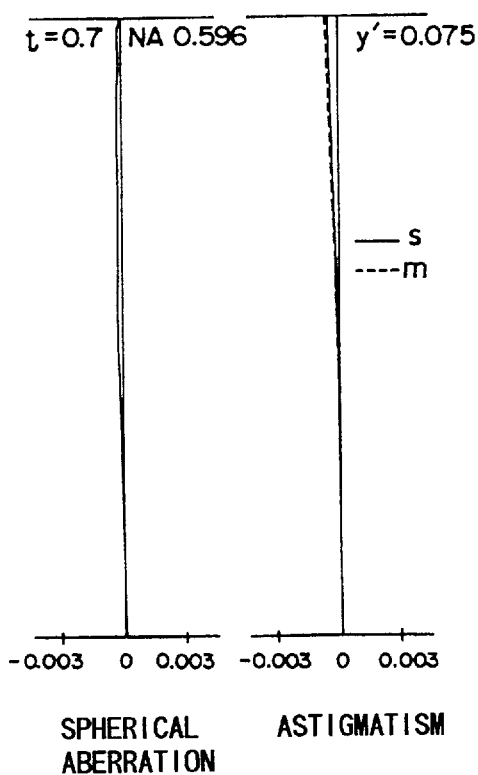
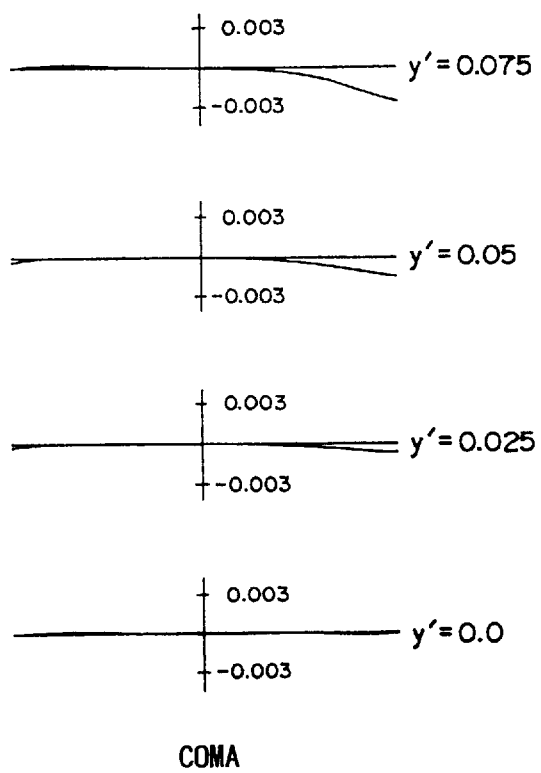

FIG. 26A
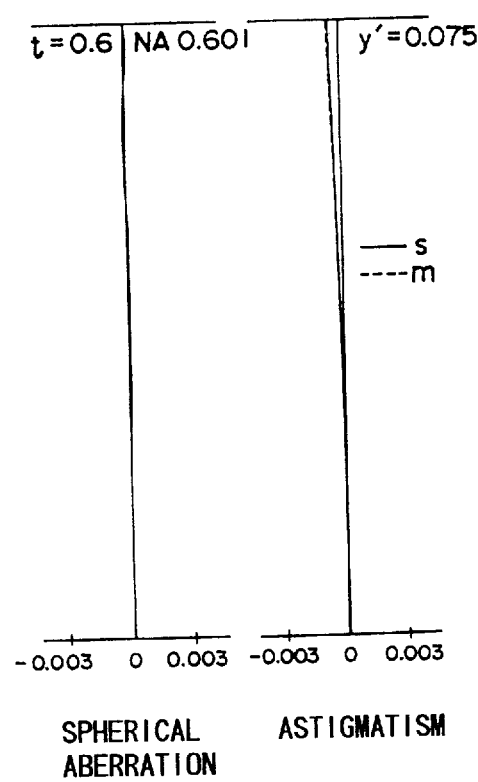
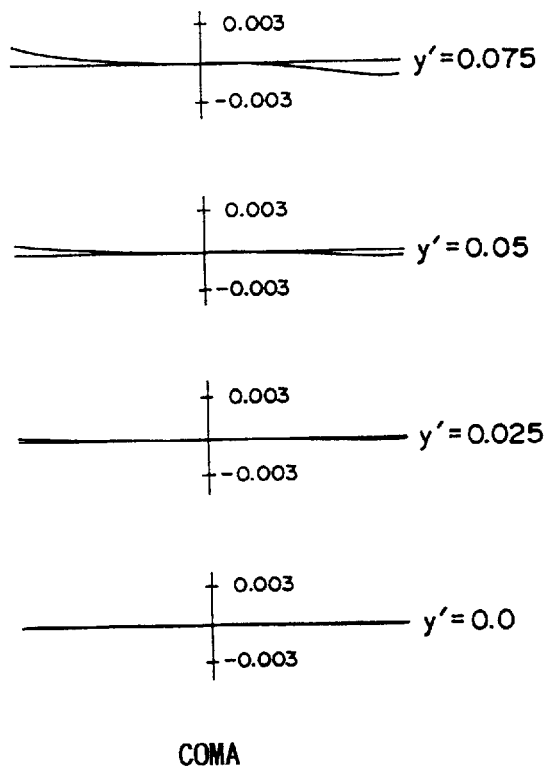
SPHERICAL ASTIGMATISM  COMA
ABERRATION

FIG. 26B
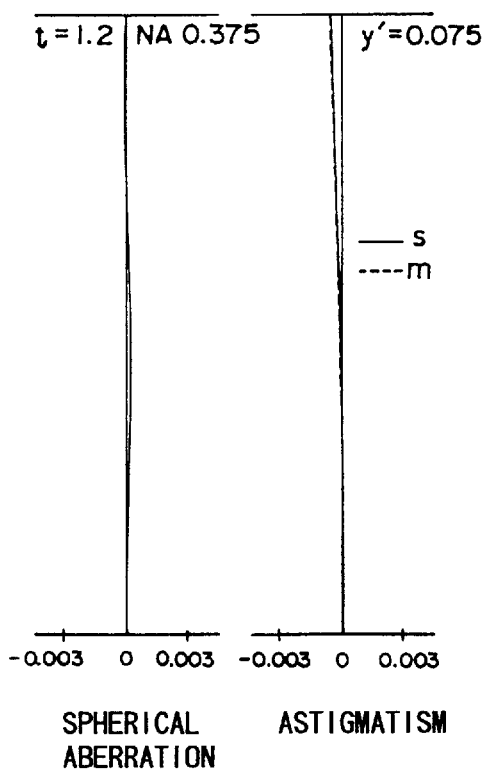
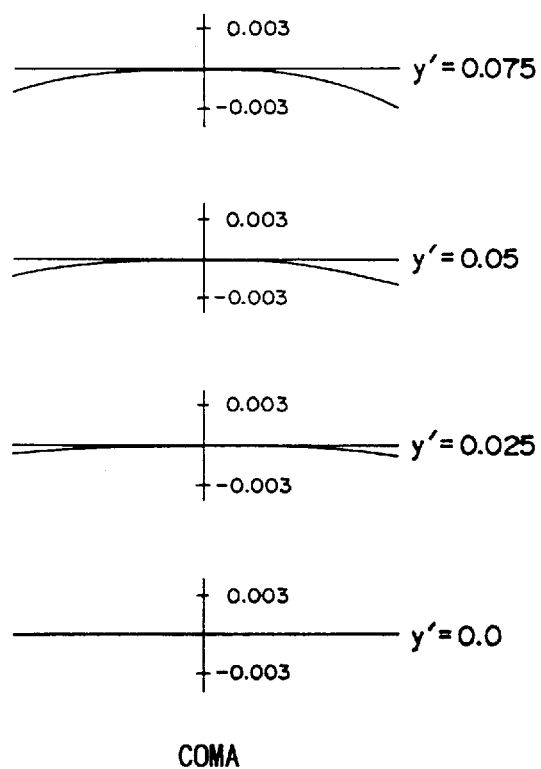

FIG. 27A
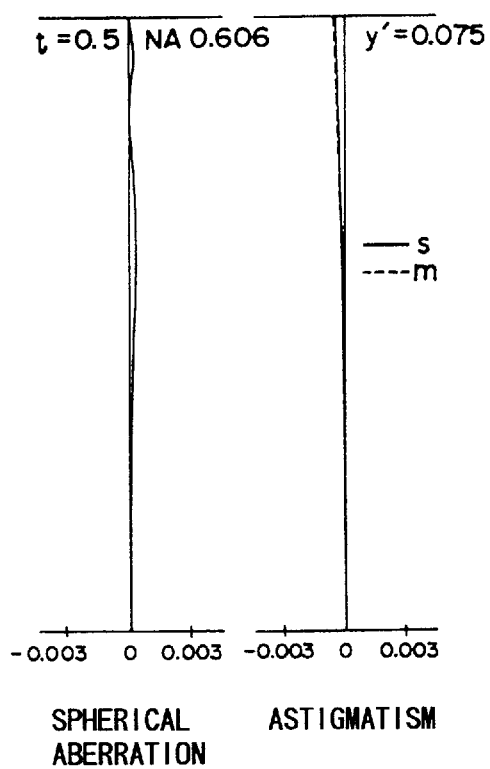
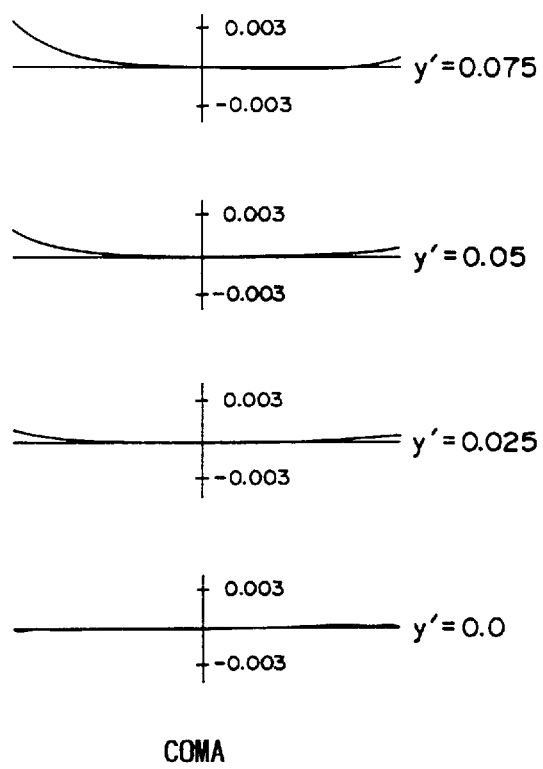

F I G. 27B
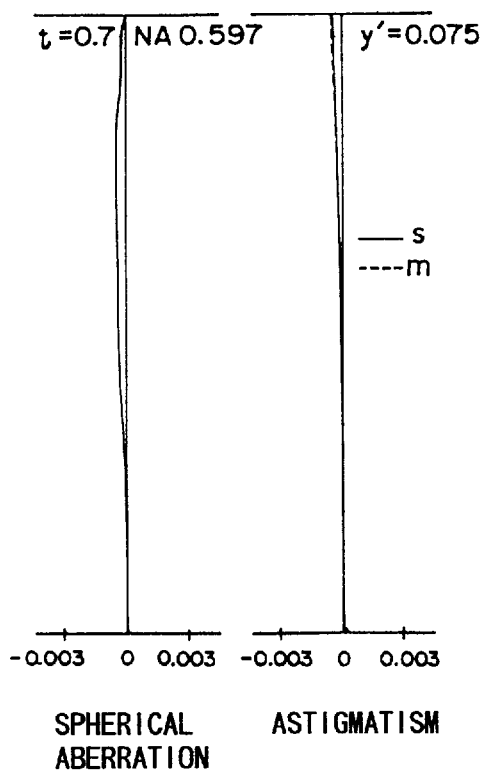
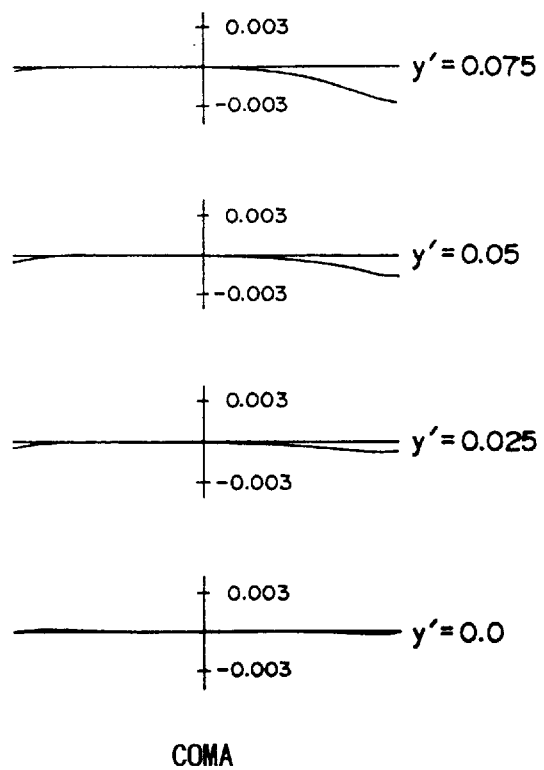

F I G. 2 8 A
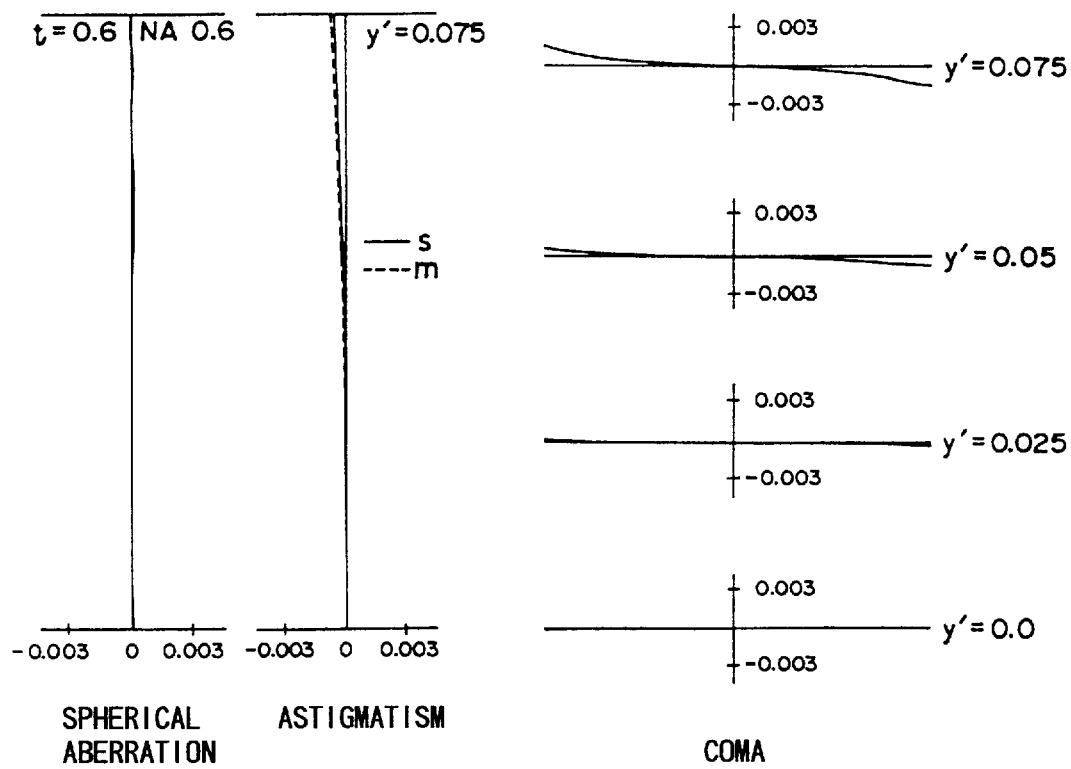

F I G. 2 8 B
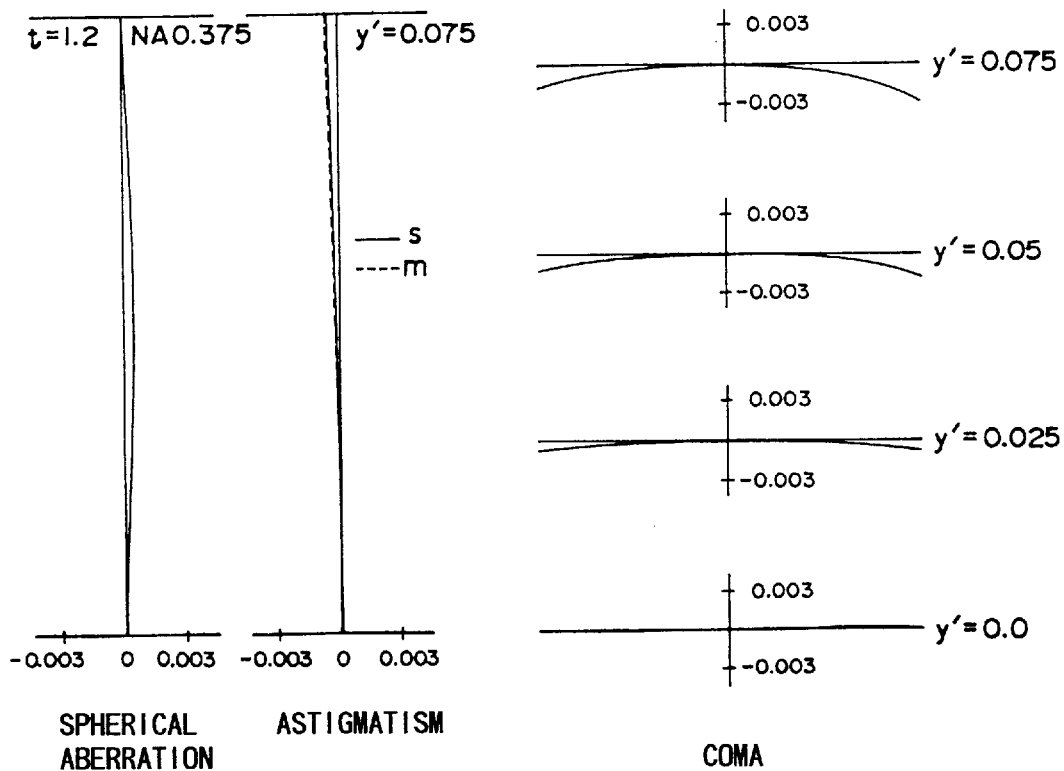

FIG. 29B
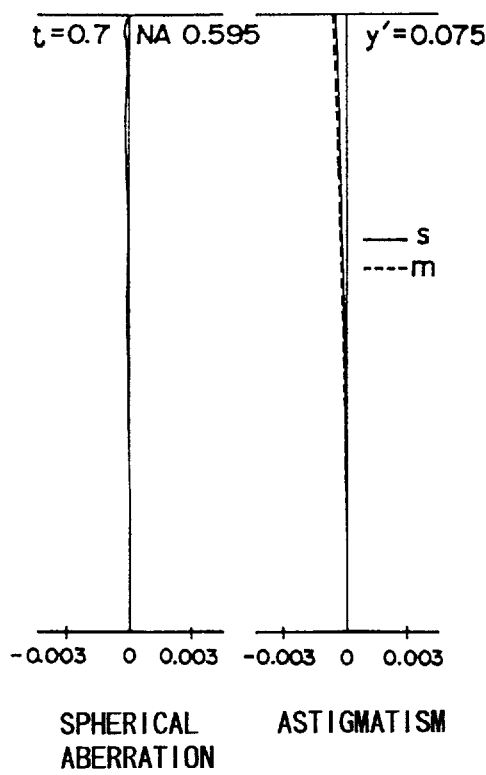
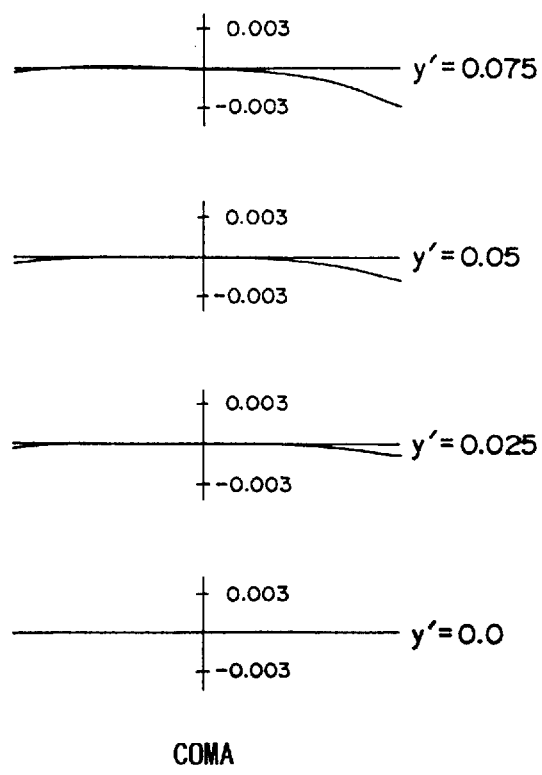

F I G. 3 0 A
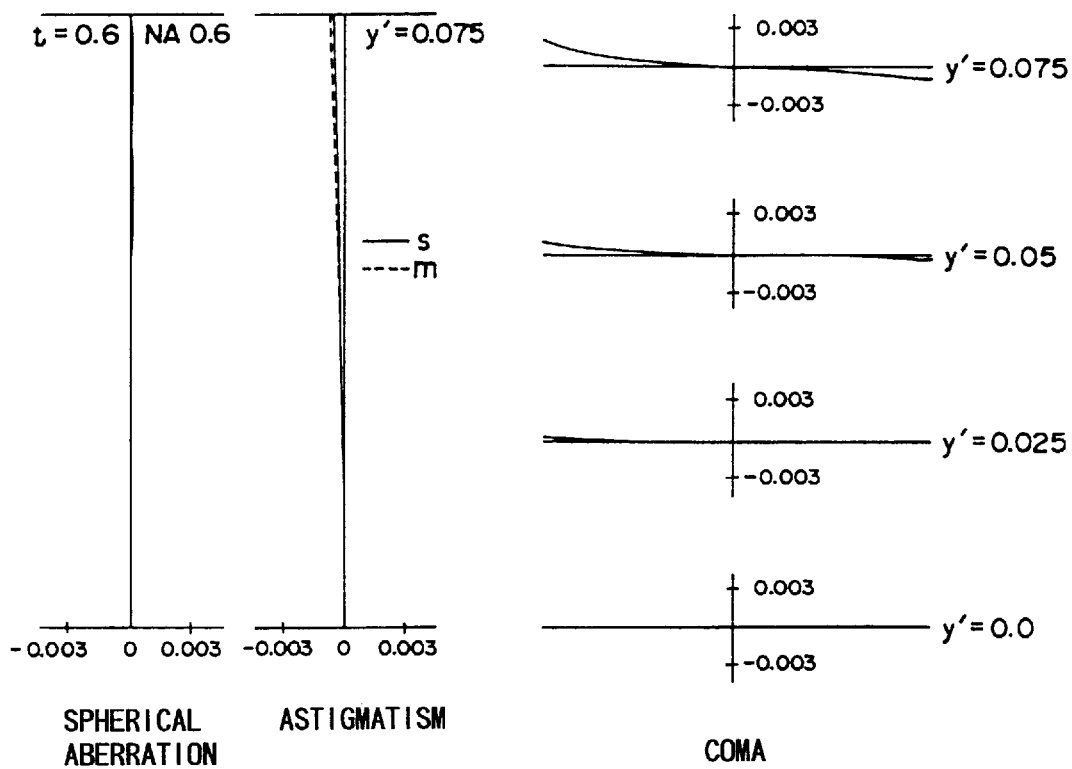

FIG. 30B
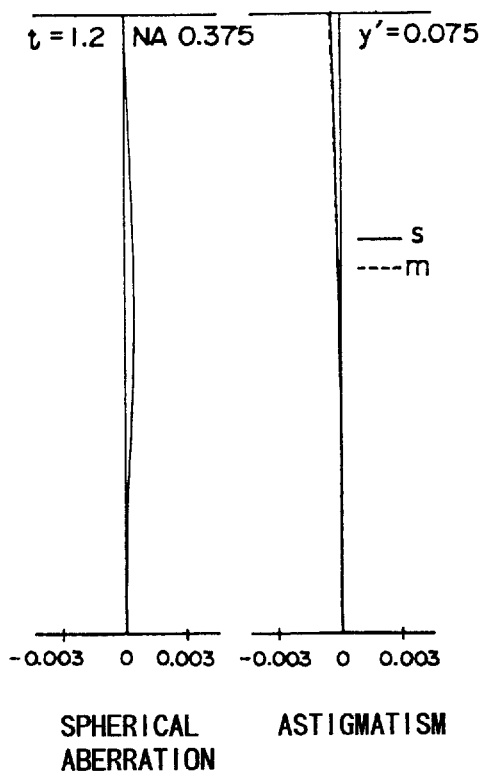
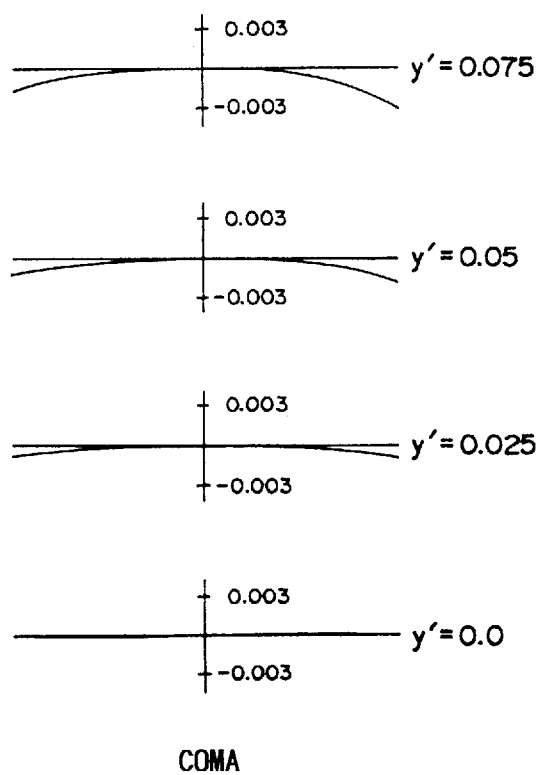

FIG. 31A
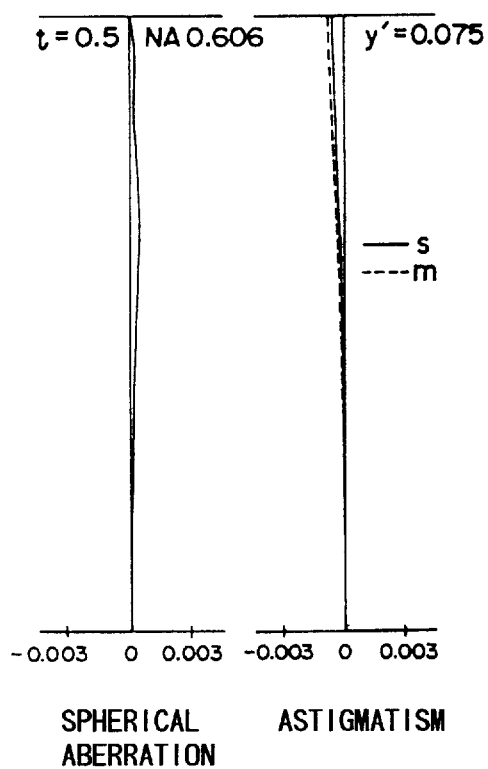
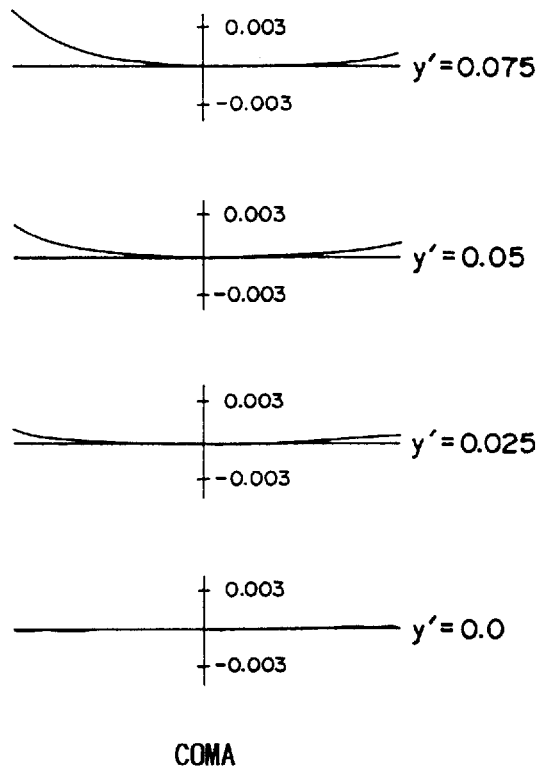

FIG. 31B
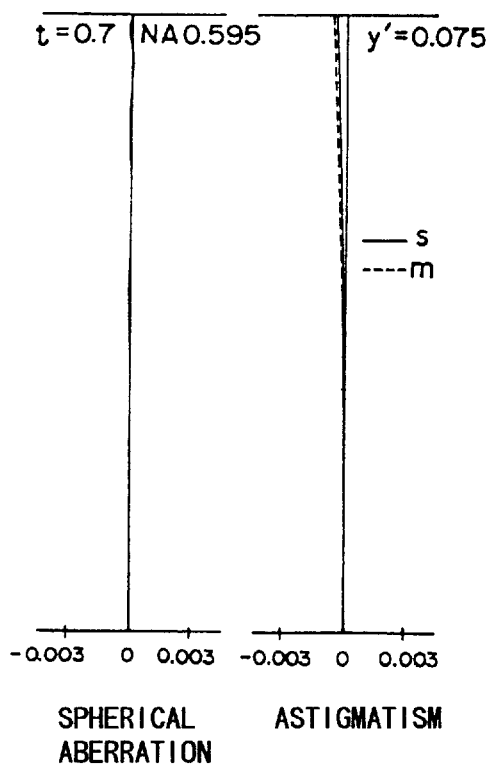
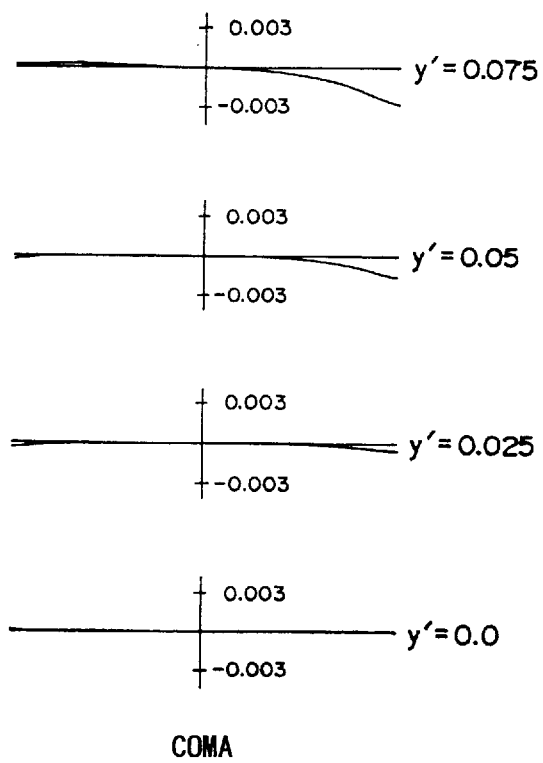

F I G. 3 2 B
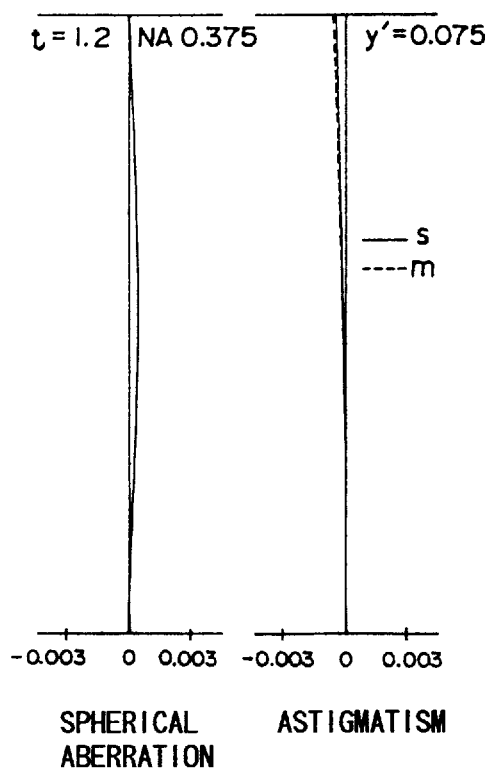
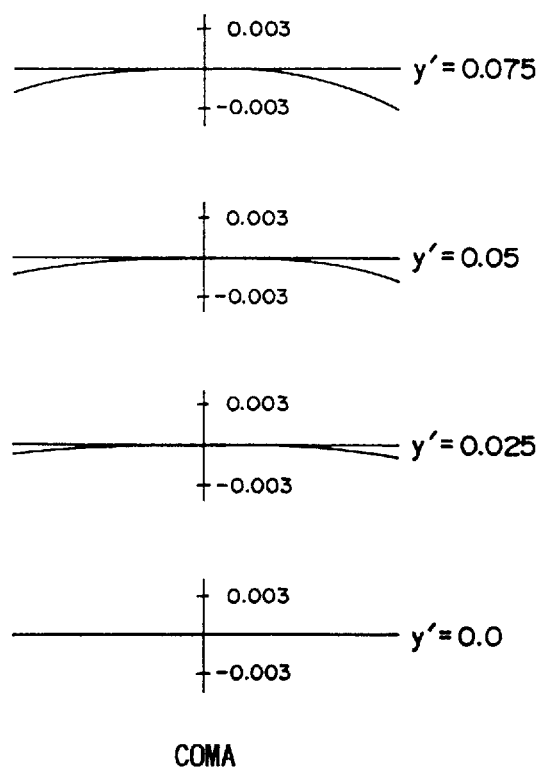

F I G. 3 3 B
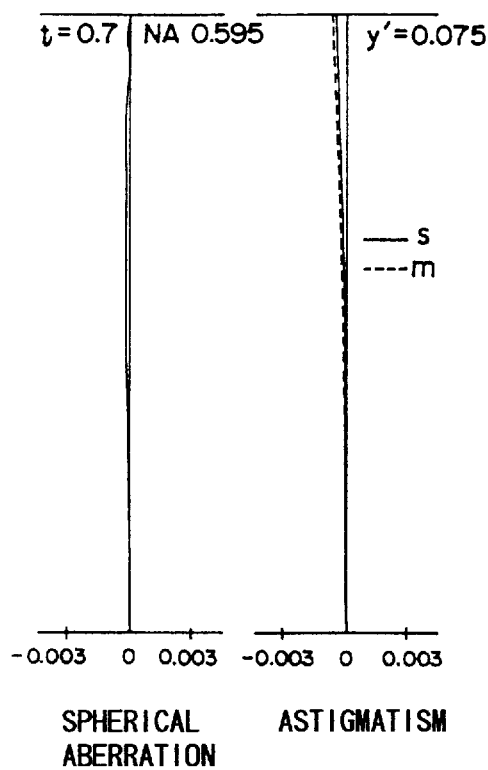
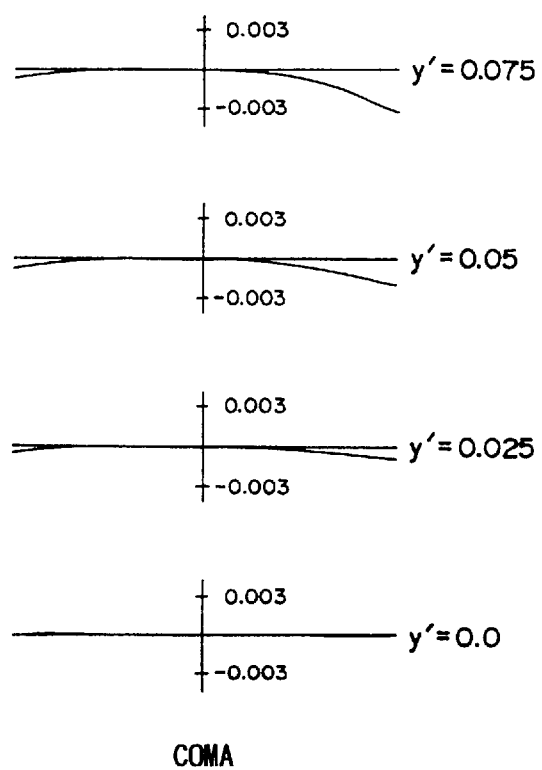

F I G. 3 4 A
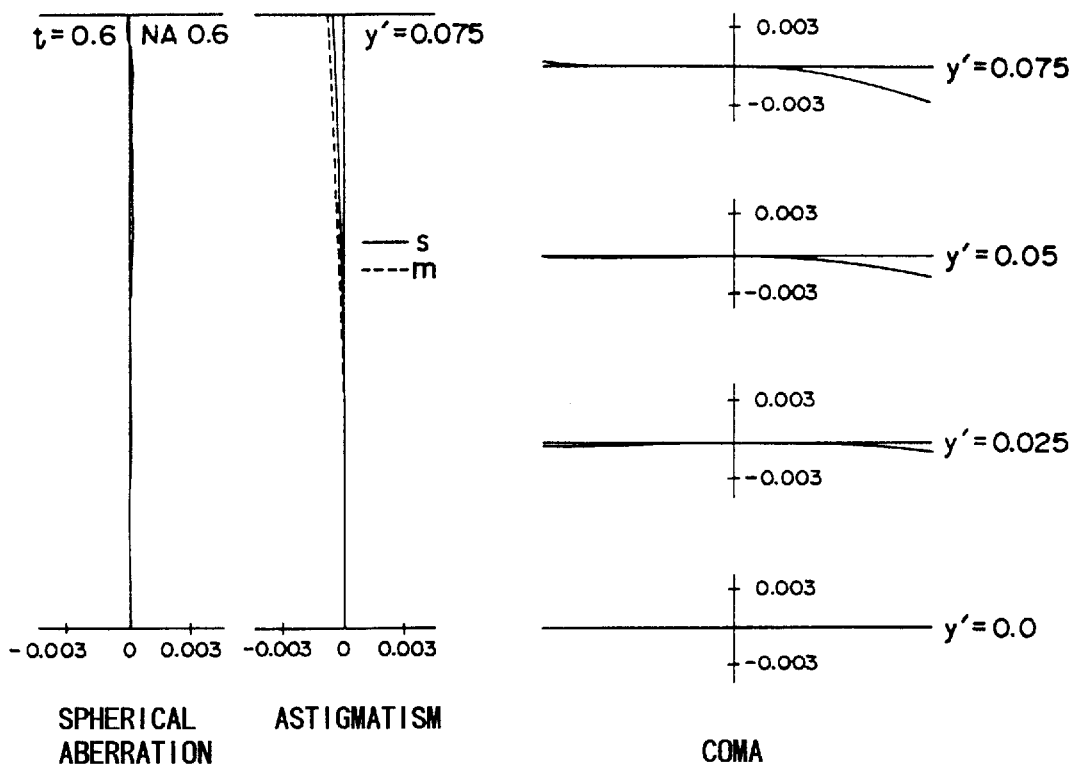

F I G. 3 4 B
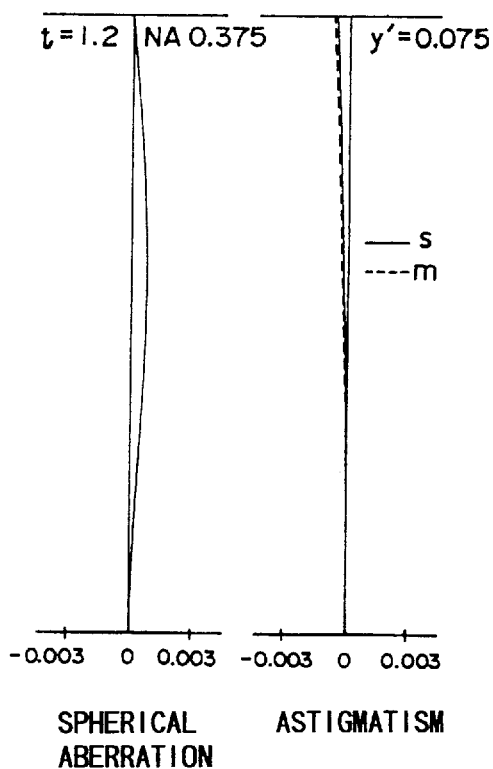
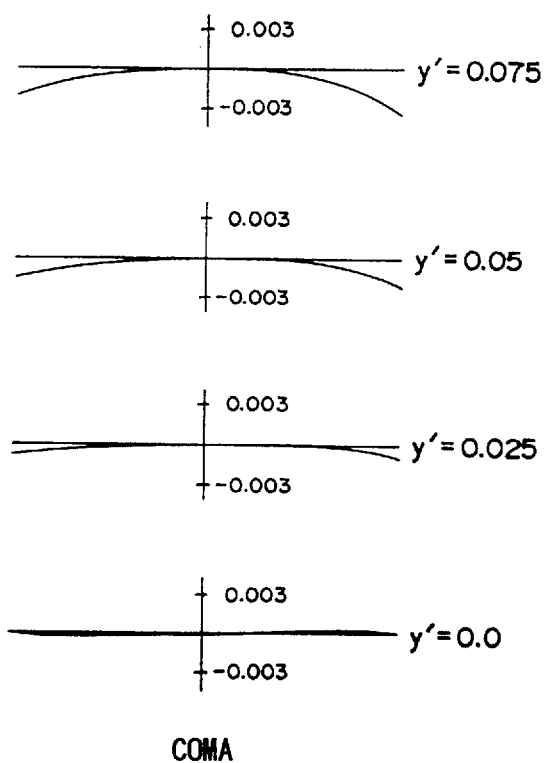
SPHERICAL
ABERRATION
ASTIGMATISM
COMA

FIG. 35B
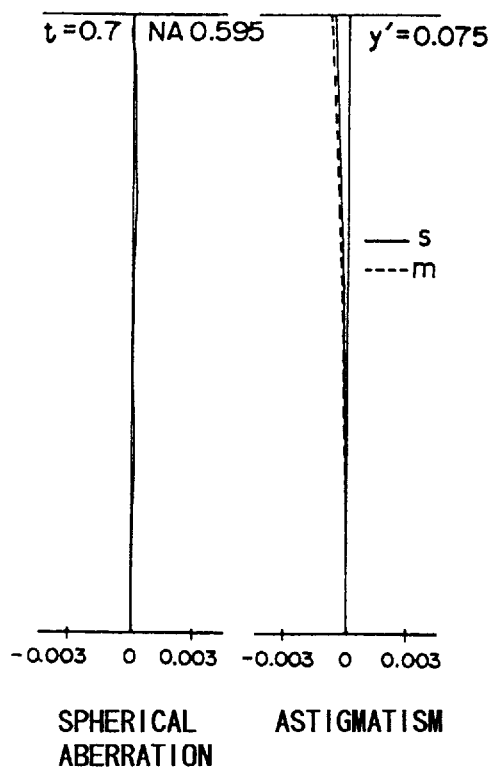
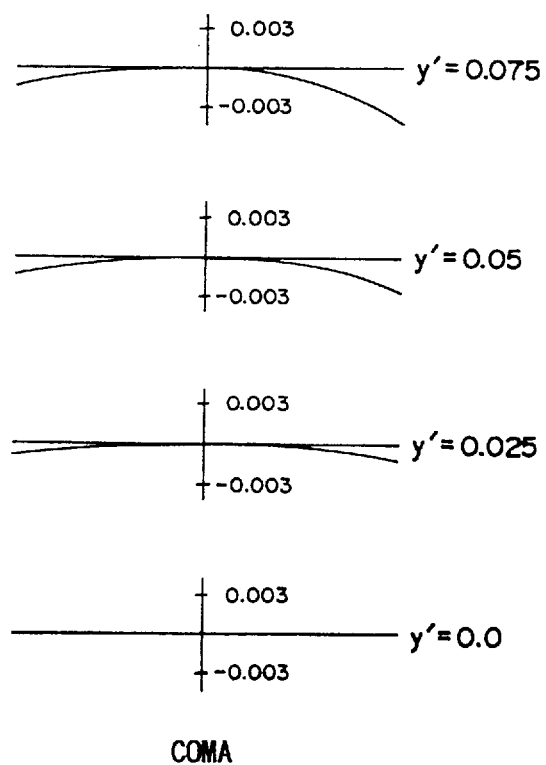

F I G. 3 7 A
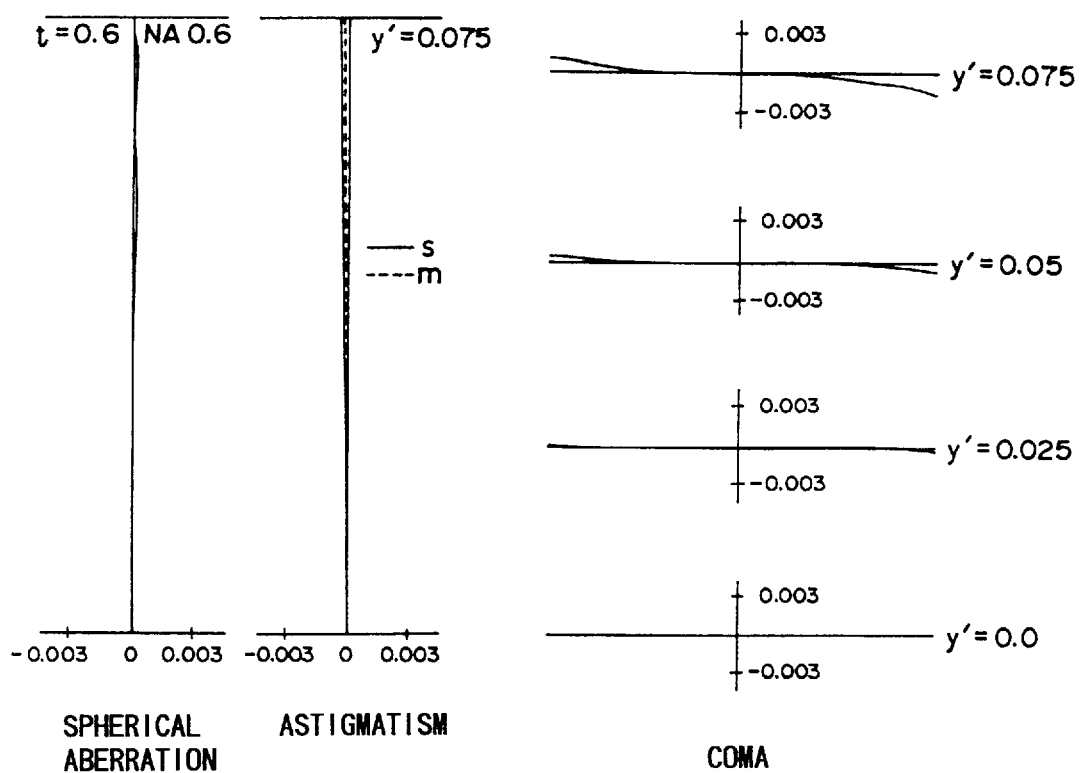

F I G. 3 7 B
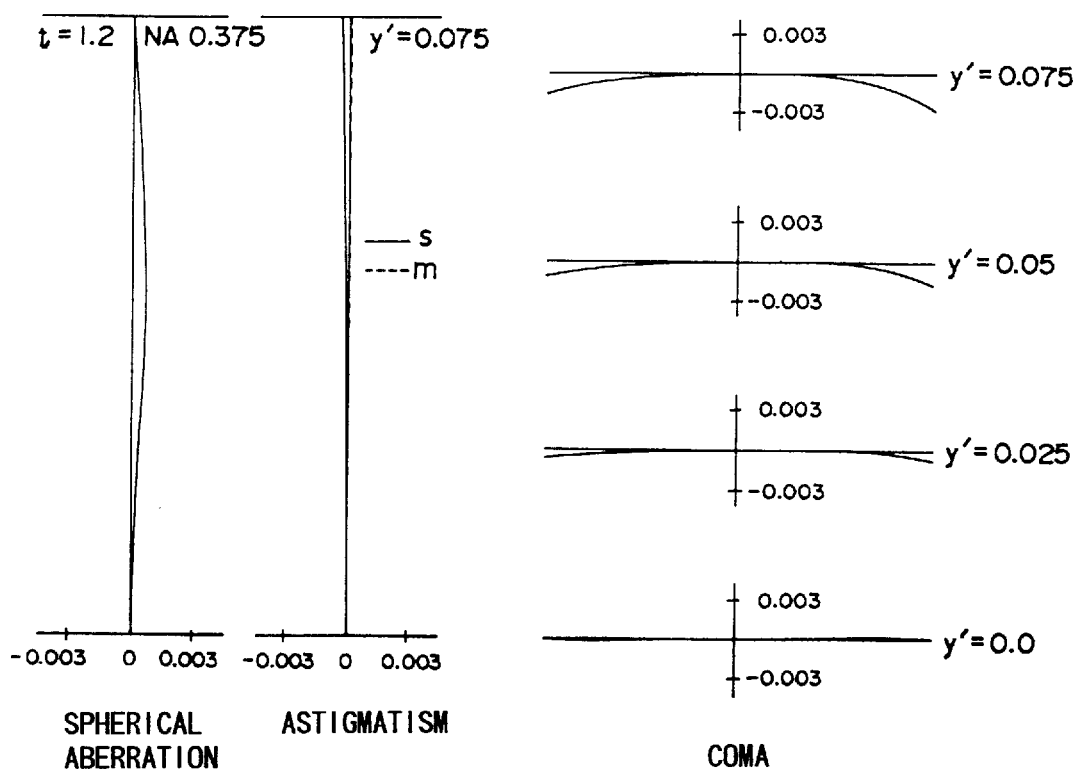

FIG. 38A
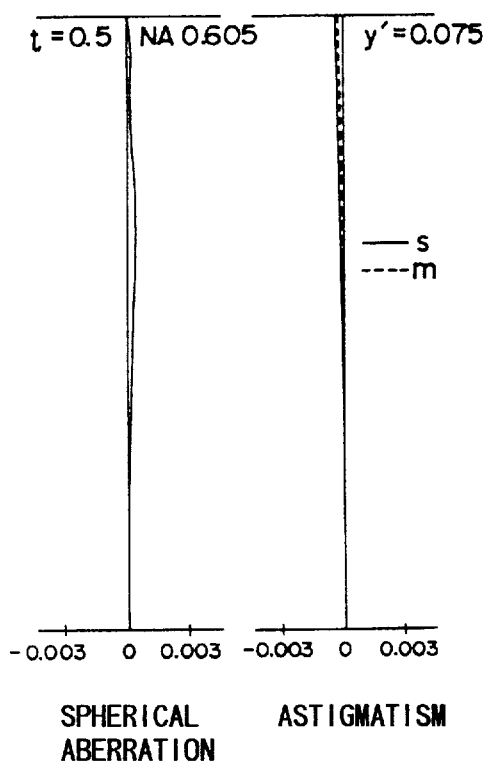
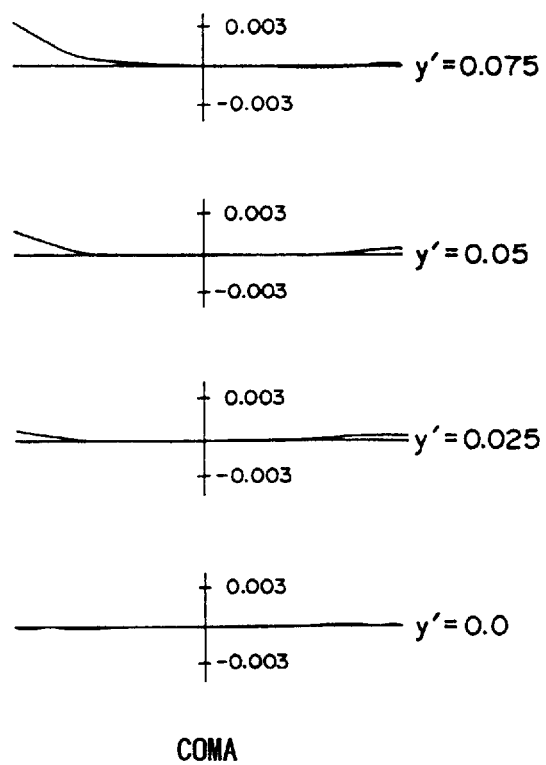

F I G. 4 0 A
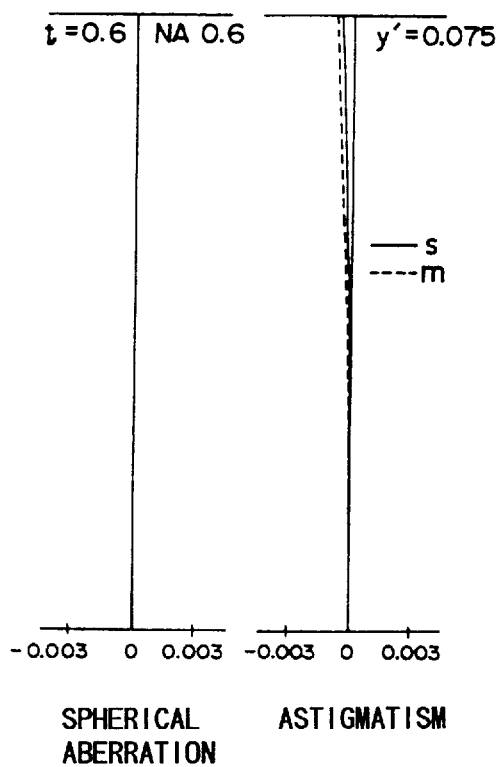
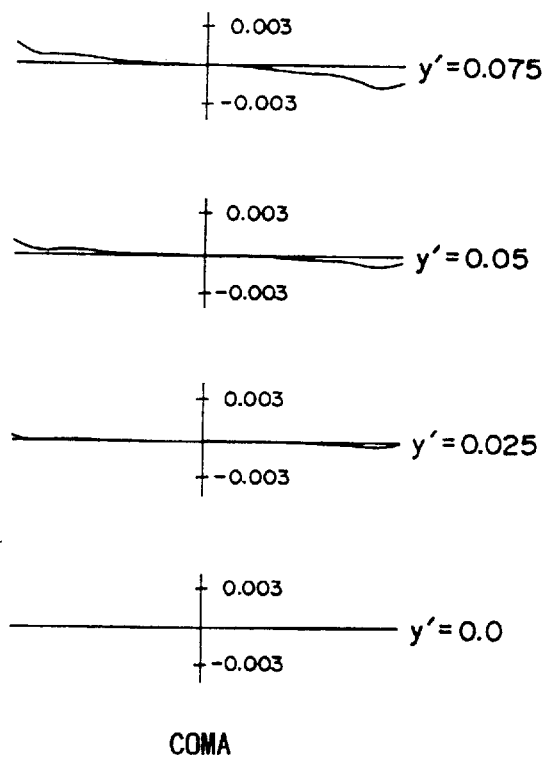

F I G. 4 0 B
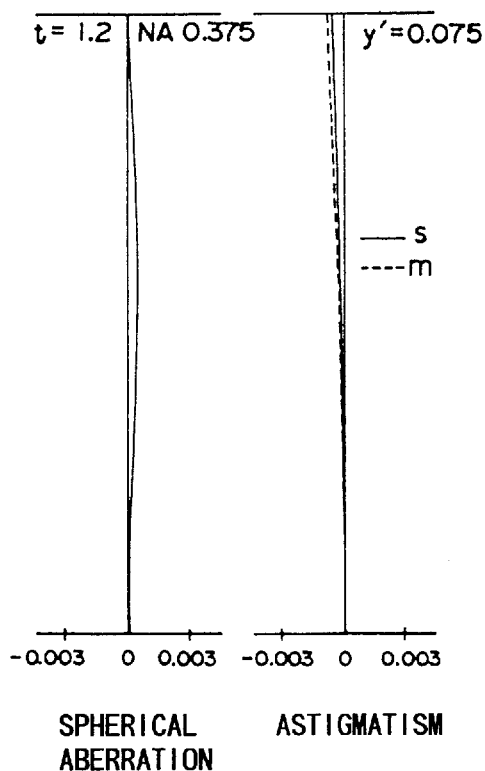
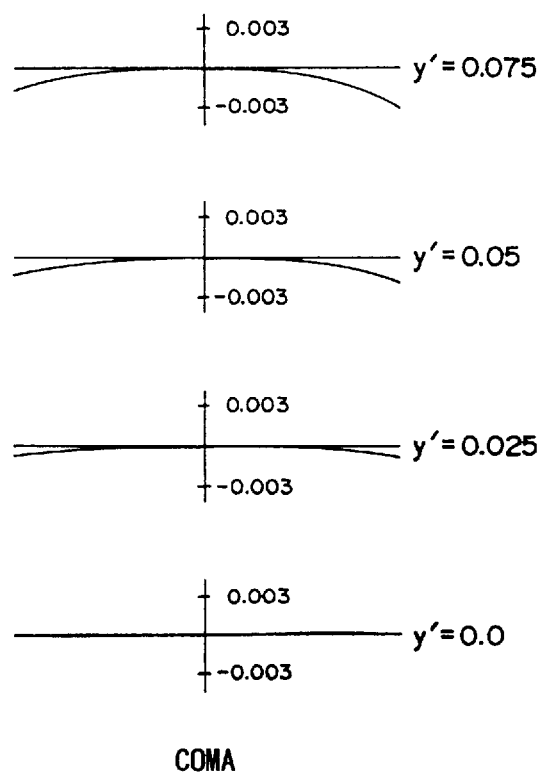

F I G. 4 1 A
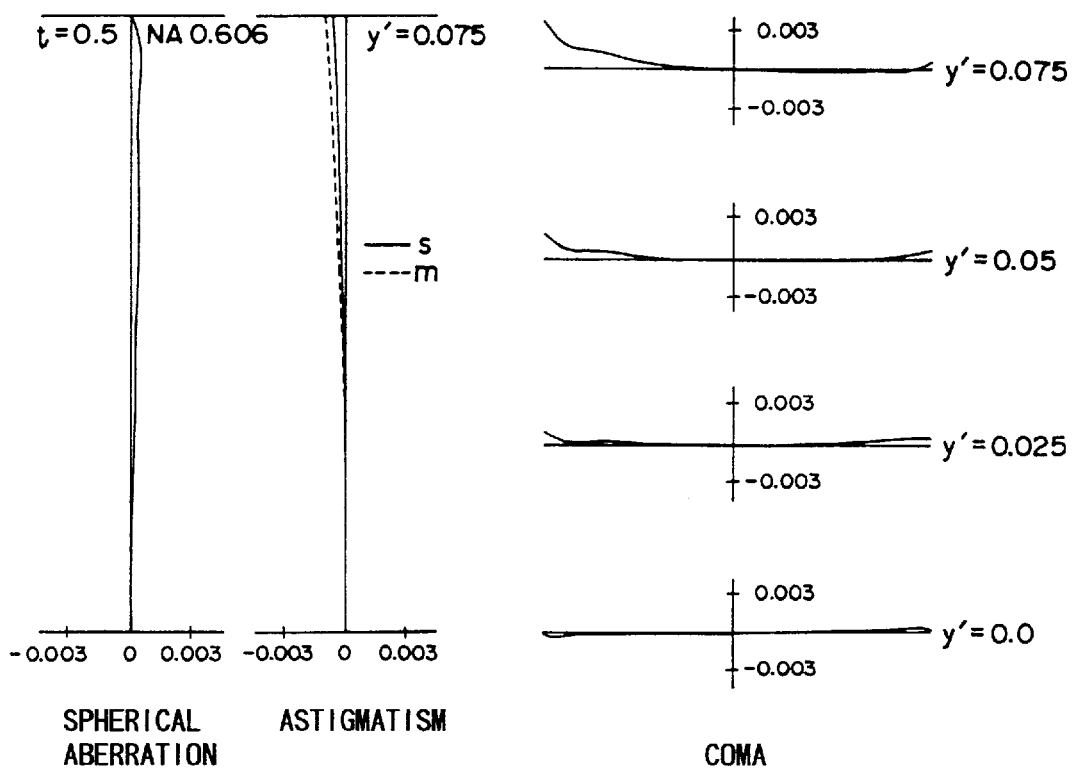

F I G. 4 1 B
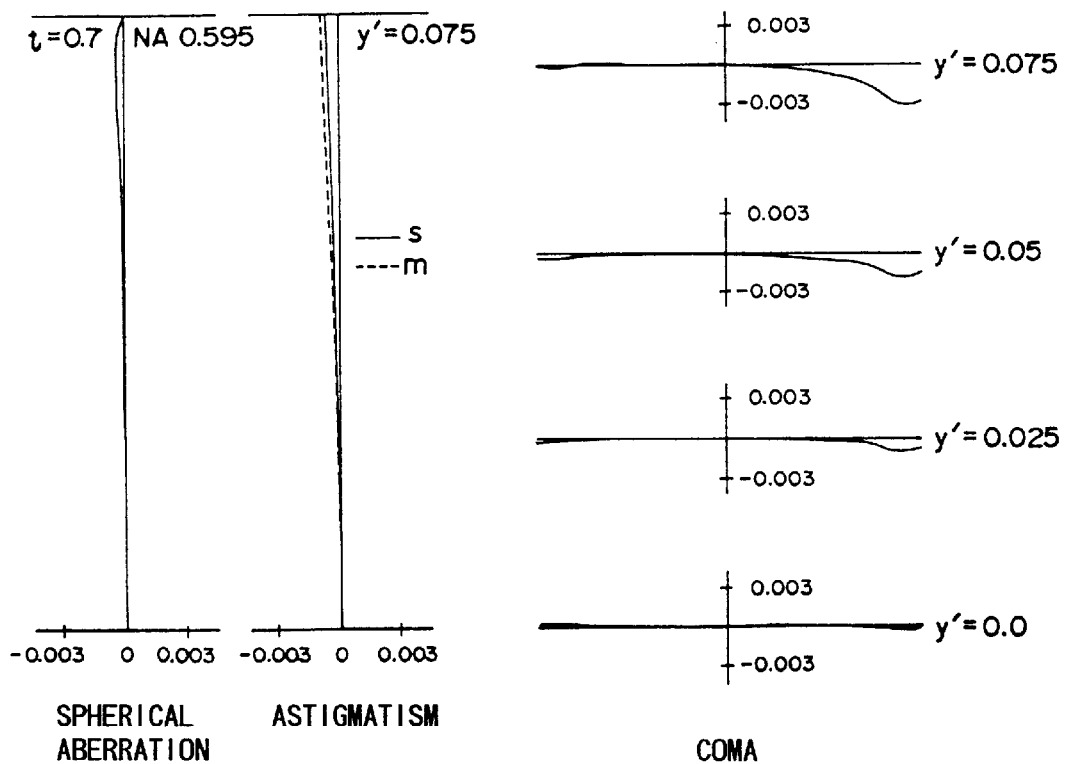

FIG. 42
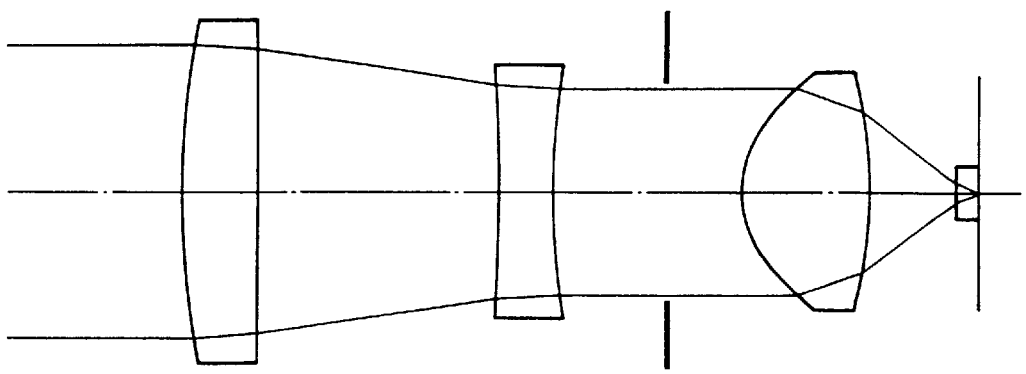
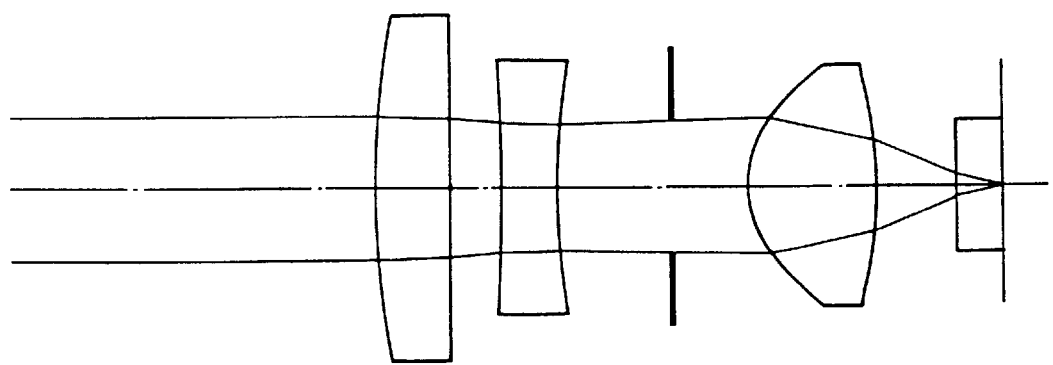

F I G. 4 3
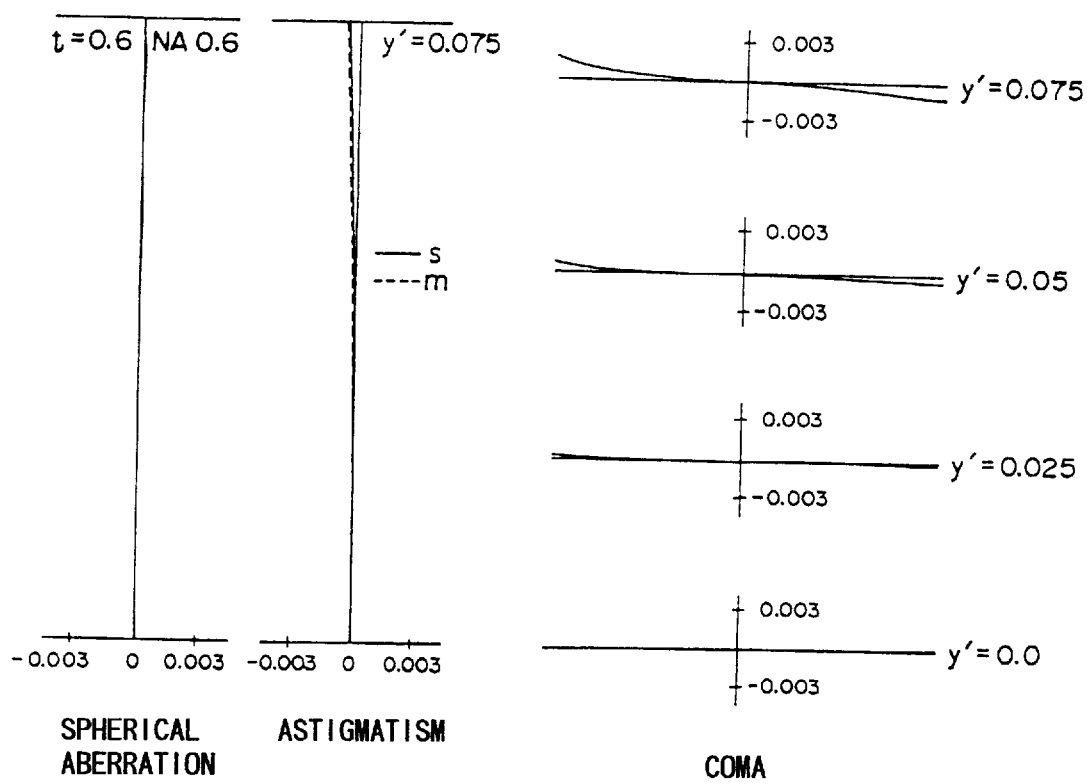

F I G. 4 4 A
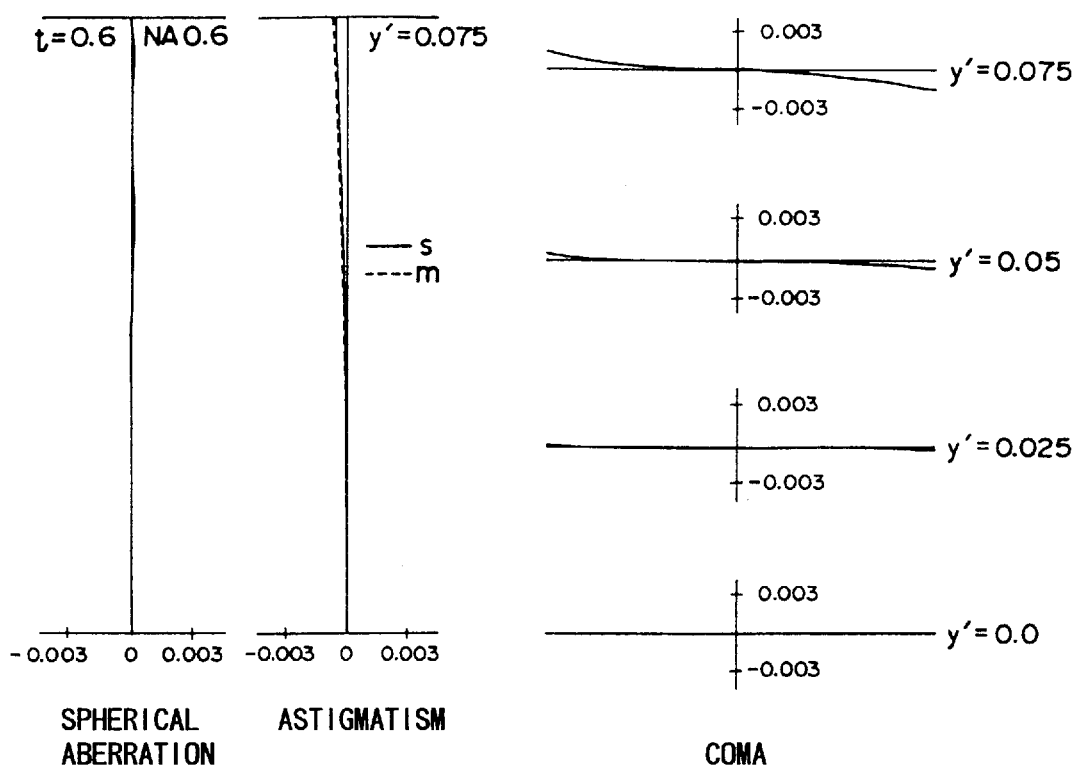

F I G. 4 4 B
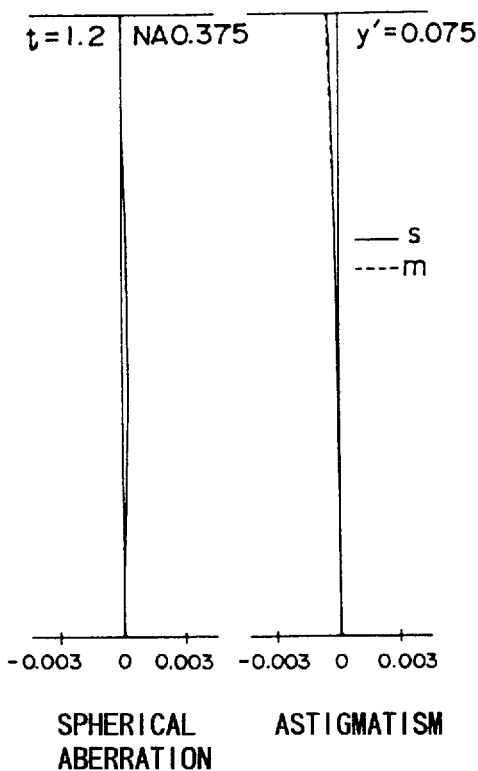
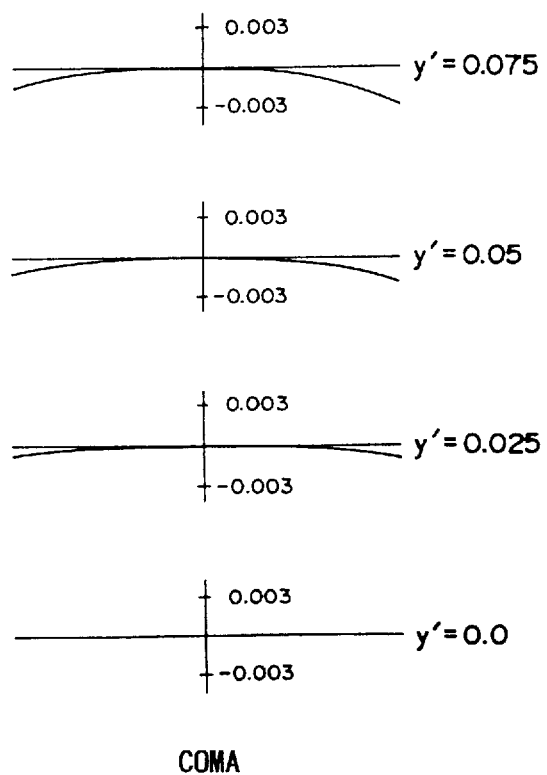

F I G. 4 5 B
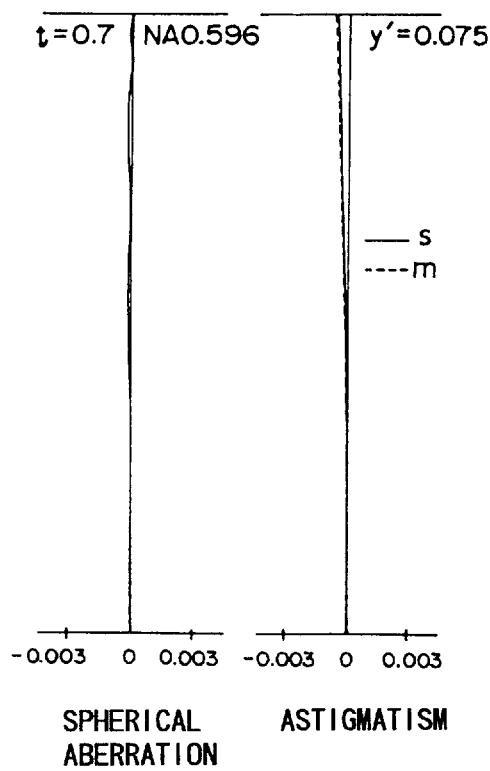
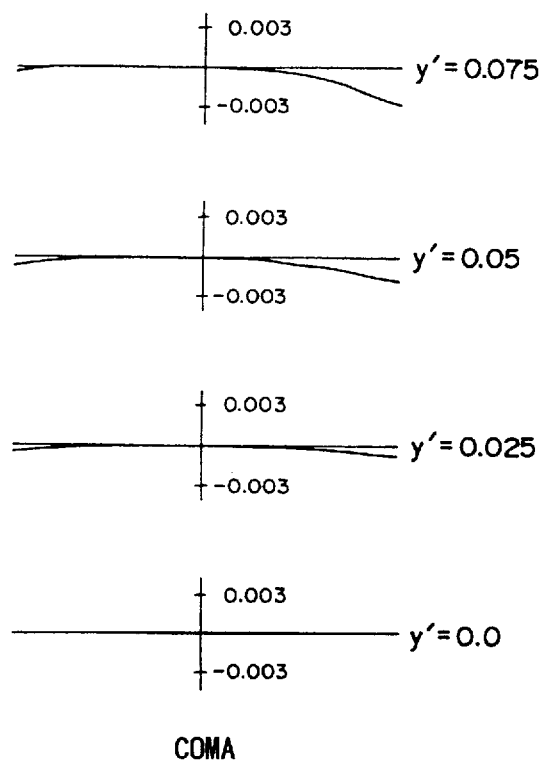

F I G. 4 6 A
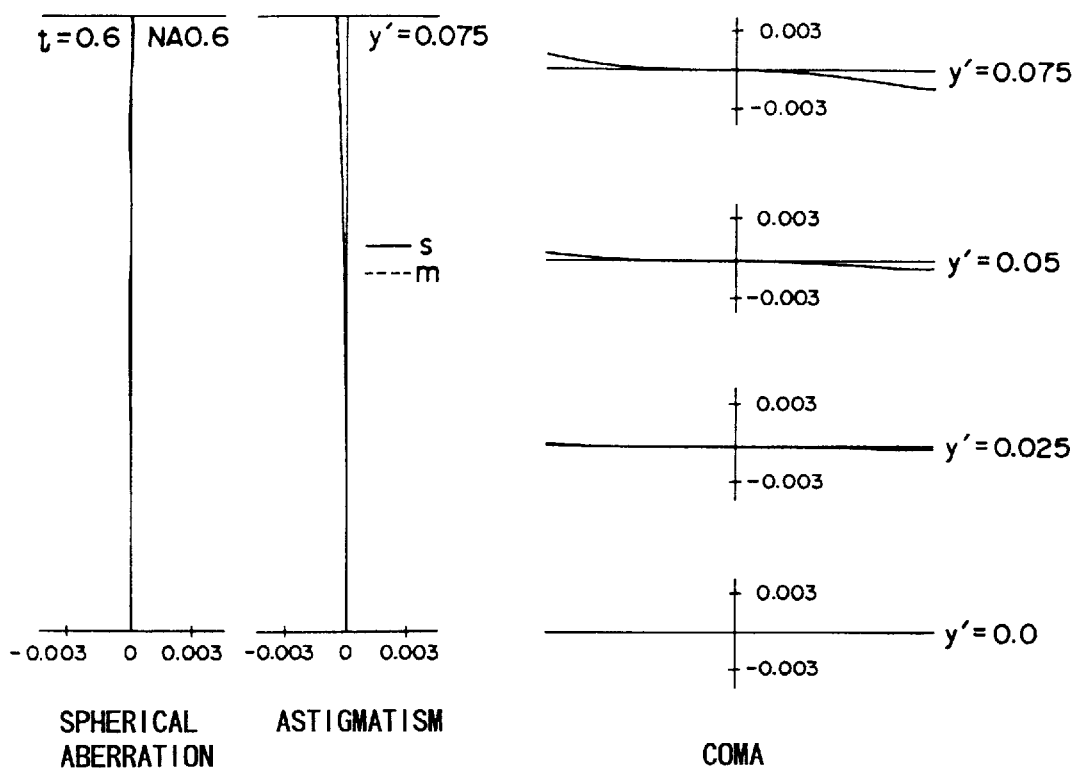

F I G. 4 6 B
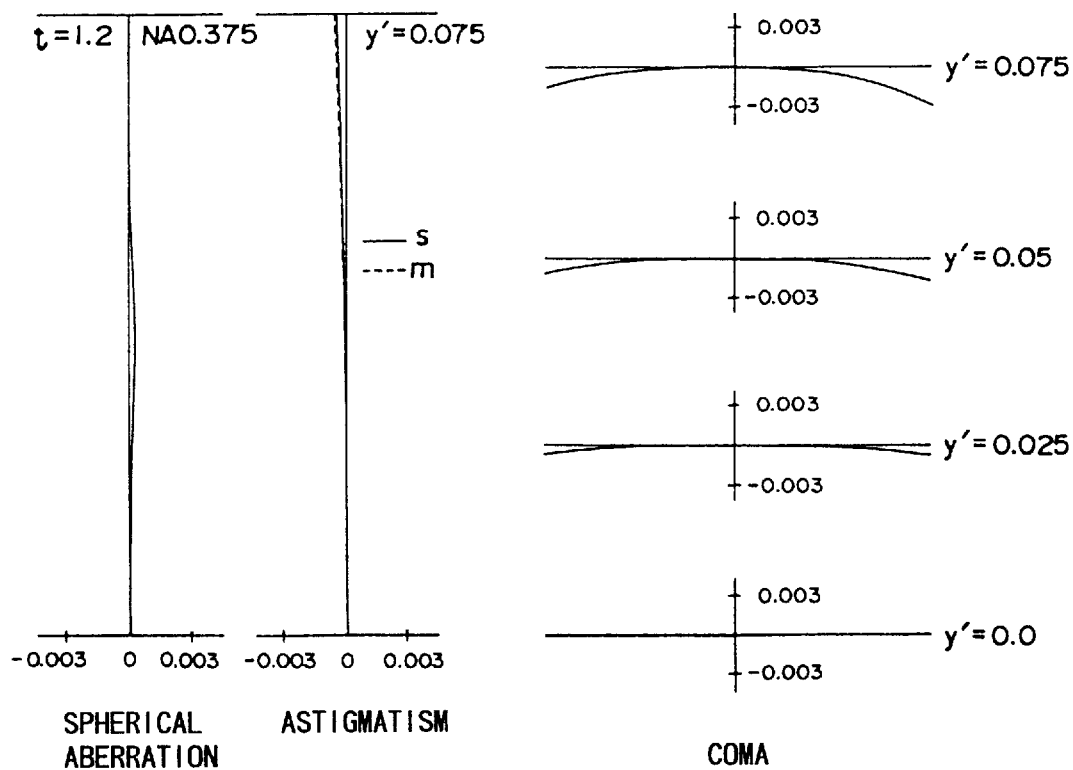

F I G. 4 7 B
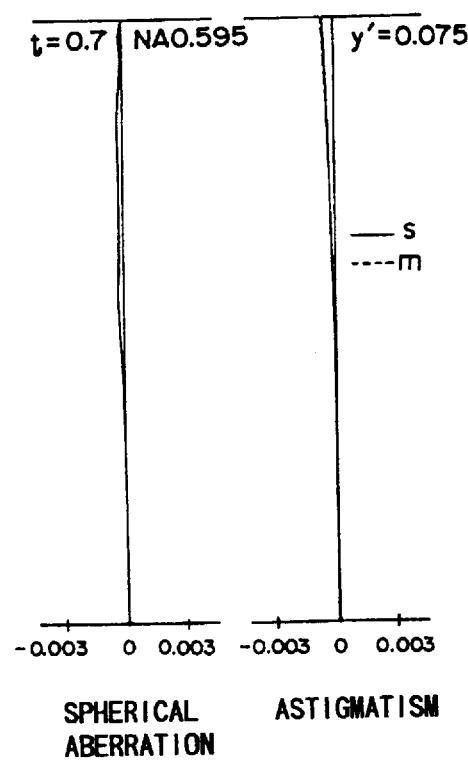
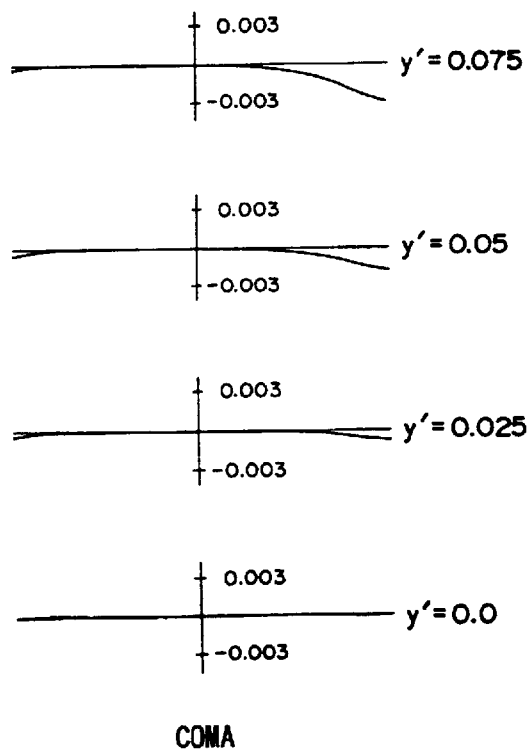

F I G. 4 8 A
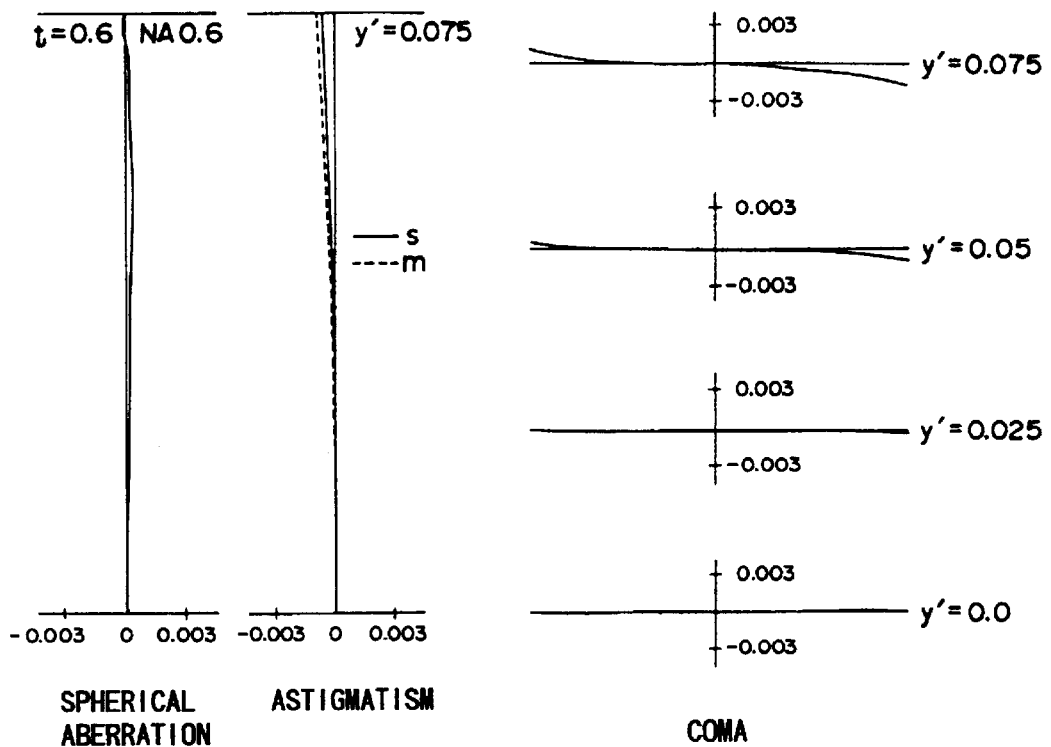

F I G. 4 8 B
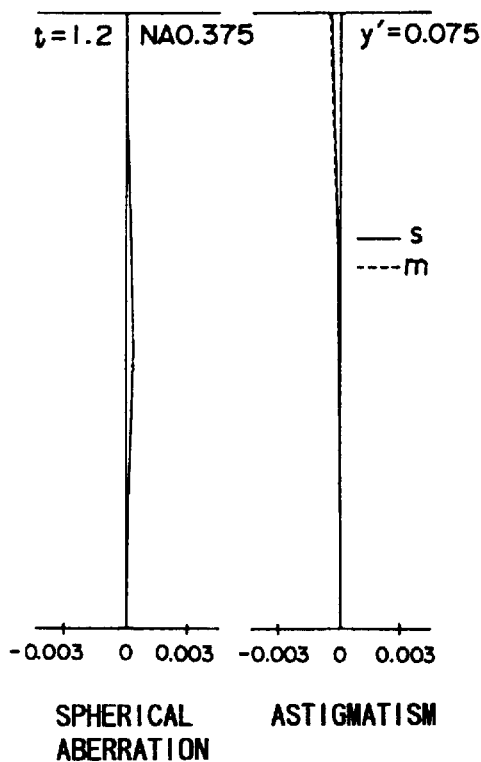
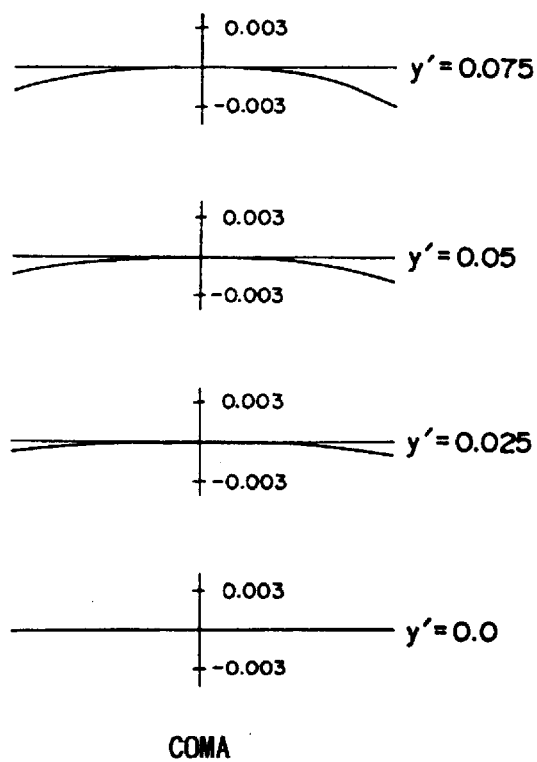

F I G. 50A
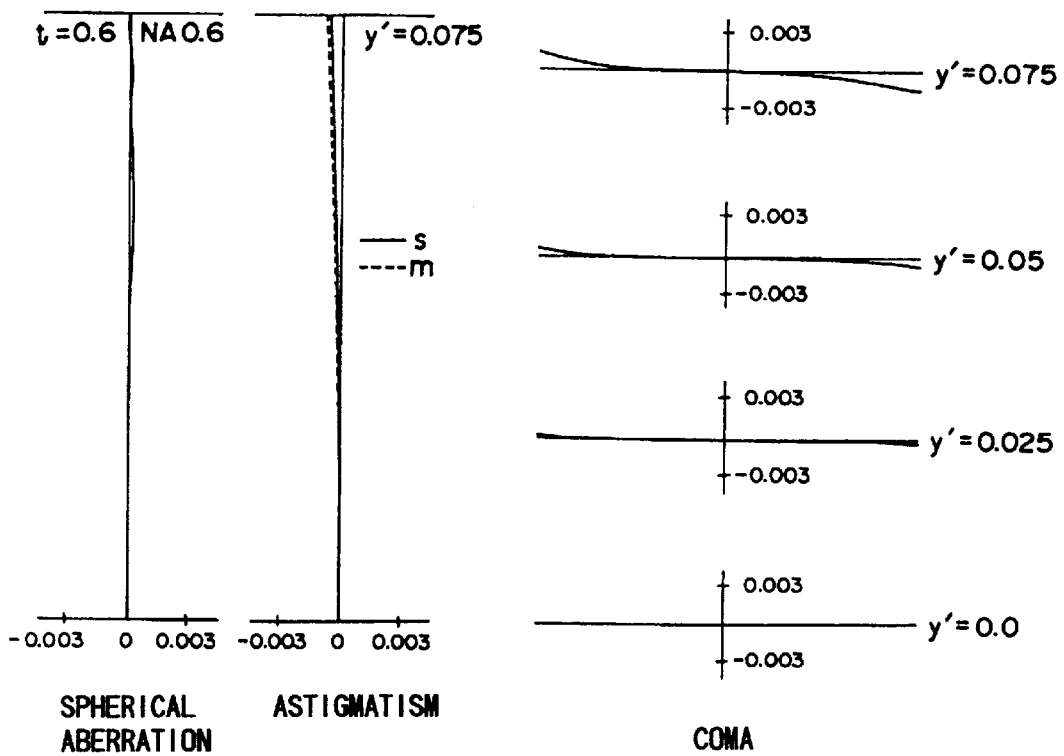

F I G. 5 1 A
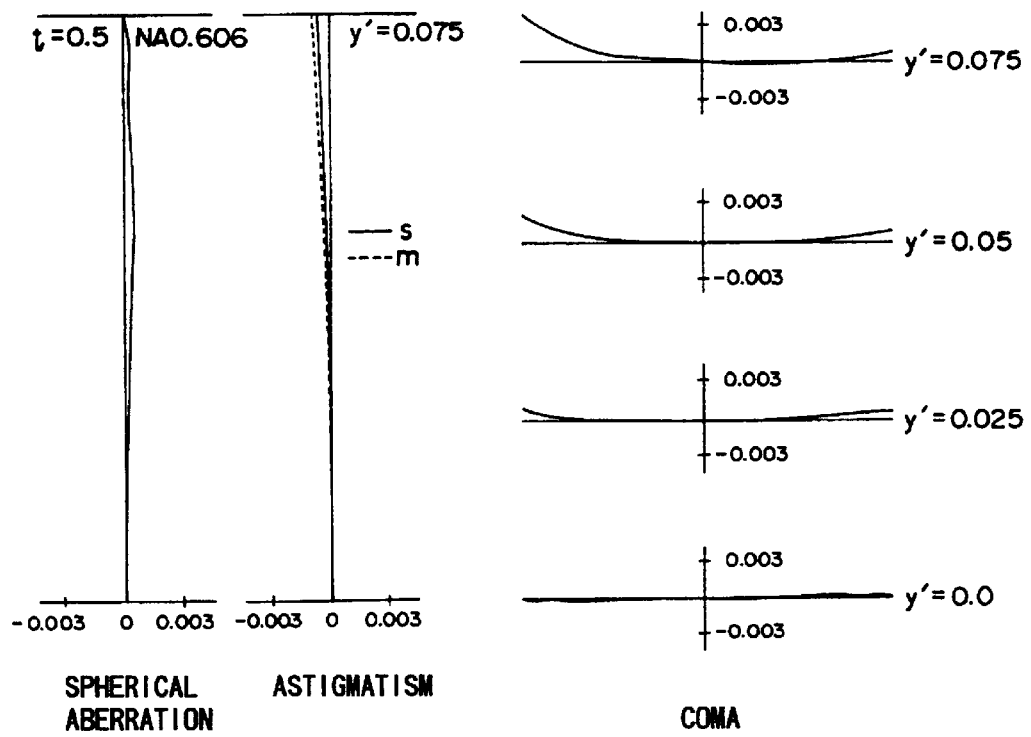

F I G. 5 1 B
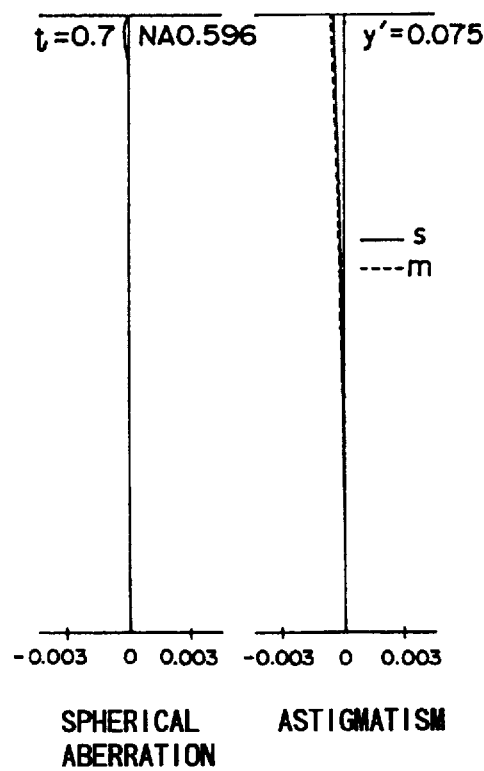
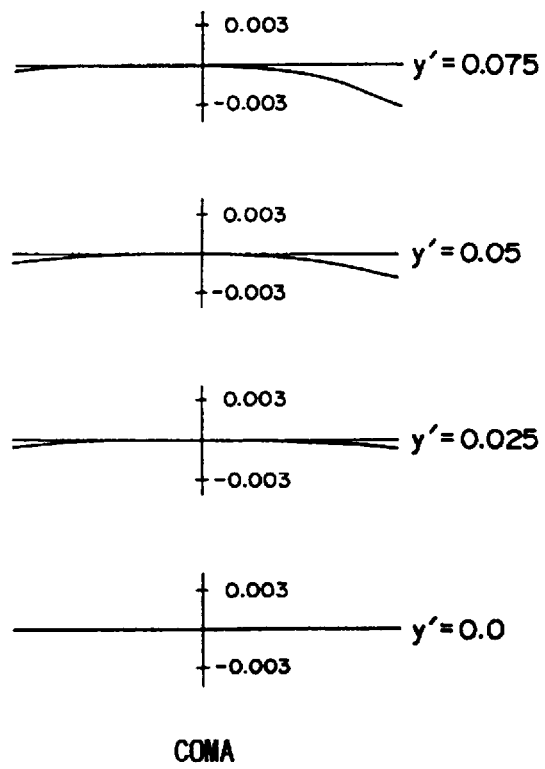

F I G. 5 2 A
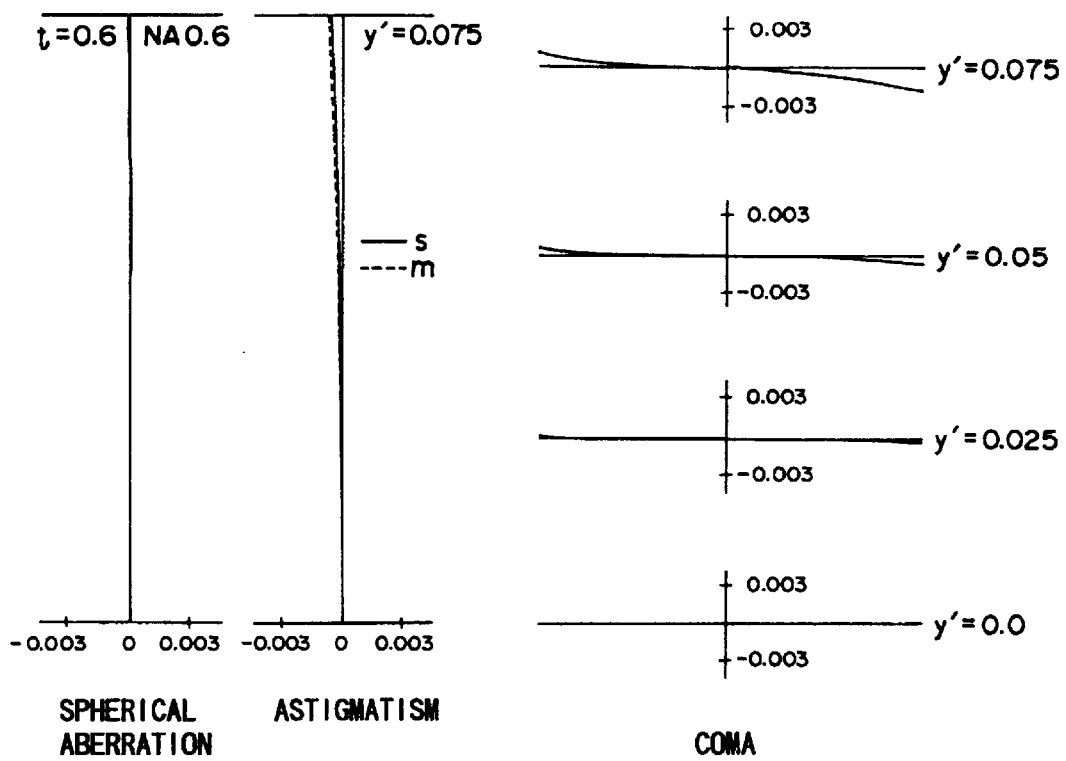

F I G. 5 2 B
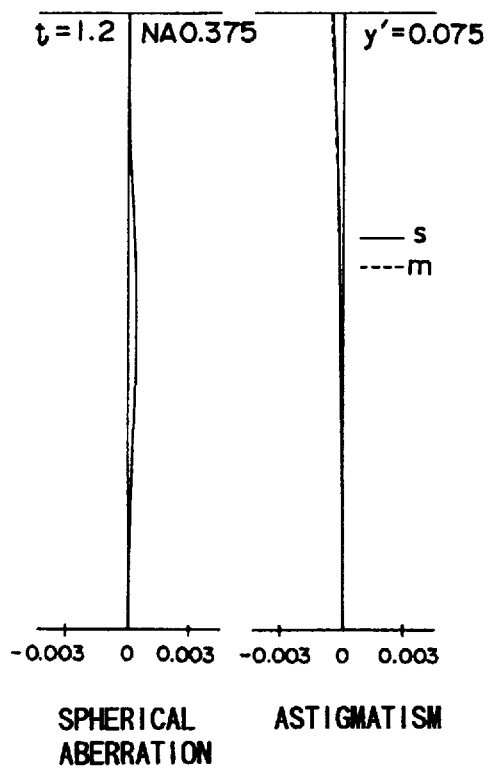
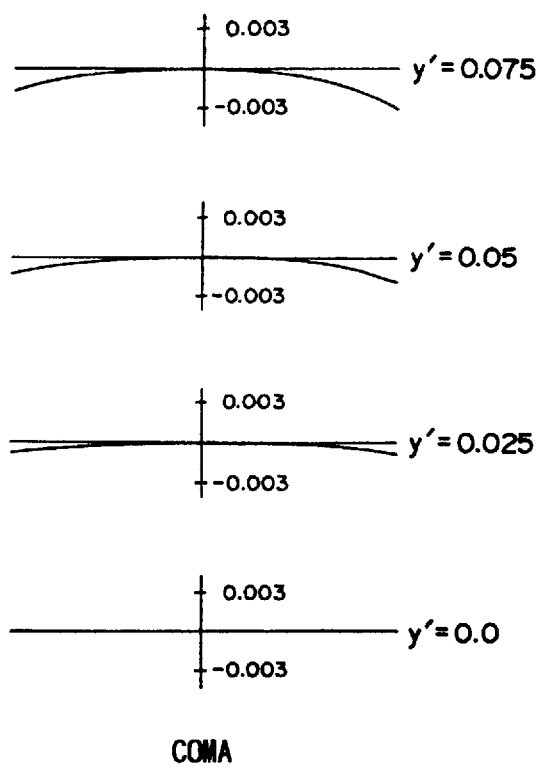

F I G. 5 3 A
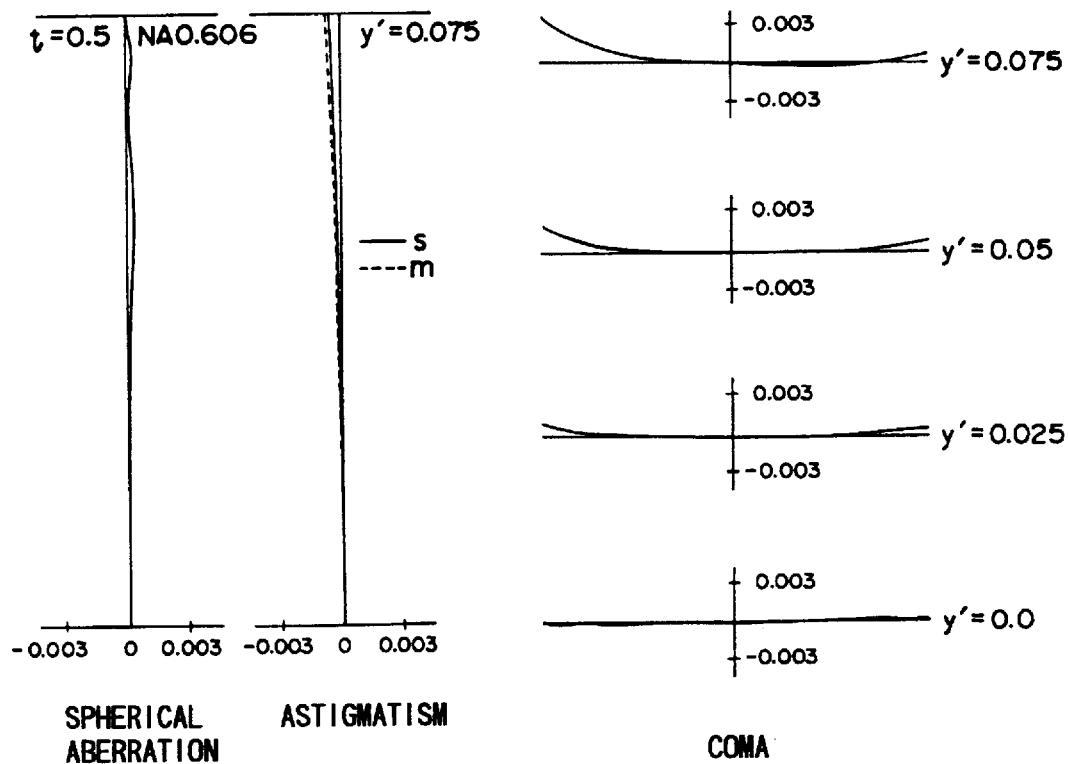

F I G. 53B
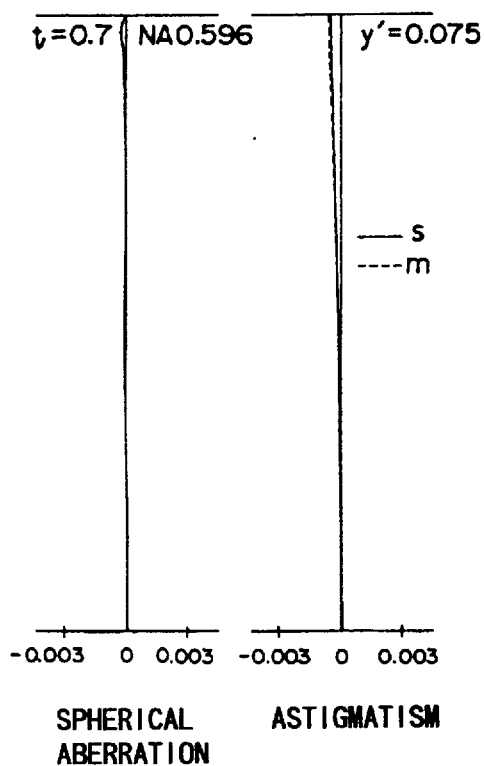
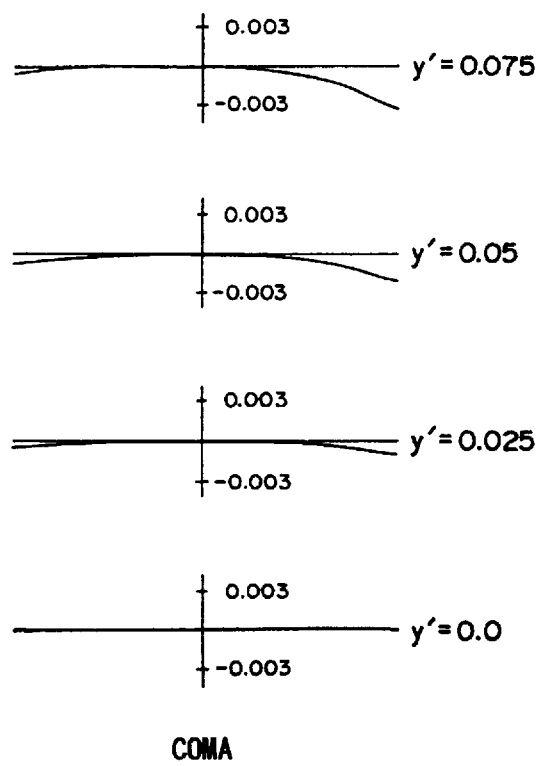

F I G. 5 5 A
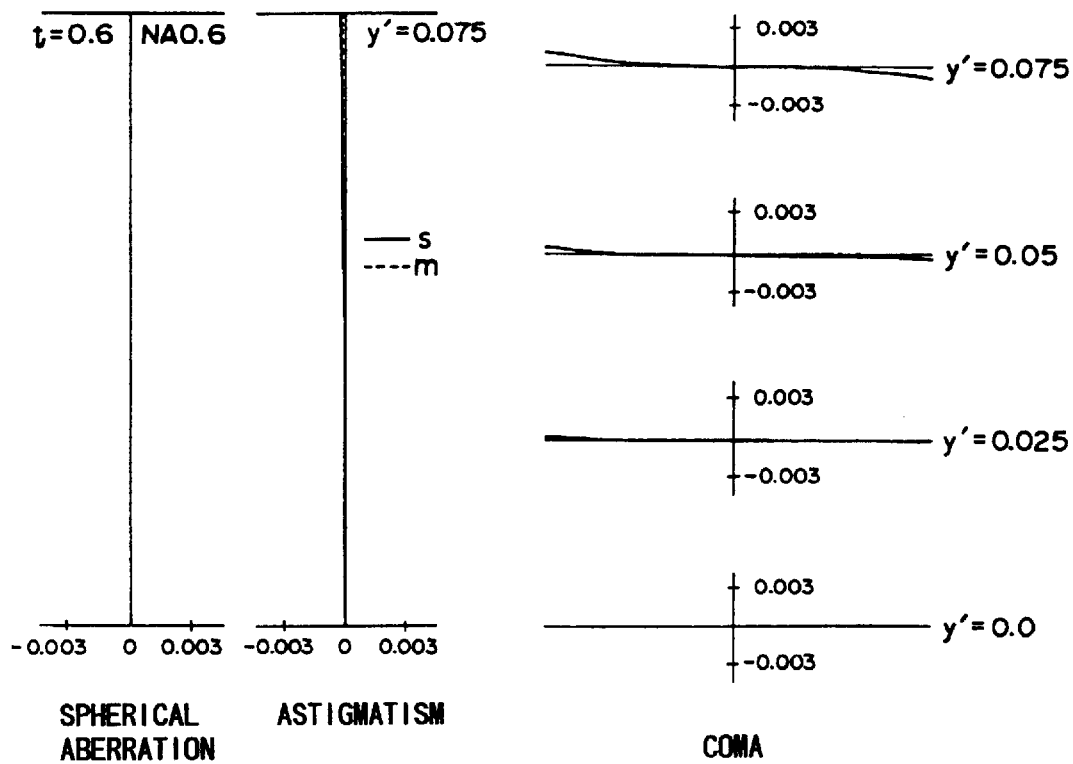

F I G. 5 5 B
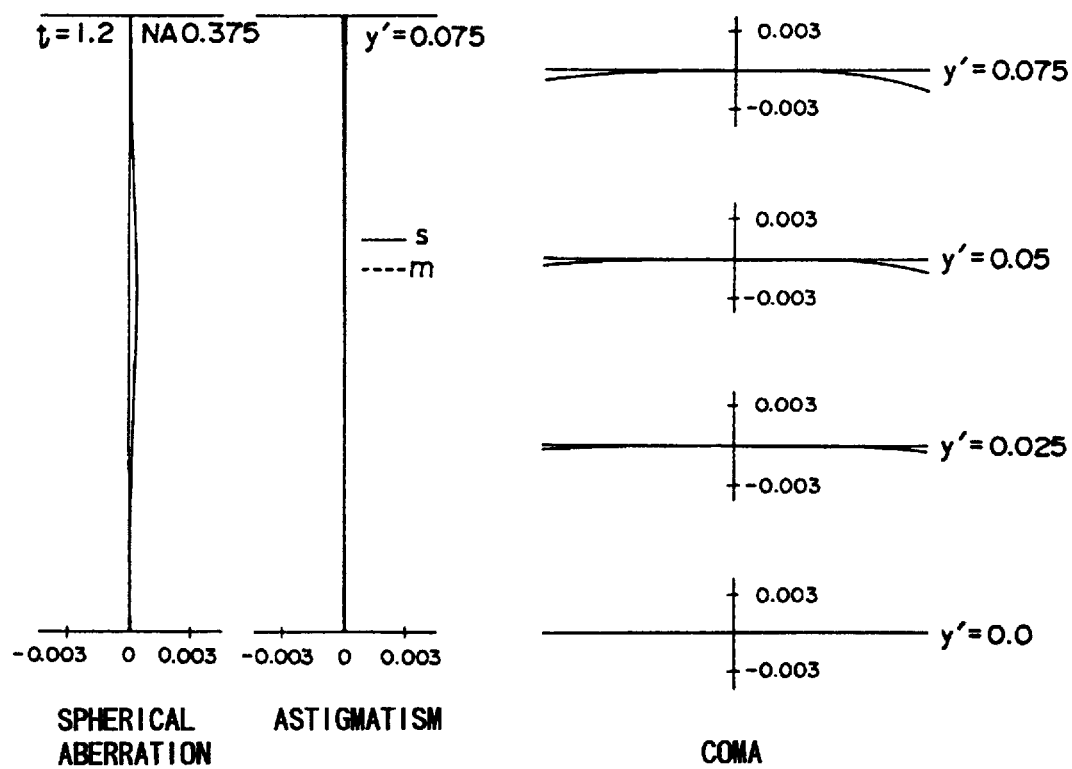

F I G. 5 6 A
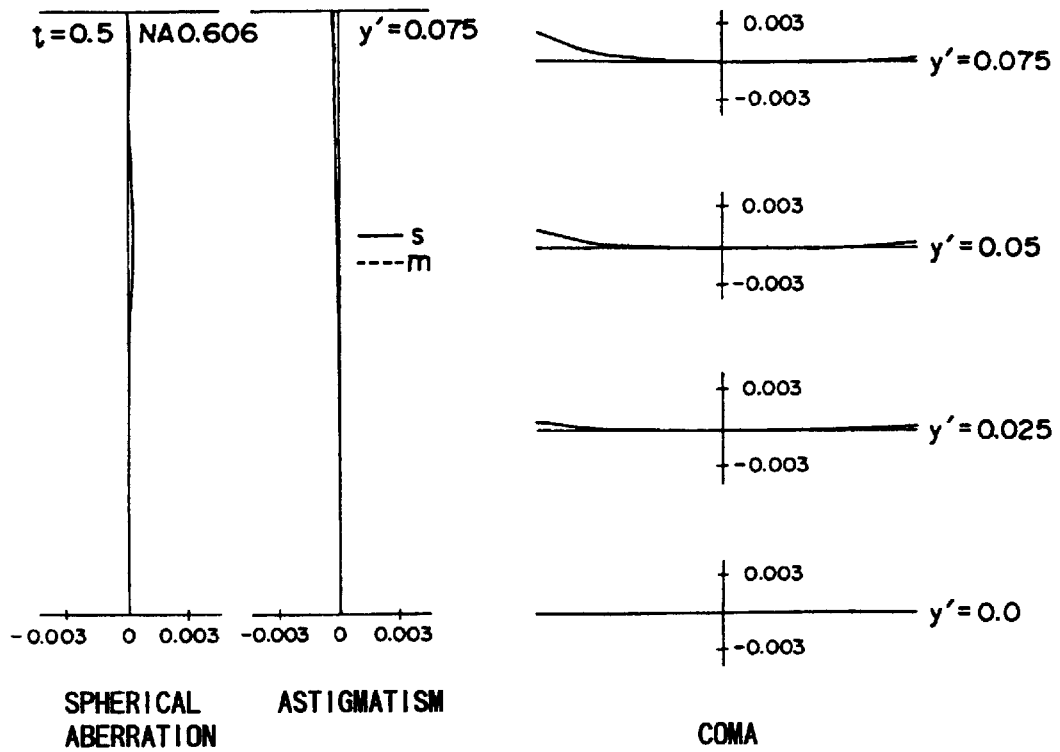

FIG. 56B
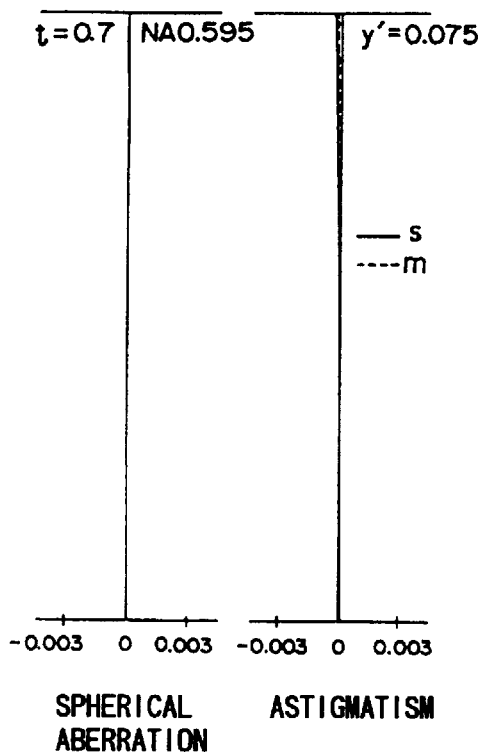
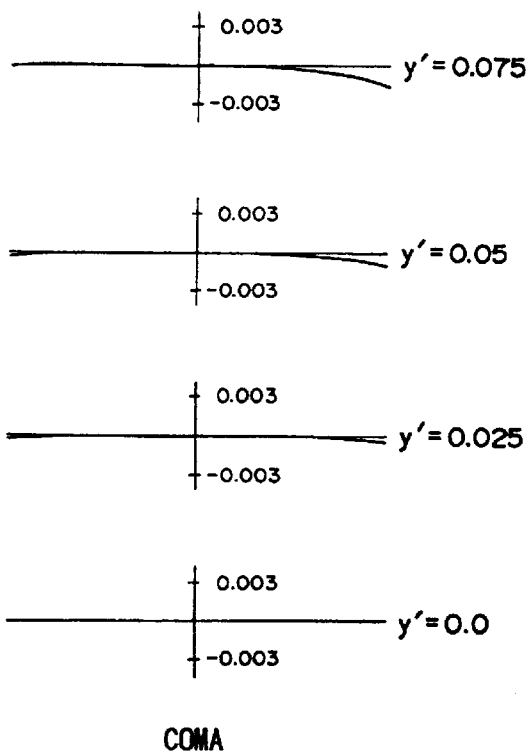

F I G. 5 7
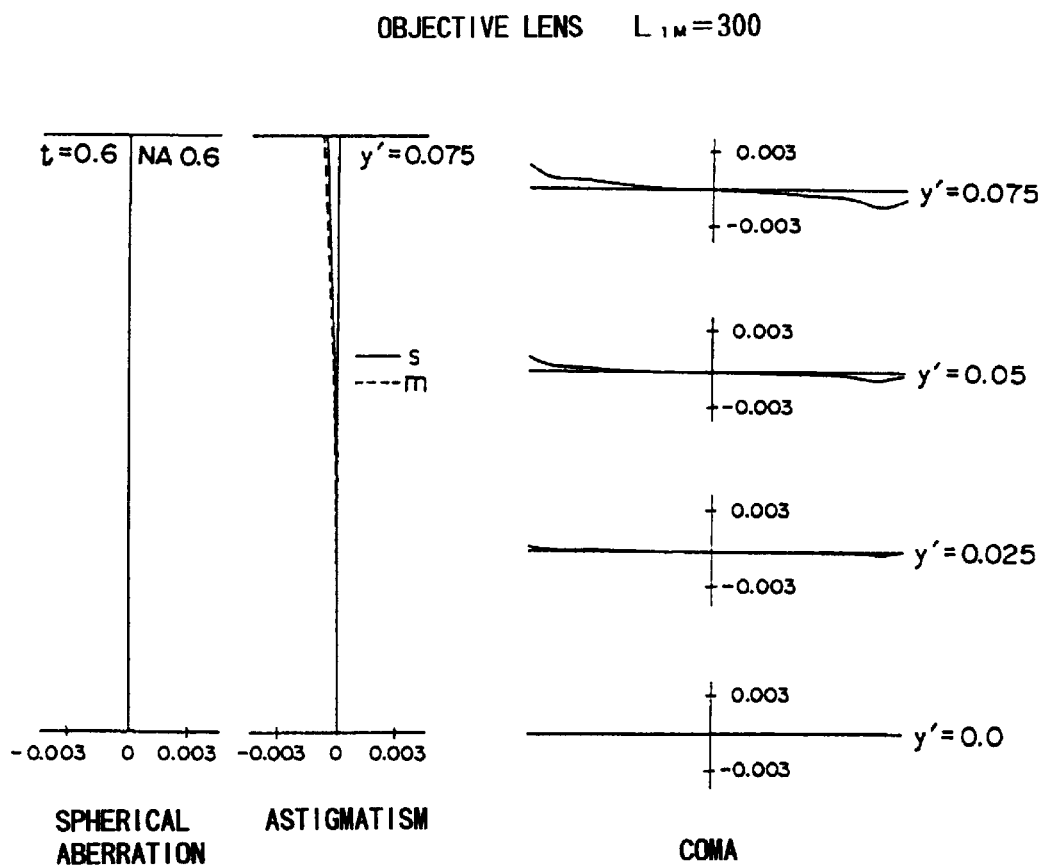

F I G. 5 8 B
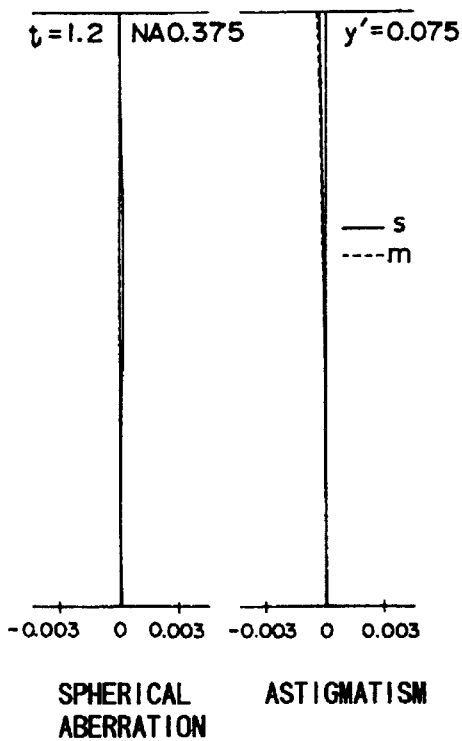
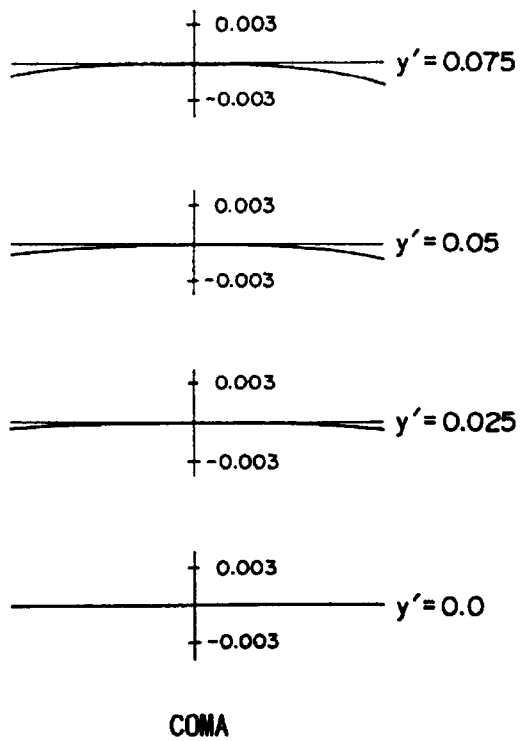

F I G. 5 9 B
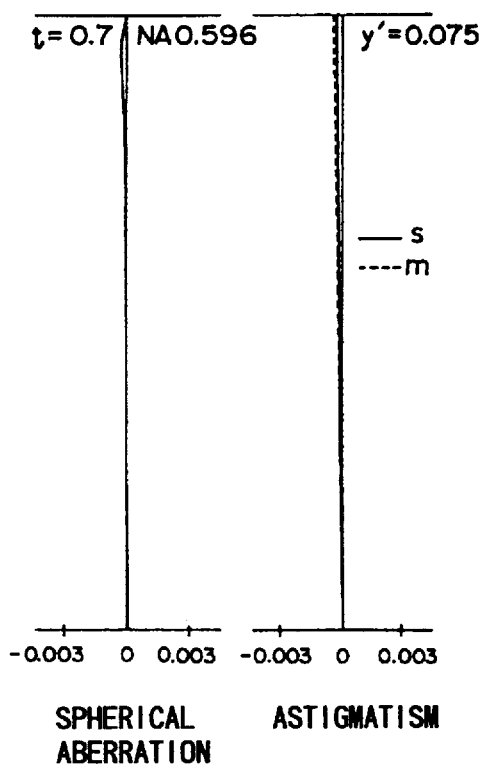
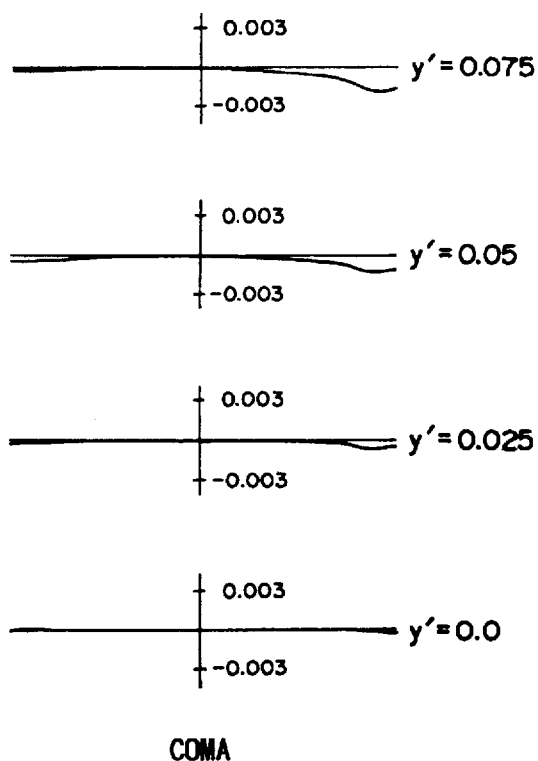

OPTICAL OBJECTIVE LENS SYSTEM WITH VARIABLE DISK THICKNESS FEATURE

BACKGROUND OF THE INVENTION

1. Field of the Invention

The present invention relates to an objective lens system that is suitable for recording and reproducing optical information on a mass optical information storage medium.

2. Description of the Related Art

An increase in NA of an objective lens is useful in the recording and reproducing of information on a high-density, mass storage optical information medium. An inclination of the optical axis increases aberrations of the lens system. A thinner optical disk advantageously works to prevent the aberrations. For this reason, attempts have been made to thin the optical disk. Compact disks (CD) now in widespread use are as thick as 1.2 mm. There is a need for an optical disk drive or disc player that is capable of recording and reproducing optical information on both the commercially available compact disk and a high-density optical disk (SD). Since a variation in the thickness of the disk gives rise to a large variation in the spherical aberration of the optical system, a single objective lens system is unable to compatibly work with both the compact disk (CD) and the high-density disk (SD).

Japanese Unexamined Patent Publication No. 7-198909 and Japanese Unexamined Patent Publication No. 7-98431 disclose multifocal methods that make use of holographic lens as an objective lens. The disclosed methods, however, suffer a drop in light quantity as a result of diffraction. Furthermore, Japanese Unexamined Patent Publication No. 7-153110 proposes a method in which the variation in the thickness of the disk is compensated by placing a correction plate having a negative aspheric surface between a collimator lens and an objective lens. According to this method, however, a plurality of correction plates corresponding to the number of disks having different thicknesses are needed, and a mechanism for mounting and dismounting the correction plates becomes accordingly complicated.

In another known method, a combined set of a disk and an objective lens is entirely replaced. According to this method, a plurality of sets are required to meet the number of disks of different thicknesses, and thus the drive is economically disadvantageous and complex in construction.

In this specification, hereinafter, the term "disk thickness" or "thickness of disk" is used to represent "thickness of transparent substrates" which increases optical path length of the systems.

SUMMARY OF THE INVENTION

Accordingly, it is an object of the present invention to provide an optical objective system with a variable disk thickness feature which, with its simple construction, offers excellent operational performance with no light quantity loss while complying with a number of disk thicknesses.

To achieve the above object, the optical objective system with a variable disk thickness feature of the present invention, in its first type, comprises a correction lens system having one or more lens elements, a positive objective lens and a disk arranged in that order from the side of a light source, in which one or more lens elements of the correction lens system are moved on optical axis to improve the aberration that has increased as a result of a variation in thickness of the disk and the objective lens is moved by a slight distance on the optical axis to be in-focus state in response to the movement of the image point resulting from the variation in the thickness of the disk, whereby the objective lens improves the aberration with a combination of a reference disk thickness and a reference object distance, in which the object distance $L_{IM}$ with respect to the objective lens is based on infinity light rays ($L_{IM}=\infty$) that are parallel light rays, finite light rays ($L_{IM}<0$) that are divergent light rays, or convergent light rays ($L_{IM}>0$).

According to the first type of the present invention, the correction lens system comprises a single positive lens element to divergent light rays from the light source, whereby the single positive lens element is moved toward the light source when the thickness of the disk increases, while the single positive lens element is moved toward image point when the thickness of the disk decreases.

According to the first type of the present invention, the following relationships are required, $$f_C > 5 f_M \quad\quad\quad 1$$

$$r_2 < 0 \quad\quad\quad 2$$

where $f_C$ represents the focal length of the single positive lens element, $f_M$ represents the focal length of the objective lens, and $r_2$ represents the radius of curvature of the single positive lens element at the image side.

According to the first type of the present invention, the correction lens system comprises two positive lens elements, whereby the following relationships are required, $$f_{CT} > 4 f_M \quad\quad\quad 3$$

$$r_2 < 0, r_4 < 0 \quad\quad\quad 4$$

where $f_{CT}$ represents the focal length of the compound lens of the two lens elements, $r_1$, $r_2$, $r_3$, and $r_4$ represent radii of curvature of the spherical surfaces of the compound lens in that order from the light source, and $f_M$ represents the focal length of the objective lens.

The following discussion describes why the aberration correction is successfully performed against the variation in the thickness of the disk. It is apparent to those skilled in the art that the variation in the thickness of the disk varies substantially the spherical aberration of the objective lens.

Explanation 1

The spherical aberration of the positive objective lens varies with the object distance derived from incident light rays. Referring to the aberration referenced to an object at infinity, the degree of the spherical aberration due to undercorrection increases as an object at a finite distance comes closer toward the positive objective lens. This effect is a near point variation in spherical aberration, and equally works in super infinity light rays.

Explanation 2

An under-correction in the spherical aberration takes place in a single or double positive lens elements in a correction lens system which receives divergent light rays coming in from an object at a finite distance that is a light source. The degree of spherical aberration varies slightly depending on the burden of refractive power between the light source side and the image side of the single positive lens element or of double positive lens elements.

The present invention has been developed by analyzing, organizing and reconstructing the above explanations. The objective lens has a high NA to facilitate recording and reproducing optical information on a mass optical information storage medium, a reference disk having a thin thickness is used, and every effort has been made to reduce the aberration to its minimum value possible by combining above both components. In this case, the light rays entering the objective lens are any of parallel light rays ($L_{IM}=\infty$) from an object at infinity, divergent light rays ($L_{IM}<0$) from an object at a finite distance and convergent light rays (super infinity light rays) ($L_{IM}>0$) traveling toward the image side of the objective lens.

Referring to FIGS. 1 and 19, the lens arrangement of the first type of the present invention is now discussed. When the objective lens is combined with the reference disk thickness, the focal length of the single or double positive lens elements and its distance to a light source are set such that an image point, which a single or double positive lens elements result in response to divergent light rays from the light source as an object point, is formed in the vicinity of the incident light rays that have been used during the design stage of the objective lens. For simplicity, suppose that the aberration in the combination of the objective lens and the reference disk thickness is corrected against parallel light rays from an object at infinity.

(a) Disk having a reference thickness

The light source is arranged such that it comes slightly external to the front focal point of the single or double positive lens elements being the correction lens system. This arrangement takes into consideration the spherical aberration of the under-correction of the single or double positive lens elements (refer to the above described explanation 2).

(b) Disk having a thickness thicker than the reference thickness

The spherical aberration suffers "over-correction." The spherical aberration is improved by moving the single or double positive lens elements on the optical axis so that the image point of the light source obtained through the single or double positive lens elements being the correction lens system becomes divergent light rays from the object point at the finite distance to the objective lens (Explanation 1). Specifically, the single or double positive lens elements are moved closer toward the light source, and thus their distance from the objective lens is widened accordingly. In this case, the spherical aberration of the single or double positive lens elements in the above-described explanation 2 need correcting as well.

(c) Disk having a thickness thinner than the reference thickness

The spherical aberration suffers under-correction. The spherical aberration is improved by moving the single or double positive lens elements on the optical axis so that the image point of the light source obtained through the single or double positive lens elements being the correction lens system becomes convergent light rays (super infinity light rays) ($L_{IM}>0$) traveling toward a point on the image side of the objective lens (Explanation 1). Specifically, the single or double positive lens elements are moved away from the light source, and thus their distance to the objective lens is narrowed accordingly. In this case, again, the spherical aberration of the single or double positive lens elements in the above-described explanation 2 need correcting as well.

The methods (a), (b) and (c) also work when an object distance that is a design criterion in the combination of the objective lens and the reference thickness disk is applied to divergent light rays ($L_{IM}<0$) from an object at a finite distance and when the object distance is applied to convergent light rays (super infinity light rays) ($L_{IM}>0$) traveling to an object on the image side of the objective lens.

According to the above-described methods, the spherical aberration is excellently corrected against the variation in the thickness of the disk of high density, mass storage and high NA. The variation in the thickness of the disk is preferably kept to within 20% of the reference value in high NA (SD) disk considering that coma is influenced in the course of correction and that performance is degraded in a tracking operation in which the objective lens shifts in perpendicular to the optical axis of the objective lens. For example, with NA=0.6 and the reference disk thickness of 0.6 mm, the variation is preferably kept to within ±0.12 mm.

When the above-described optical disc drive is used with a compact disk (CD), its operational wavelength is typically as long as 780 nm and NA is 0.45. When the high-density disk (SD) operates at a wavelength of 650 nm or 635 nm, NA required for the compact disk (CD) at a wavelength of 650 nm is $$NA_{CD}=0.45\times(650/780)=0.375$$

or at a wavelength of 635 nm $$NA_{CD}=0.45\times(635/780)=0.366$$

Even if the disk thickness is greatly changed from 0.6 mm to 1.2 mm, sufficiently high performance results. To this end, a diaphragm is preferably disposed in front of the single or double positive lenses or between the single or double positive lens elements and the objective lens.

The objective lens is moved by a slight distance on the optical axis in response to the variation in the image point of the entire system resulting from the variation in the disk thickness.

Discussed next is the conditional equation 1. In the first type of the present invention, no collimator lens is used, and the single positive lens element as the correction lens system functions as a collimator lens as well. The conditional equation 1 defines the relationship between the focal length of the single positive lens element and the focal length of the objective lens.

Let $f_C$ and $NA_C$ represent the focal distance and NA of the single positive lens element respectively, and $f_M$ and $NA_M$ represent the focal length and NA of the objective lens, respectively. If both have no aberration, the following relationship is required.

$$f_C/f_M=NA_M/NA_C$$

Specifically, with $NA_M=0.6$, $NA_C$ of the single positive lens element is given as $NA_C<0.12$ from the conditional equation 1, and the burden of NA on the light source side is prevented from being excessively large.

According to the conditional equation 2, performance drop due to the mutual eccentricity between the single positive lens element and the objective lens is prevented. Even when the objective lens moves (shifts) in perpendicular to its optical axis in the tracking operation, there will be no problem at all as long as the single positive lens element moves concurrently along with it. If the objective lens only is shifted in a simple design, performance drop due to eccentricity takes place. This varies depending on the burden of refractive power divided between the light source side and the image side of the single positive lens element. As the image side bears a smaller burden of refractive power, performance drop due to the shift of the objective lens increases. Outside the condition defined by the condition equation 2, the trend of performance drop is severer.

The conditional equation 3 applies to the correction lens system that comprises two positive lens as shown in FIG. 19. The use of the two positive lens elements increases NA on the light source side, permitting light quantity to increase. In the two-lens-element system, let $NA_{CT}$ represent NA of the moving lens. With the objective lens $NA_M=0.6$ from the equation $f_C/f_M=NA_M/NA_C$, NA on the light source side is increased within a range of $NA_{CT}<0.15$.

According to the conditional equation 4, performance drop due to the mutual eccentricity between the moving lens and the objective lens is prevented in the correction lens system that is constructed of double positive lens elements. In both of the two lens elements, performance drop due to the shifting of the objective lens is severer as positive refractive power on the image side surface weakens.

Outside the condition defined by the conditional equation 4, the trend of performance drop is severer.

Other embodiments are also possible without departing from the scope of the present invention. For example, the objective lens system may be constructed of a single or double positive lens elements and an aspheric surface may be used as the movable correction lens system to comply with the variation in the thickness of the disk, and thus NA on the light source is increased and the performance of the drive is increased. In this case, however, when the objective lens only shifts during the tracking operation, consideration should be given so that performance is maintained regardless of the mutual eccentricity between the movable lens and the objective lens.

The optical objective system of the present invention in its second type comprises, to parallel light rays coming in from a collimator, a first negative lens element, a second positive lens element, an objective lens, and a disk arranged in that order, whereby the first negative lens element and the second positive lens element constitute a correction lens system, and the aberration is improved by moving the first negative lens element and/or the second positive lens element on the optical axis, thus by modifying the distance on the optical axis between the first negative lens element and the second positive lens element and the objective lens is moved by a slight distance on the optical axis to be in-focus state in response to the movement of the image point resulting from the variation in the thickness of the disk.

According to the second type of the present invention, the distance on the optical axis between the first negative lens element and the second positive lens element, constituting the correction lens system, is shortened when the thickness of the disk increases, while the distance on the optical axis between the first negative lens element and the second positive lens element, constituting the correction lens system, is lengthened when the thickness of the disk decreased.

According to the second type of the present invention, the following relationships are required, $$-f_{C1} < f_{C2} \qquad 5$$

$$r_1 < 0 \qquad 6$$

$$1.3 \, r_2 < |r_3| \qquad 7$$

$$2 \, f_M < -f_{C1} \qquad 8$$

where $f_{C1}$ is the focal length of the first negative lens element, $f_{C2}$ is the focal length of the second positive lens element, $f_M$ is the focal length of the objective lens, and $r_1$, $r_2$, $r_3$, and $r_4$ are radii of curvature of the first negative lens element and the second positive lens element in that order.

The following discussion describes why the aberration correction is successfully performed against the variation in the thickness of the disk. It is apparent to those skilled in the art that the variation in the thickness of the disk varies substantially the spherical aberration of the objective lens.

Explanation 1

The spherical aberration of the positive objective lens varies with the object distance derived from incident light rays. Referring to the aberration referenced to an object at infinity, the degree of under-correction of the spherical aberration increases as an object at a finite distance comes closer toward the positive objective lens. This effect is a near point variation in spherical aberration, and equally works in super infinity light rays.

Explanation 3

The spherical aberration of the positive objective lens greatly varies with the variation in the thickness of the disk. As the thickness of the disk increases, the spherical aberration due to over-correction increases. As the thickness of the disk decreases, the spherical aberration due to under-correction increases. According to the explanation 1, the spherical aberration changes as the position of the object changes. The position of the object that offers a good spherical aberration exists for each of different disk thicknesses.

Explanation 4

When the distance on the optical axis between the first negative lens element and the second positive lens element in front of the objective lens is varied, the focal length of the compound lens of these two elements varies and the image point position changes as well.

The present invention has been developed by analyzing, organizing and reconstructing the above explanations.

The objective lens has a high NA to facilitate recording and reproducing optical information on a mass optical information storage medium, a reference disk having a thin thickness is used, and every effort has been made to reduce the aberration to its minimum value possible by combining above both components. In this case, the light rays entering the objective lens are any of parallel light rays ($L_{IM}=\infty$) from an object at infinity, divergent light rays ($L_{IM}<0$) from an object at a finite distance and convergent light rays (super infinity light rays) ($L_{IM}>0$) traveling toward an object on the image side of the objective lens.

Referring to FIG. 22, the lens arrangement of the second aspect of the present invention is now discussed. When the objective lens is combined with the reference disk thickness, the distance on the optical axis between the first negative lens element and the second positive lens element is determined such that the image point, which the first negative lens element and the second positive lens element form on receiving the parallel light rays from the collimator, is formed in the vicinity of the object distance that has been used during the design stage of the objective lens.

In this case, the distance on the optical axis between the second positive lens element and the objective lens is not very important. For simplicity, suppose that the aberration in the combination of the objective lens and the reference disk thickness is corrected against parallel light rays from an object at infinity.

(a) Disk having a reference thickness

The distance on the optical axis between the first negative lens element and the second positive lens element is set so that the back focal point of the first negative lens and the front focal point of the second positive lens approximately agree.

(b) Disk having a thickness thicker than the reference thickness

The spherical aberration suffers over-correction. By shortening the distance on the optical axis between the first negative lens element and the second positive lens element, the parallel light rays from the collimator enter the objective lens in the form of divergent light rays from an object at a finite distance.

The distance on the optical axis between the first negative lens element and the second positive lens element is set such that the image point is in the vicinity of the object distance of the objective lens that presents a good spherical aberration with the disk thickness described in the explanation 3. In this case, the first negative lens element may be moved closer to the image side, the second positive lens element may be moved closer to the light source side, or both the first negative lens element and the second positive lens element may be moved on the optical axis.

(c) Disk having a thickness thinner than the reference thickness

The spherical aberration suffers under-correction. By widening the distance on the optical axis between the first negative lens element and the second positive lens element, the parallel light rays from the collimator are changed to convergent light rays (super infinity light rays) ($L_{IM}>0$) that are going to propagate to a point on the image side of the objective lens and then enter the objective lens. According to the explanation 3, the distance on the optical axis between the first negative lens element and the second positive lens element is set such that the image point is in the vicinity of the object distance of the objective lens that presents a good spherical aberration with the disk thickness described in the explanation 3. In this case, the first negative lens element may be moved closer to the light source side, the second positive lens element may be moved closer to the image side, or both the first negative lens element and the second positive lens element may be moved on the optical axis.

The methods (a), (b) and (c) also work when an object distance that is a design criterion in the combination of the objective lens and the reference thickness disk is applied to divergent light rays ($L_{IM}<0$) from an object at a finite distance and when the light distance is applied to convergent light rays (super infinity light rays) ($L_{IM}>0$) traveling to an object on the image side of the objective lens.

According the above-described methods, the spherical aberration is excellently corrected against the variation in the thickness of the disk of high density, mass storage and high NA. The variation in the thickness of the disk is preferably kept to within 20% of the reference value in high NA (SD) disk considering that coma is influenced in the course of correction and that performance is degraded in a tracking operation in which the objective lens shifts in perpendicular to the optical axis of the objective lens. For example, with NA=0.6 and the reference disk thickness of 0.6 mm, the variation is preferably kept to within ±0.12 mm.

When the drive is used with a compact disk (CD), its operational wavelength is typically as long as 780 nm and NA is 0.45. When the high-density disk (SD) operates at a wavelength of 650 nm or 635 nm, NA required for the compact disk (CD) at a wavelength of 650 nm is $$NA_{CD}=0.45\times(650/780)=0.375$$

or at a wavelength of 635 nm $$NA_{CD}=0.45\times(635/780)=0.366$$

Even if the disk thickness is greatly changed from 0.6 mm to 1.2 mm, sufficiently high performance results. To this end, a diaphragm is preferably disposed in front of the first negative lens element or between the first negative lens element and the second positive lens element, or between the second positive lens element and the objective lens.

The objective lens is moved by a slight displacement on the optical axis in response to the variation in the image point of the entire system resulting from the variation in the disk thickness.

Discussed next is the conditional equation 5. The conditional equation 5 defines the relationship between the focal lengths of the first negative lens element and second positive lens element. If the objective lens is combined with a small disk thickness on SD with the aberration reduced to its minimum value possible in this combination, overcorrection will take place in the aberration on CD, which has an increased thickness. For this reason, light rays entering the objective lens from an object at a finite distance must be divergent light rays. If an attempt is made to achieve this purpose beyond the range defined by the conditional equation 5, the distance on the optical axis between the first negative lens element and the second positive lens element will go negative, and this is impossible to achieve.

The conditional equation 6 defines the negative radius of curvature of the first surface of the first negative lens element that receives the parallel light rays from the collimator. This is to prevent the performance drop which is due to the mutual eccentricity between the converter, namely, the correction lens system composed of the first negative lens element and second positive lens element, and the objective lens. When the objective lens moves (shifts) in perpendicular to its optical axis in the tracking operation, there will be no problem at all as long as the converter composed the first negative lens element and second positive lens element moves concurrently along with it. If the objective lens only is shifted in a simple design, performance drop due to eccentricity takes place. The performance drop is particularly severe when the refractive power of the first surface of the first negative lens element goes positive.

The conditional equation 7 defines the positive refractive power of the air lens formed by the image side surface of the first negative lens element and the light source side surface of the second positive lens element. Because of this positive refractive power, the divergent effect takes place between both surfaces. Like the conditional equation 6, the conditional equation 7 specifies the condition that should be observed to prevent the performance from dropping due to the mutual eccentricity between the converter, namely the correction lens system composed of the first negative lens element and second positive lens element, and the objective lens. Beyond the condition specified by the equation 7, the trend of performance drop due to eccentricity is more noticeable when the objective lens moves (shifts) in perpendicular to the optical axis of the objective lens in the tracking operation.

The conditional equation 8 defines the relationship of the focal lengths of the first negative lens element and the objective lens. When the first negative lens element and second positive lens element have large refractive powers, with the absolute value of their sum being small, the required change in the distance on the optical axis between two lens remains small against the variation in the disk thickness, and a compact design can thus be implemented. When the parallel light rays (infinite light rays) from the collimator pass through the converter, namely the correction lens system composed of the first negative lens element and second positive lens element, and enter the objective lens, the following equation is required.

$$-f_{C1}/f_M=NA_M/NA_{C1}$$

where $f_{C1}$ and $NA_{C1}$ are the focal length and NA of the first negative lens element and $f_M$ and $NA_M$ are the focal length and NA of the objective lens. The conditional equation 8 specifies that $NA_{C1}$ of the first negative lens element is smaller than half $NA_M$ of the objective lens. For example, when the objective lens has $NA_M=0.6$, the first negative lens element has $NA_{C_1}$ smaller than 0.3. Outside the condition of this equation, NA of the first negative lens element gets excessively large, increasing the spherical aberration.

Embodiments are also possible without departing from the scope of the present invention. For example, the performance may be further enhanced by inserting an aspheric surface into the movable converter that is the correction lens system composed of the first negative lens element and second positive lens element. In this case, however, when the objective lens only shifts during the tracking operation, consideration should be given so that performance is maintained regardless of the mutual eccentricity between the converter and the objective lens.

The optical objective system of the present invention in its third type comprises, to parallel light rays coming in from a collimator, a first positive lens element, a second negative lens element, an objective lens, and a disk arranged in that order, whereby the first positive lens element and the second negative lens element constitute a correction lens system, and the aberration is improved by moving the first positive lens element and/or the second negative lens element on the optical axis, thus by modifying the distance on the optical axis between the first positive lens element and the second negative lens element, and the objective lens is moved by a slight distance on the optical axis to be in-focus state in response to the movement of the image point resulting from the variation in the thickness of the disk.

According to the third type of the present invention, the distance on the optical axis between the first positive lens element and the second negative lens element, constituting the correction lens system, is shortened when the thickness of the disk increases, while the distance on the optical axis between the first positive lens element and the second negative lens element, constituting the correction lens system, is lengthened when the thickness of the disk decreased.

According to the third type of the present invention, the following relationships are required, $f_{C1} > -f_{C2}$     9

$1/r_1 + 1/r_2 > 0$     10

$1/f_{C2} < 1/r_3 < 0$     11

$3.4\, f_M < -f_{C2}$     12 where $f_{C1}$ is the focal length of the first positive lens element, $f_{C2}$ is the focal length of the second negative lens element, $f_M$ is the focal length of the objective lens, and $r_1$, $r_2$, $r_3$, and $r_4$ are radii of curvature of the first positive lens element and the second negative lens element in that order.

The following discussion describes why the aberration correction is successfully performed against the variation in the thickness of the disk. It is apparent to those skilled in the art that the variation in the thickness of the disk varies substantially the spherical aberration of the objective lens.

Explanation 1

The spherical aberration of the positive objective lens varies with the object distance derived from incident light rays. Referring to the aberration referenced to an object at infinity, the degree of under-correction of the spherical aberration increases as an object at a finite distance comes closer toward the positive objective lens. This effect is a near point variation in spherical aberration, and equally works in super infinity light rays.

Explanation 3

The spherical aberration of the positive objective lens greatly varies with the variation in the thickness of the disk.

As the thickness of the disk increases, the spherical aberration due to over-correction increases. As the thickness of the disk decreases, the spherical aberration due to under-correction increases. According to the explanation 1, the spherical aberration changes as the position of the object changes. The position of the object that offers a good spherical aberration exists for each of different disk thicknesses.

Explanation 5

When the distance on the optical axis between the first positive lens element and the second negative lens element is varied, the focal length of the compound lens of these two elements varies and the image point position changes as well.

The present invention has been developed by analyzing, organizing and reconstructing the above explanations.

The objective lens has a high NA to facilitate recording and reproducing optical information on a mass optical information storage medium, a reference disk having a thin thickness is used, and every effort has been made to reduce the aberration to its minimum value possible by combining above both components. In this case, the light rays entering the objective lens are any of parallel light rays ($L_{IM}=\infty$) from an object at infinity, divergent light rays ($L_{IM}<0$) from an object at a finite distance and convergent light rays (super infinity light rays) ($L_{IM}>0$) traveling toward the image side of the objective lens.

Referring to FIG. 42, the lens arrangement of the third type of the present invention is now discussed. When the objective lens is combined with the reference disk thickness, the distance on the optical axis between the first positive lens element and the second negative lens element is determined such that the image point, which the first positive lens element and the second negative lens element form receiving the parallel light rays from the collimator, is formed in the vicinity of the object distance that has been used during the design stage of the objective lens.

In this case, the distance on the optical axis between the second negative lens element and the objective lens is not very important. For simplicity, suppose that the aberration in the combination of the objective lens and the reference disk thickness is corrected against parallel light rays from an object at infinity.

(a) Disk having a reference thickness

The distance on the optical axis between the first positive lens element and the second negative lens element is set so that the back focal point of the first positive lens and the front focal point of the second negative lens approximately agree.

(b) Disk having a thickness thicker than the reference thickness

The spherical aberration suffers over-correction. By shortening the distance on the optical axis between the first positive lens element and the second negative lens element, the parallel light rays from the collimator enter the objective lens in the form of divergent light rays from an object at a finite distance.

The distance on the optical axis between the first positive lens element and the second negative lens element is set such that the image point is in the vicinity of the object distance of the objective lens that presents a good spherical aberration with the disk thickness described in the explanation 3. In this case, the first positive lens element may be moved closer to the image side, the second negative lens element may be moved closer to the light source side, or both the first positive lens element and the second negative lens element may be moved on the optical axis.

(c) Disk having a thickness thinner than the reference thickness

The spherical aberration suffers under-correction. By widening the distance on the optical axis between the first positive lens element and the second negative lens element, the parallel light rays from the collimator are changed to convergent light rays (super infinity light rays) ($L_{IM}>0$) that are going to propagate to a point on the image side of the objective lens and then enter the objective lens. According to the explanation 3, the distance on the optical axis between the first positive lens element and the second negative lens element is set such that the image point is in the vicinity of the object distance of the objective lens that presents a good spherical aberration with the disk thickness described in the explanation 3. In this case, the first positive lens element may be moved closer to the light source side, the second negative lens element may be moved closer to the image side, or both the first positive lens element and the second negative lens element may be moved on the optical axis.

The methods (a), (b) and (c) also work when an object distance that is a design criterion in the combination of the objective lens and the reference thickness disk is applied to divergent light rays ($L_{IM}<0$) from an object at a finite distance and when the object distance is applied to convergent light rays (super infinity light rays) ($L_{IM}>0$) traveling to an object at the image side of the objective lens.

According the above-described methods, the spherical aberration is excellently corrected against the variation in the thickness of the disk of high density, mass storage and high NA. The variation in the thickness of the disk is preferably kept to within 20% of the reference value in high NA (SD) disk considering that coma is influenced in the course of correction and that performance is degraded in a tracking operation in which the objective lens shifts in perpendicular to the optical axis of the objective lens. For example, with NA=0.6 and the reference disk thickness of 0.6 mm, the variation is preferably kept to within ±0.12 mm.

When the drive is used with a compact disk (CD), its operational wavelength is typically as long as 780 nm and NA is 0.45. When the high-density disk (SD) operates at a wavelength of 650 nm or 635 nm, NA required for the compact disk (CD) at a wavelength of 650 nm is $$NA_{CD}=0.45\times(650/780)=0.375$$

or at a wavelength of 635 nm $$NA_{CD}=0.45\times(635/780)=0.366$$

Even if the disk thickness is greatly changed from 0.6 mm to 1.2 mm, sufficiently high performance results. To this end, a diaphragm is preferably disposed in front of the first positive lens element, or between the first positive lens element and the second negative lens element, or between the second negative lens element and the objective lens.

The objective lens is moved by a slight displacement on the optical axis in response to the variation in the image point of the entire system resulting from the variation in the disk thickness.

The conditional equation 9 is now discussed. The conditional equation 9 defines the relationship between the focal lengths of the first positive lens element and second negative lens element. If the objective lens is combined with a small disk thickness on SD with the aberration reduced to correction value possible in this combination, over-correction will take place in the aberration on CD, which has an increased thickness. For this reason, light rays entering the objective lens from an object at a finite distance must be divergent light rays. If an attempt is made to achieve this purpose beyond the range defined by the conditional equation 9, the distance on the optical axis between the first positive lens element and the second negative lens element will go negative, and this is impossible to achieve.

The conditional equation 10 defines the configuration of the first positive lens element. When the first surface of the first positive lens element has a weak positive refractive power and the second surface of the first positive lens element has a strong positive refractive power to the parallel light rays from the collimator, there happens a large performance drop due to the mutual eccentricity between the converter, namely the correction lens system composed of the first positive lens element and second negative lens element, and the objective lens. Outside the condition specified by the conditional equation 10, this trend of performance drop is more noticeable when the positive refractive power of the first surface is equal to the positive refractive power of the second surface of the first positive lens element ($1/r_1+1/r_2=0$) or when the positive refractive power of the first surface is smaller than the positive refractive power of the second surface of the first positive lens element ($1/r_1+1/r_2<0$).

The conditional equation 11 specifies that the radius of curvature $r_3$ of the second negative lens element is negative, and that its absolute value is greater than the absolute value of the focal length $f_{C2}$ of the second negative lens element. With a negative radius of curvature $r_3$, the surface of the second negative lens element to the object side has a negative refractive power, improving both the spherical aberration and coma. If the absolute value of $r_3$ gets smaller than the absolute value of the focal length $f_{C2}$ of the second negative lens element, there increases performance drop due to the mutual eccentricity between the converter, namely the correction lens system composed of the first positive lens element and second negative lens element, and the objective lens. If the absolute value of $r_3$ gets smaller than the upper limit in the conditional equation 11, the second negative lens element loses its negative refractive power on its object side, both the spherical aberration and coma worsen. Performance drop due to eccentricity is substantially increased when the objective lens moves (shifts) in perpendicular to the optical axis of the objective lens in the tracking operation.

The conditional equation 12 is now discussed. The reduction type converter that is the correction lens system composed of the first positive lens element and second negative lens element projects light rays to a large aperture objective lens. The size of the light rays is large and the aperture of the second negative lens element is also large. When the objective lens shifts in perpendicular to the optical lens in the tracking operation, performance drop due to the mutual eccentricity is severer than an enlargement type converter such as the one in the second type of the present invention in which the lens arrangement is reversed. Outside the condition specified by the conditional equation 12, performance drop due to the mutual eccentricity between the converter and the objective lens increases.

BRIEF DESCRIPTION OF THE DRAWINGS

FIG. 1 is a cross-sectional view of the objective lens system with a variable disk thickness feature according to the first type of the present invention.

FIG. 3A and 3B show aberration curves in the embodiment 1 with a disk thickness of 0.6 mm in FIG. 3A and a disk thickness of 1.2 mm in FIG. 3B.

FIG. 4A and 4B show aberration curves in the embodiment 1 with a disk thickness of 0.5 mm in FIG. 4A and a disk thickness of 0.7 mm in FIG. 4B.

FIG. 5A and 5B show aberration curves in the embodiment 2 with a disk thickness of 0.6 mm in FIG. 5A and a disk thickness of 1.2 mm in FIG. 5B.

FIG. 6A and 6B show aberration curves in the embodiment 2 with a disk thickness of 0.5 mm in FIG. 6A and a disk thickness of 0.7 mm in FIG. 6B.

FIG. 7A and 7B show aberration curves in the embodiment 3 with a disk thickness of 0.6 mm in FIG. 7A and a disk thickness of 1.2 mm in FIG. 7B.

FIG. 8A and 8B show aberration curves in the embodiment 3 with a disk thickness of 0.5 mm in FIG. 8A and a disk thickness of 0.7 mm in FIG. 8B.

FIG. 9A and 9B show aberration curves in the embodiment 4 with a disk thickness of 0.6 mm in FIG. 9A and a disk thickness of 1.2 mm in FIG. 9B.

FIG. 10A and 10B show aberration curves in the embodiment 4 with a disk thickness of 0.5 mm in FIG. 10A and a disk thickness of 0.7 mm in FIG. 10B.

FIG. 11A and 11B show aberration curves in the embodiment 5 with a disk thickness of 0.6 mm in FIG. 11A and a disk thickness of 1.2 mm in FIG. 11B.

FIG. 12A and 12B show aberration curves in the embodiment 5 with a disk thickness of 0.5 mm in FIG. 12A and a disk thickness of 0.7 mm in FIG. 12B.

FIG. 14A and 14B show aberration curves in the embodiment 6 with a disk thickness of 0.6 mm in FIG. 14A and a disk thickness of 1.2 mm in FIG. 14B.

FIG. 15A and 15B show aberration curves in the embodiment 6 with a disk thickness of 0.5 mm in FIG. 15A and a disk thickness of 0.7 mm in FIG. 15B.

FIG. 16 shows aberration curves in the embodiment 7 with a disk thickness of 0.6 mm to the objective lens.

FIG. 17A and 17B show aberration curves in the embodiment 7 with a disk thickness of 0.6 mm in FIG. 17A and a disk thickness of 1.2 mm in FIG. 17B.

FIG. 18A and 18B show aberration curves in the embodiment 7 with a disk thickness of 0.5 mm in FIG. 18A and a disk thickness of 0.7 mm in FIG. 18B.

FIG. 19 is a cross-sectional view showing the embodiment 8.

FIG. 20A and 20B show aberration curves in the embodiment 8 with a disk thickness of 0.6 mm in FIG. 20A and a disk thickness of 1.2 mm in FIG. 20B.

FIG. 21A and 21B show aberration curves in the embodiment 8 with a disk thickness of 0.5 mm in FIG. 21A and a disk thickness of 0.7 mm in FIG. 21B.

FIG. 22 is a cross-sectional view of the objective lens system with a variable disk thickness feature according to the second type of the present invention.

FIG. 24A and 24B show aberration curves in the embodiment 9 with a disk thickness of 0.6 mm in FIG. 24A and a disk thickness of 1.2 mm in FIG. 24B.

FIG. 25A and 25B show aberration curves in the embodiment 9 with a disk thickness of 0.5 mm in FIG. 25A and a disk thickness of 0.7 mm in FIG. 25B.

FIG. 26A and 26B show aberration curves in the embodiment 10 with a disk thickness of 0.6 mm in FIG. 26A and a disk thickness of 1.2 mm in FIG. 26B.

FIG. 27A and 27B show aberration curves in the embodiment 10 with a disk thickness of 0.5 mm in FIG. 27A and a disk thickness of 0.7 mm in FIG. 27B.

FIG. 28A and 28B show aberration curves in the embodiment 11 with a disk thickness of 0.6 mm in FIG. 28A and a disk thickness of 1.2 mm in FIG. 28B.

FIG. 29A and 29B show aberration curves in the embodiment 11 with a disk thickness of 0.5 mm in FIG. 29A and a disk thickness of 0.7 mm in FIG. 29B.

FIG. 30A and 30B show aberration curves in the embodiment 12 with a disk thickness of 0.6 mm in FIG. 30A and a disk thickness of 1.2 mm in FIG. 30B.

FIG. 31A and 31B show aberration curves in the embodiment 12 with a disk thickness of 0.5 mm in FIG. 31A and a disk thickness of 0.7 mm in FIG. 31B.

FIG. 32A and 32B show aberration curves in the embodiment 13 with a disk thickness of 0.6 mm in FIG. 32A and a disk thickness of 1.2 mm in FIG. 32B.

FIG. 33A and 33B show aberration curves in the embodiment 13 with a disk thickness of 0.5 mm in FIG. 33A and a disk thickness of 0.7 mm in FIG. 33B.

FIG. 34A and 34B show aberration curves in the embodiment 14 with a disk thickness of 0.6 mm in FIG. 34A and a disk thickness of 1.2 mm in FIG. 34B.

FIG. 35A and 35B show aberration curves in the embodiment 14 with a disk thickness of 0.5 mm in FIG. 35A and a disk thickness of 0.7 mm in FIG. 35B.

FIG. 37A and 37B show aberration curves in the embodiment 15 with a disk thickness of 0.6 mm in FIG. 37A and a disk thickness of 1.2 mm in FIG. 37B.

FIG. 38A and 38B show aberration curves in the embodiment 15 with a disk thickness of 0.5 mm in FIG. 38A and a disk thickness of 0.7 mm in FIG. 38B.

FIG. 40A and 40B show aberration curves in the embodiment 16 with a disk thickness of 0.6 mm in FIG. 40A and a disk thickness of 1.2 mm in FIG. 40B.

FIG. 41A and 41B show aberration curves in the embodiment 16 with a disk thickness of 0.5 mm in FIG. 41A and a disk thickness of 0.7 mm in FIG. 41B.

FIG. 42 is a cross-sectional view of the objective lens system with a variable disk thickness feature according to the third type of the present invention.

FIG. 43 shows aberration curves in embodiments 17 through 21 with a disk thickness of 0.6 mm to the objective lens.

FIG. 44A and 44B show aberration curves in the embodiment 17 with a disk thickness of 0.6 mm in FIG. 44A and a disk thickness of 1.2 mm in FIG. 44B.

FIG. 45A and 45B show aberration curves in the embodiment 17 with a disk thickness of 0.5 mm in FIG. 45A and a disk thickness of 0.7 mm in FIG. 45B.

FIG. 46A and 46B show aberration curves in the embodiment 18 with a disk thickness of 0.6 mm in FIG. 46A and a thickness of 1.2 mm in FIG. 46B.

FIG. 47A and 47B show aberration curves in the embodiment 18 with a disk thickness of 0.5 mm in FIG. 47A and a disk thickness of 0.7 mm in FIG. 47B.

FIG. 48A and 48B show aberration curves in the embodiment 19 with a disk thickness of 0.6 mm in FIG. 48A and a disk thickness of 1.2 mm in FIG. 48B.

FIG. 50A and 50B show aberration curves in the embodiment 20 with a disk thickness of 0.6 mm in FIG. 50A and a disk thickness of 1.2 mm in FIG. 50B.

FIG. 51A and 51B show aberration curves in the embodiment 20 with a disk thickness of 0.5 mm in FIG. 51A and a disk thickness of 0.7 mm in FIG. 51B.

FIG. 52A and 52B show aberration curves in the embodiment 21 with a disk thickness of 0.6 mm in FIG. 52A and a disk thickness of 1.2 mm in FIG. 52B.

FIG. 53A and 53B show aberration curves in the embodiment 21 with a disk thickness of 0.5 mm in FIG. 53A and a disk thickness of 0.7 mm in FIG. 53B.

FIG. 55A and 55B show aberration curves in the embodiment 22 with a disk thickness of 0.6 mm in FIG. 55A and a disk thickness of 1.2 mm in FIG. 55B.

FIG. 56A and 56B show aberration curves in the embodiment 22 with a disk thickness of 0.5 mm in FIG. 56A and a disk thickness of 0.7 mm in FIG. 56B.

FIG. 57 shows aberration curves in the embodiment 23 with a disk thickness of 0.6 mm to the objective lens.

FIG. 58A and 58B show aberration curves in the embodiment 23 with a disk thickness of 0.6 mm in FIG. 58A and a disk thickness of 1.2 mm in FIG. 58B.

FIG. 59A and 59B show aberration curves in the embodiment 23 with a disk thickness of 0.5 mm in FIG. 59A and a disk thickness of 0.7 mm in FIG. 59B.

DESCRIPTION OF THE PREFERRED EMBODIMENTS

Figure 2:
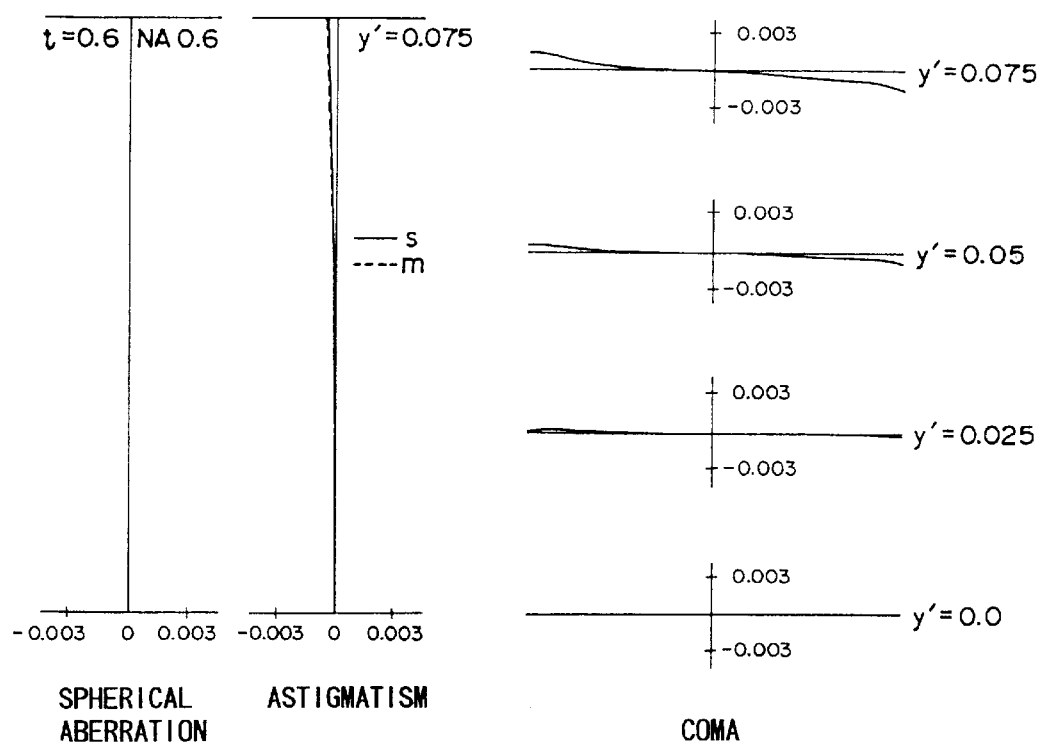
FIG. 2 shows aberration curves in embodiments 1 through 5 and 8 with a disk thickness of 0.6 mm to the objective lens.
Figure 5A:
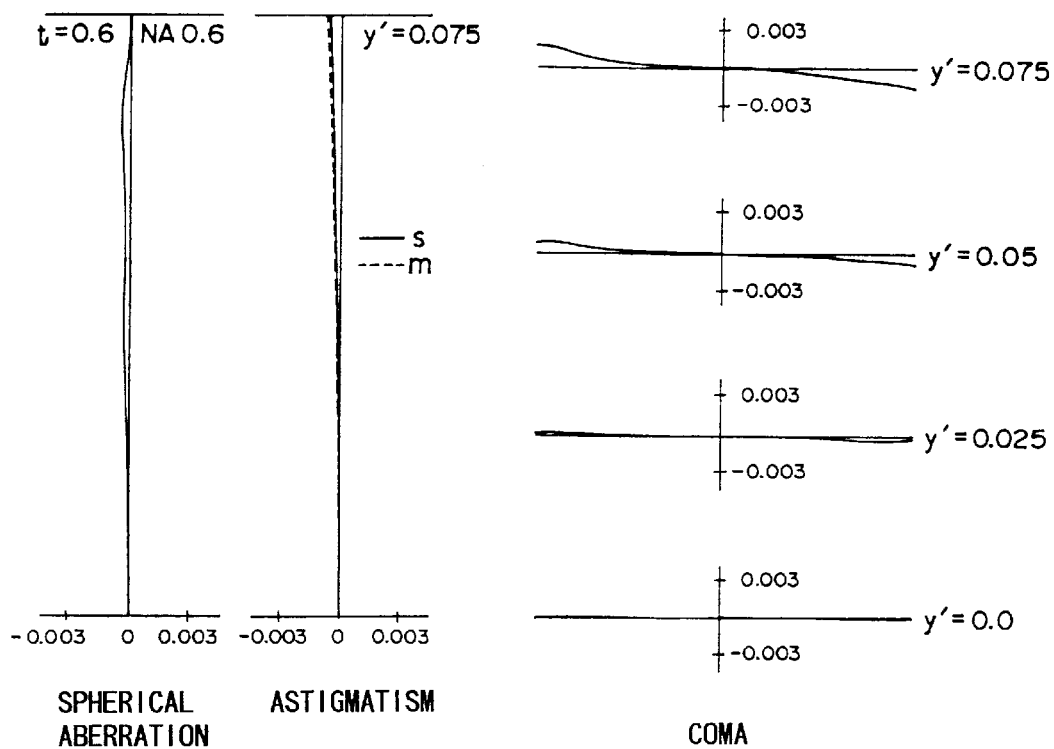
Figure 12A:
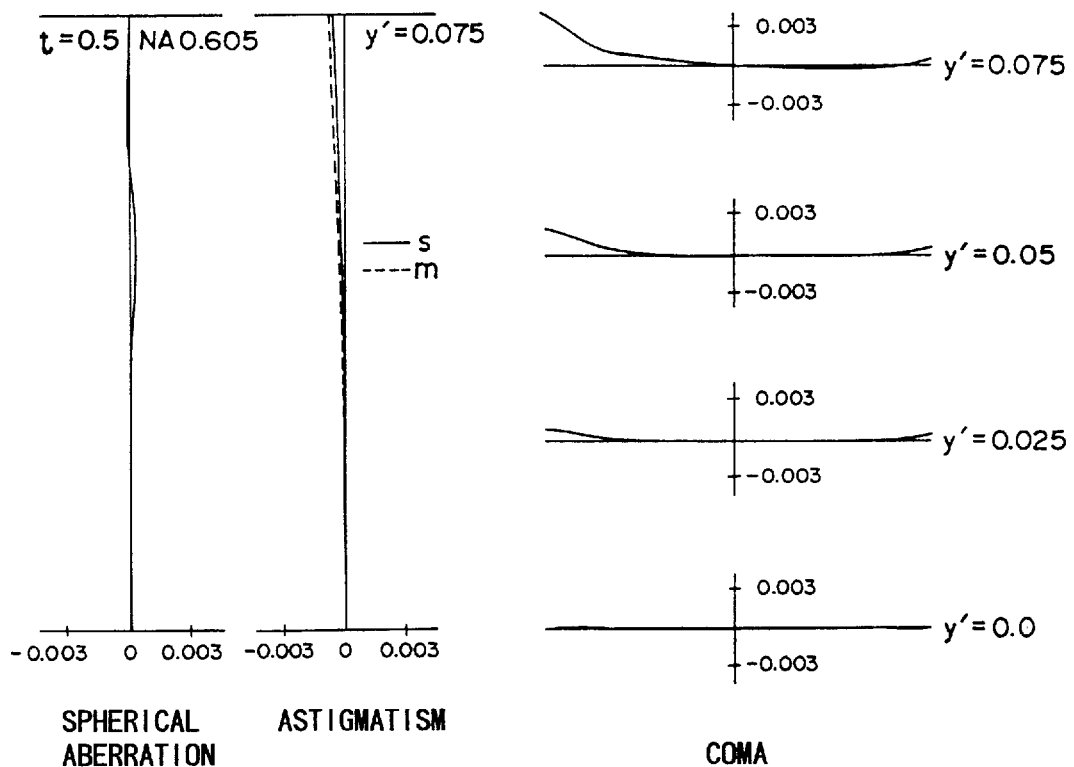

Tables 1 through 8 list test data obtained in the embodiments 1 through 8, respectively, of the objective lens system with a variable disk thickness feature according to the first type of the present invention. The following symbols are used in the tables.

| | |
|---|---|
| $r_i$ | Radii of curvature of spherical surfaces or vertex radii of curvature of aspheric surfaces arranged in sequence on the optical axis |
| $d_i$ | Thicknesses of lenses or air gaps in sequence on the optical axis |
| $n_i$ | Refractive indices of lens materials in sequence at a wavelength of 650 nm |
| t | Thickness of a disk on the optical axis |
| $n_b$ | Refractive index of the disk material at a wavelength of 650 nm |
| WD | Working distance |
| $L_1$ | Distance on the optical axis from the first lens to the light source |
| f | Focal length of the entire system |
| $f_c$ | Focal length of the single positive lens element |
| $f_{CT}$ | Focal length of the double positive lens elements |
| $f_M$ | Focal length of the objective lens |
| NA | NA of the entire system |
| $NA_M$ | NA of the objective lens |
| $NA_C$ | NA at the light source side |
| $L_{1M}$ | Object distance used in the design of the objective lens (negative when the objective lens receives divergent light rays from an object at a finite distance) |

The configuration of the aspheric surface is expressed as follows:

$$X = \frac{Ch^2}{1 + \sqrt{1 - (1+K)C^2h^2}} + \sum_{i=2}^{9} A_{2i}h^{2i}$$

where x Distance of one point on the aspheric surface to the tangential surface touching at the vertex point of the lens h Height from the optical axis C Curvature of the vertex point of the aspheric surface (C=1/r)

K Conic constant $A_{2i}$ Aspheric coefficient

In this case, the effective aperture of the objective lens at a disk thickness of t=0.6 mm is used as the one for disk thicknesses of t=0.5 mm and 0.7 mm, but at a disk thickness of t=1.2 mm, the effective aperture is calculated based on the diaphragm (at 2 mm from the front of the objective lens).

TABLE 1

Embodiment 1

$f_C = 30.196$  $f_M = 4.5$  $NA_M = 0.6$  $L_{1M} = \infty$

| | | | |
|---|---|---|---|
| $r_1 = \infty$ | | | |
| | $d_1 = 2.0$ | | $n_1 = 1.82793$ |
| $r_2 = -25.0$ | | | |
| | $d_2$ = variable | | |
| $r_3 = 2.75$ | | | |
| | $d_3 = 3.6$ | | $n_2 = 1.49936$ |
| $r_4 = -6.931$ | | | |
| | WD = variable | | |
| $r_5 = \infty$ | | | |
| | t = variable | | $n_b = 1.57747$ |
| $r_6 = \infty$ | | | |

| t | 0.5 | 0.6 | 0.7 | 1.2 |
|---|---|---|---|---|
| $L_1$ | −32.02 | −29.67 | −27.81 | −21.97 |
| $d_2$ | 2.65 | 5.0 | 6.86 | 12.70 |
| f | 4.346 | 4.699 | 5.022 | 6.404 |
| NA | 0.605 | 0.600 | 0.596 | 0.375 |
| $NA_C$ | 0.082 | 0.088 | 0.092 | 0.067 |
| WD | 2.162 | 2.145 | 2.124 | 1.967 |

Aspherical Surface Coefficient

| | $r_3$ | $r_4$ |
|---|---|---|
| K | −8.77156 × 10$^{-1}$ | −3.00545 × 10 |
| $A_4$ | 2.10680 × 10$^{-3}$ | 7.02580 × 10$^{-4}$ |
| $A_6$ | 4.69606 × 10$^{-5}$ | 4.60027 × 10$^{-5}$ |
| $A_8$ | 7.99174 × 10$^{-7}$ | −7.33258 × 10$^{-6}$ |
| $A_{10}$ | 1.73782 × 10$^{-7}$ | −1.96496 × 10$^{-6}$ |
| $A_{12}$ | 7.84965 × 10$^{-9}$ | −3.67224 × 10$^{-7}$ |
| $A_{14}$ | −4.89508 × 10$^{-11}$ | −2.62505 × 10$^{-8}$ |
| $A_{16}$ | −1.93707 × 10$^{-10}$ | 8.38902 × 10$^{-9}$ |
| $A_{18}$ | −6.59082 × 10$^{-11}$ | −9.39881 × 10$^{-10}$ |

$f_C/f_M = 6.710$

TABLE 2

Embodiment 2

$f_C = 30.174 \quad f_M = 4.5 \quad NA_M = 0.6 \quad L_{1M} = \infty$

| | | |
|---|---|---|
| $r_1 = 100.0$ | | |
| | $d_1 = 2.0$ | $n_1 = 1.82793$ |
| $r_2 = -33.0$ | | |
| | $d_2$ = variable | |
| $r_3 = 2.75$ | | |
| | $d_3 = 3.6$ | $n_2 = 1.49936$ |
| $r_4 = -6.931$ | | |
| | WD = variable | |
| $r_5 = \infty$ | | |
| | t = variable | $n_b = 1.57747$ |
| $r_6 = \infty$ | | |

| t | 0.5 | 0.6 | 0.7 | 1.2 |
|---|---|---|---|---|
| $L_1$ | -32.38 | -30.07 | -28.23 | -22.39 |
| $d_2$ | 2.69 | 5.0 | 6.84 | 12.68 |
| f | 4.390 | 4.744 | 5.070 | 6.484 |
| NA | 0.604 | 0.600 | 0.596 | 0.375 |
| $NA_C$ | 0.082 | 0.087 | 0.091 | 0.066 |
| WD | 2.160 | 2.142 | 2.120 | 1.962 |

Aspherical Surface Coefficient

| | $r_3$ | $r_4$ |
|---|---|---|
| K | $-8.77156 \times 10^{-1}$ | $-3.00545 \times 10$ |
| $A_4$ | $2.10680 \times 10^{-3}$ | $7.02580 \times 10^{-4}$ |
| $A_6$ | $4.69606 \times 10^{-5}$ | $4.60027 \times 10^{-5}$ |
| $A_8$ | $7.99174 \times 10^{-7}$ | $-7.33258 \times 10^{-6}$ |
| $A_{10}$ | $1.73782 \times 10^{-7}$ | $-1.96496 \times 10^{-6}$ |
| $A_{12}$ | $7.84965 \times 10^{-9}$ | $-3.67224 \times 10^{-7}$ |
| $A_{14}$ | $-4.89508 \times 10^{-11}$ | $-2.62505 \times 10^{-8}$ |
| $A_{16}$ | $-1.93707 \times 10^{-10}$ | $8.38902 \times 10^{-9}$ |
| $A_{18}$ | $-6.59082 \times 10^{-11}$ | $9.39881 \times 10^{-10}$ |

$f_C/f_M = 6.705$

TABLE 3

Embodiment

$f_C = 30.472 \quad f_M = 4.5 \quad NA_M = 0.6 \quad L_{1M} = \infty$

| | | |
|---|---|---|
| $r_1 = 50.0$ | | |
| | $d_1 = 2.0$ | $n_1 = 1.82793$ |
| $r_2 = -50.0$ | | |
| | $d_2$ = variable | |
| $r_3 = 2.75$ | | |
| | $d_3 = 3.6$ | $n_2 = 1.49936$ |
| $r_4 = -6.931$ | | |
| | WD = variable | |
| $r_5 = \infty$ | | |
| | t = variable | $n_b = 1.57747$ |
| $r_6 = \infty$ | | |

| t | 0.5 | 0.6 | 0.7 | 1.2 |
|---|---|---|---|---|
| $L_1$ | -33.37 | -31.00 | -29.09 | -23.06 |
| $d_2$ | 2.63 | 5.0 | 6.91 | 12.94 |
| f | 4.422 | 4.788 | 5.130 | 6.624 |
| NA | 0.604 | 0.600 | 0.596 | 0.375 |
| $NA_C$ | 0.080 | 0.086 | 0.090 | 0.065 |
| WD | 2.154 | 2.135 | 2.113 | 1.954 |

Aspherical Surface Coefficient

| | $r_3$ | $r_4$ |
|---|---|---|
| K | $-8.77156 \times 10^{-1}$ | $-3.00545 \times 10$ |
| $A_4$ | $2.10680 \times 10^{-3}$ | $7.02580 \times 10^{-4}$ |
| $A_6$ | $4.69606 \times 10^{-5}$ | $4.60027 \times 10^{-5}$ |
| $A_8$ | $7.99174 \times 10^{-7}$ | $-7.33258 \times 10^{-6}$ |
| $A_{10}$ | $1.73782 \times 10^{-7}$ | $-1.96496 \times 10^{-6}$ |
| $A_{12}$ | $7.84965 \times 10^{-9}$ | $-3.67224 \times 10^{-7}$ |
| $A_{14}$ | $-4.89508 \times 10^{-11}$ | $-2.62505 \times 10^{-8}$ |
| $A_{16}$ | $-1.93707 \times 10^{-10}$ | $8.38902 \times 10^{-9}$ |
| $A_{18}$ | $-6.59082 \times 10^{-11}$ | $9.39881 \times 10^{-10}$ |

$f_C/f_M = 6.772$

TABLE 4

Embodiment 4

$f_C = 30.174 \quad f_M = 4.5 \quad NA_M = 0.6 \quad L_{1M} = \infty$

| | | |
|---|---|---|
| $r_1 = 33.0$ | | |
| | $d_1 = 2.0$ | $n_1 = 1.82793$ |
| $r_2 = -100.00$ | | |
| | $d_2$ = variable | |
| $r_3 = 2.75$ | | |
| | $d_3 = 3.6$ | $n_2 = 1.49936$ |
| $r_4 = -6.931$ | | |
| | WD = variable | |
| $r_5 = \infty$ | | |
| | t = variable | $n_b = 1.57747$ |
| $r_6 = \infty$ | | |

| t | 0.5 | 0.6 | 0.7 | 1.2 |
|---|---|---|---|---|
| $L_1$ | -33.99 | -31.59 | -29.64 | -23.53 |
| $d_2$ | 2.6 | 5.0 | 6.95 | 13.06 |
| f | 4.457 | 4.838 | 5.199 | 6.787 |
| NA | 0.604 | 0.600 | 0.596 | 0.375 |
| $NA_C$ | 0.080 | 0.085 | 0.089 | 0.065 |
| WD | 2.141 | 2.122 | 2.100 | 1.942 |

Aspherical Surface Coefficient

| | $r_3$ | $r_4$ |
|---|---|---|
| K | $-8.77156 \times 10^{-1}$ | $-3.00545 \times 10$ |
| $A_4$ | $2.10680 \times 10^{-3}$ | $7.02580 \times 10^{-4}$ |
| $A_6$ | $4.69606 \times 10^{-5}$ | $4.60027 \times 10^{-5}$ |
| $A_8$ | $7.99174 \times 10^{-7}$ | $-7.33258 \times 10^{-6}$ |
| $A_{10}$ | $1.73782 \times 10^{-7}$ | $-1.96496 \times 10^{-6}$ |
| $A_{12}$ | $7.84965 \times 10^{-9}$ | $-3.67224 \times 10^{-7}$ |
| $A_{14}$ | $-4.89508 \times 10^{-11}$ | $-2.62505 \times 10^{-8}$ |
| $A_{16}$ | $-1.93707 \times 10^{-10}$ | $8.38902 \times 10^{-9}$ |
| $A_{18}$ | $-6.59082 \times 10^{-11}$ | $9.39881 \times 10^{-10}$ |

$f_C/f_M = 6.705$

TABLE 5

Embodiment 5

$f_C = 25.019 \quad f_M = 4.5 \quad NA_M = 0.6 \quad L_{1M} = \infty$

| | | |
|---|---|---|
| $r_1 = \infty$ | | |
| | $d_1 = 2.0$ | $n_1 = 1.91129$ |
| $r_2 = -22.8$ | | |
| | $d_2$ = variable | |
| $r_3 = 2.75$ | | |
| | $d_3 = 3.6$ | $n_2 = 1.49936$ |
| $r_4 = -6.931$ | | |
| | WD = variable | |
| $r_5 = \infty$ | | |
| | t = variable | $n_b = 1.57747$ |
| $r_6 = \infty$ | | |

| t | 0.5 | 0.6 | 0.7 | 1.2 |
|---|---|---|---|---|
| $L_1$ | -26.26 | -24.62 | -23.30 | -19.13 |
| $d_2$ | 3.36 | 5.0 | 6.32 | 10.49 |
| f | 4.436 | 4.472 | 5.022 | 6.169 |
| NA | 0.605 | 0.600 | 0.596 | 0.375 |
| $NA_C$ | 0.100 | 0.105 | 0.109 | 0.078 |
| WD | 2.153 | 2.137 | 2.117 | 1.960 |

TABLE 5-continued

Embodiment 5

Aspherical Surface Coefficient

| | $r_3$ | $r_4$ |
|---|---|---|
| K | $-8.77156 \times 10^{-1}$ | $-3.00545 \times 10$ |
| $A_4$ | $2.10680 \times 10^{-3}$ | $7.02580 \times 10^{-4}$ |
| $A_6$ | $4.69606 \times 10^{-5}$ | $4.60027 \times 10^{-5}$ |
| $A_8$ | $7.99174 \times 10^{-7}$ | $-7.33258 \times 10^{-6}$ |
| $A_{10}$ | $1.73782 \times 10^{-7}$ | $-1.96496 \times 10^{-6}$ |
| $A_{12}$ | $7.84965 \times 10^{-9}$ | $-3.67224 \times 10^{-7}$ |
| $A_{14}$ | $-4.89508 \times 10^{-11}$ | $-2.62505 \times 10^{-8}$ |
| $A_{16}$ | $-1.93707 \times 10^{-10}$ | $8.38902 \times 10^{-9}$ |
| $A_{18}$ | $-6.59082 \times 10^{-11}$ | $9.39881 \times 10^{-10}$ |

$f_C/f_M = 5.560$

TABLE 6

Embodiment 6

$f_C = 36.147 \quad f_M = 4.3 \quad NA_M = 0.6 \quad L_{1M} = -300$

| | | | |
|---|---|---|---|
| $r_1 = -360.0$ | | | |
| | $d_1 = 2.0$ | | $n_1 = 1.82793$ |
| $r_2 = -27.7$ | | | |
| | $d_2$ = variable | | |
| $r_3 = 2.7$ | | | |
| | $d_3 = 3.7$ | | $n_2 = 1.49936$ |
| $r_4 = -5.702$ | | | |
| | WD = variable | | |
| $r_5 = \infty$ | | | |
| | t = variable | | $n_b = 1.57747$ |
| $r_6 = \infty$ | | | |

| t | 0.5 | 0.6 | 0.7 | 1.2 |
|---|---|---|---|---|
| $L_1$ | -34.21 | -31.35 | -29.04 | -21.34 |
| $d_2$ | 2.14 | 5.0 | 7.31 | 15.01 |
| f | 4.148 | 4.491 | 4.812 | 6.319 |
| NA | 0.605 | 0.601 | 0.597 | 0.375 |
| $NA_C$ | 0.074 | 0.079 | 0.083 | 0.060 |
| WD | 2.031 | 2.014 | 1.992 | 1.836 |

Aspherical Surface Coefficient

| | $r_3$ | $r_4$ |
|---|---|---|
| K | $-7.98962 \times 10^{-1}$ | $-2.19588 \times 10$ |
| $A_4$ | $1.49179 \times 10^{-3}$ | $3.20305 \times 10^{-4}$ |
| $A_6$ | $1.91505 \times 10^{-5}$ | $-1.75942 \times 10^{-5}$ |
| $A_8$ | $-1.69235 \times 10^{-6}$ | $-1.73427 \times 10^{-5}$ |
| $A_{10}$ | $-5.72618 \times 10^{-8}$ | $-3.39889 \times 10^{-6}$ |
| $A_{12}$ | $-3.85959 \times 10^{-9}$ | $-3.79829 \times 10^{-7}$ |
| $A_{14}$ | $-1.41481 \times 10^{-9}$ | $2.69263 \times 10^{-8}$ |
| $A_{16}$ | $-4.57411 \times 10^{-10}$ | $1.33962 \times 10^{-8}$ |
| $A_{18}$ | $-1.12038 \times 10^{-10}$ | $7.53364 \times 10^{-11}$ |

$f_C/f_M = 8.406$

TABLE 7

Embodiment 7

$f_C = 29.632 \quad f_M = 4.5 \quad NA_M = 0.6 \quad L_{1M} = 300$

| | | | |
|---|---|---|---|
| $r_1 = 93.0$ | | | |
| | $d_1 = 2.0$ | | $n_1 = 1.82793$ |
| $r_2 = -33.0$ | | | |
| | $d_2$ = variable | | |
| $r_3 = 2.8$ | | | |
| | $d_3 = 3.3$ | | $n_2 = 1.49936$ |
| $r_4 = -6.913$ | | | |
| | WD = variable | | |
| $r_5 = \infty$ | | | |
| | t = variable | | $n_b = 1.57747$ |
| $r_6 = \infty$ | | | |

TABLE 7-continued

Embodiment 7

| t | 0.5 | 0.6 | 0.7 | 1.2 |
|---|---|---|---|---|
| $L_1$ | -35.79 | -32.87 | -30.64 | -23.59 |
| $d_2$ | 2.08 | 5.0 | 7.23 | 14.28 |
| f | 4.295 | 4.741 | 5.149 | 7.075 |
| NA | 0.606 | 0.602 | 0.598 | 0.375 |
| $NA_C$ | 0.074 | 0.081 | 0.086 | 0.064 |
| WD | 2.288 | 2.271 | 2.250 | 2.109 |

Aspherical Surface Coefficient

| | $r_3$ | $r_4$ |
|---|---|---|
| K | $-1.08974$ | $-2.35194 \times 10$ |
| $A_4$ | $2.88628 \times 10^{-3}$ | $-6.16199 \times 10^{-4}$ |
| $A_6$ | $3.16847 \times 10^{-6}$ | $-1.32179 \times 10^{-4}$ |
| $A_8$ | $-6.03541 \times 10^{-6}$ | $-2.76214 \times 10^{-5}$ |
| $A_{10}$ | $-5.03967 \times 10^{-7}$ | $-2.33274 \times 10^{-6}$ |
| $A_{12}$ | $-6.87062 \times 10^{-8}$ | $-1.20936 \times 10^{-7}$ |
| $A_{14}$ | $-6.17509 \times 10^{-9}$ | $4.53476 \times 10^{-8}$ |
| $A_{16}$ | $-8.18994 \times 10^{-10}$ | $1.49463 \times 10^{-8}$ |
| $A_{18}$ | $-2.01841 \times 10^{-10}$ | $-1.93636 \times 10^{-9}$ |

$f_C/f_M = 6.585$

TABLE 8

Embodiment 8

$f_{CT} = 22.746 \quad f_M = 4.5 \quad NA_M = 0.6 \quad L_{1M} = \infty$

| | | | |
|---|---|---|---|
| $r_1 = -150.0$ | | | |
| | $d_1 = 1.5$ | | $n_1 = 1.82793$ |
| $r_2 = -25.0$ | | | |
| | $d_2 = 0.1$ | | |
| $r_3 = -100.0$ | | | |
| | $d_3 = 1.5$ | | $n_2 = 1.82793$ |
| $r_4 = -33.0$ | | | |
| | $d_4$ = variable | | |
| $r_5 = 2.75$ | | | |
| | $d_5 = 3.6$ | | $n_3 = 1.49936$ |
| $r_6 = -6.931$ | | | |
| | WD = variable | | |
| $r_7 = \infty$ | | | |
| | t = variable | | $n_b = 1.57747$ |
| $r_8 = \infty$ | | | |

| t | 0.5 | 0.6 | 0.7 | 1.2 |
|---|---|---|---|---|
| $L_1$ | -22.95 | -21.68 | -20.63 | -17.24 |
| $d_4$ | 3.73 | 5.0 | 6.05 | 9.44 |
| f | 4.567 | 4.841 | 5.094 | 6.128 |
| NA | 0.604 | 0.600 | 0.596 | 0.375 |
| $NA_C$ | 0.112 | 0.117 | 0.121 | 0.085 |
| WD | 2.162 | 2.144 | 2.122 | 1.962 |

Aspherical Surface Coefficient

| | $r_5$ | $r_6$ |
|---|---|---|
| K | $-8.77156 \times 10^{-1}$ | $-3.00545 \times 10$ |
| $A_4$ | $2.10680 \times 10^{-3}$ | $7.02580 \times 10^{-4}$ |
| $A_6$ | $4.69606 \times 10^{-5}$ | $4.60027 \times 10^{-5}$ |
| $A_8$ | $7.99174 \times 10^{-7}$ | $-7.33258 \times 10^{-6}$ |
| $A_{10}$ | $1.73782 \times 10^{-7}$ | $-1.96496 \times 10^{-6}$ |
| $A_{12}$ | $7.84965 \times 10^{-9}$ | $-3.67224 \times 10^{-7}$ |
| $A_{14}$ | $-4.89508 \times 10^{-11}$ | $-2.62505 \times 10^{-8}$ |
| $A_{16}$ | $-1.93707 \times 10^{-10}$ | $8.38902 \times 10^{-9}$ |
| $A_{18}$ | $-6.59082 \times 10^{-11}$ | $9.39881 \times 10^{-10}$ |

$f_{CT}/f_M = 5.055$

The objective lens, common to embodiments 1 through 5 and 8, is intended to improve aberration to an object at infinity ($L_{LM}=\infty$) at a reference disk thickness of 0.6 mm. FIG. 2 shows resulting aberration curves.

Aberration curves resulting from the embodiment 1 are shown in FIGS. 3A, 3B and 4A, 4B, those from the embodiment 2 in FIGS. 5A, 5B and 6A, 6B, those from the embodiment 3 in FIGS. 7A, 7B and 8A, 8B, those from the embodiment 4 in FIGS. 9A, 9B and 10A, 10B, and those from the embodiment 5 in FIGS. 11A, 11B and 12A, 12B.

Figure 13:
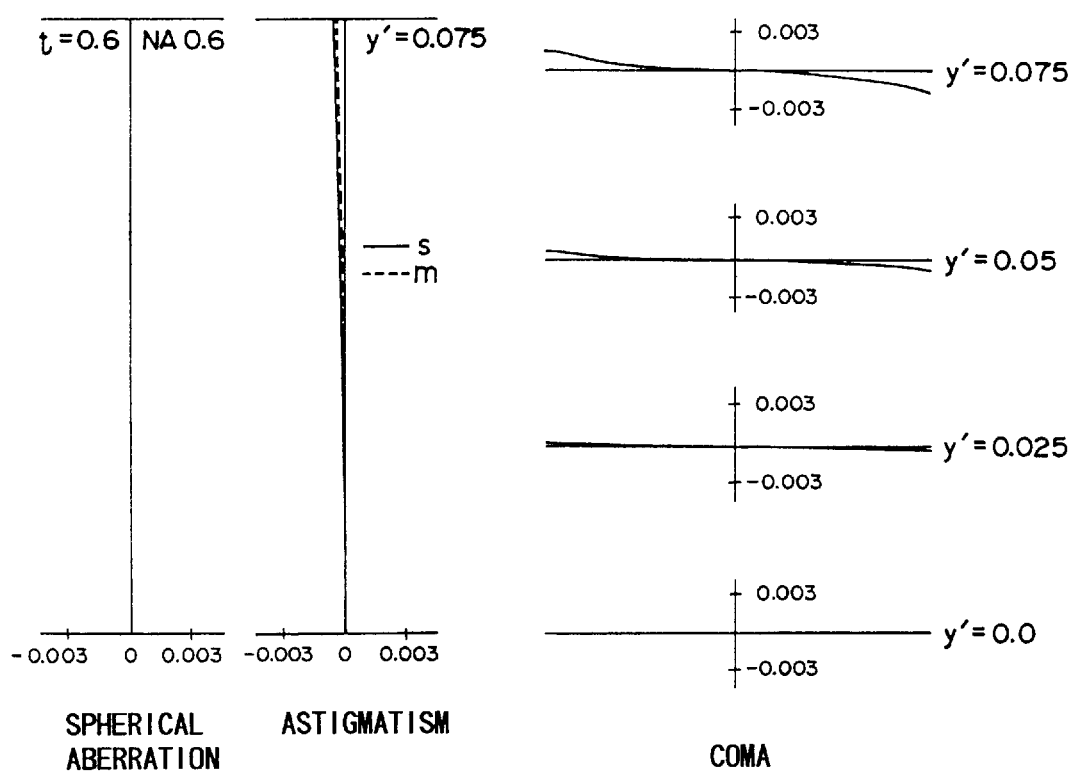
FIG. 13 shows aberration curves in the embodiment 6 with a disk thickness of 0.6 mm to the objective lens.
Figure 14B:
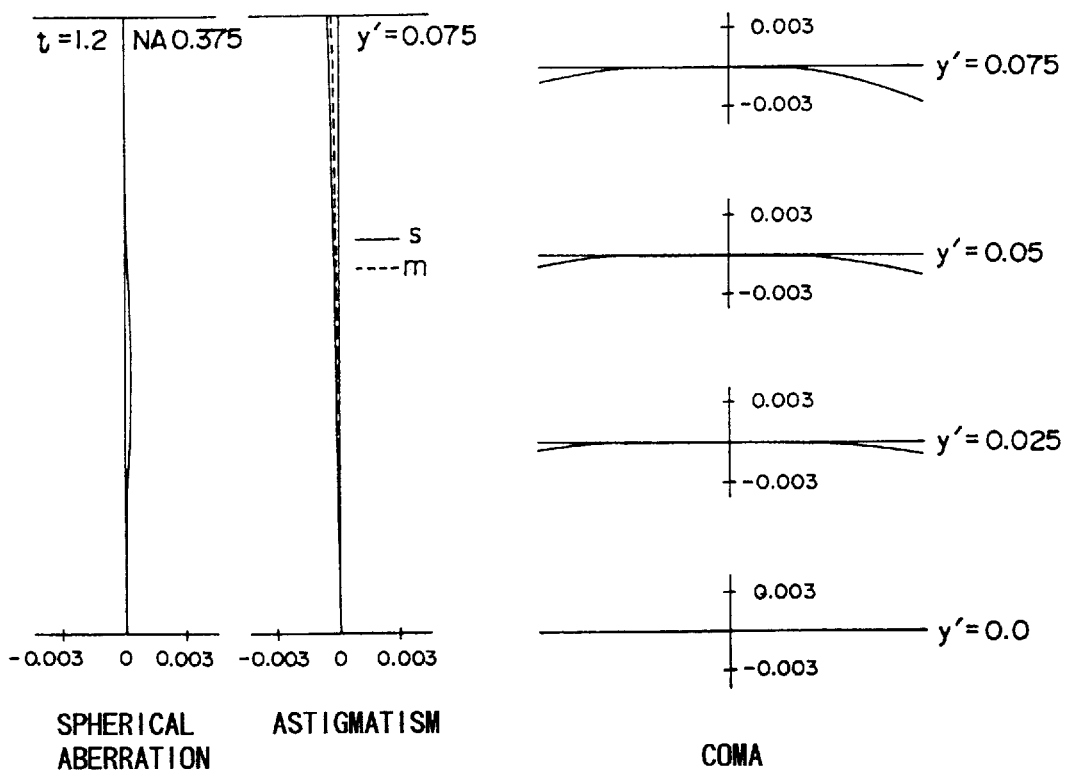
Figure 18A:
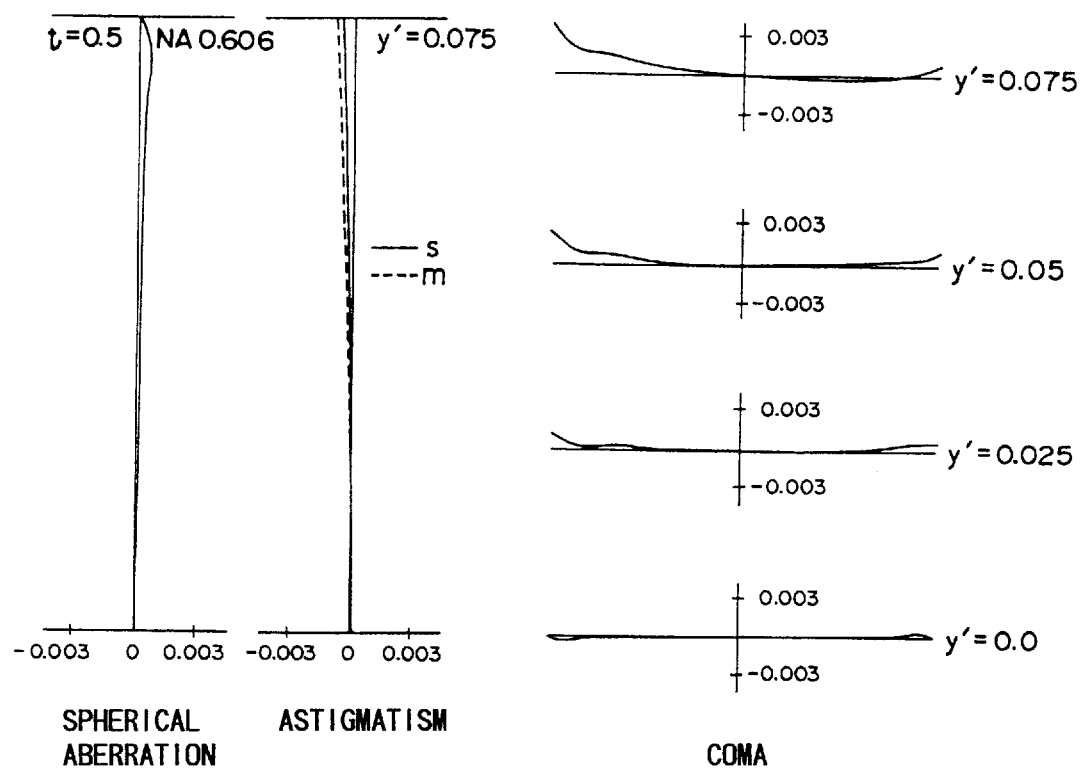

The objective lens in the embodiment 6 is intended to improve aberration to divergent light rays ($L_{IM}=-300$) from an object at a distance of 300 m from the first surface of the objective lens at the reference disk thickness of 0.6 mm. FIG. 13 shows aberration curves, and FIGS. 14A, 14B and 15A, 15B show aberration curves of the entire system.

The objective lens in the embodiment 7 is intended to improve aberration to convergent light rays (super infinity light rays) ($L_{IM}=300$) that travel to an object on the image side at distance of 300 mm from the first surface of the objective lens at the reference disk thickness of 0.6 mm. FIG. 16 shows aberration curves, and FIGS. 17A, 17B and 18A, 18B show aberration curves of the entire system.

FIG. 19 shows the cross-sectional view of the embodiment 8, in which the double positive lens elements have replaced the single positive lens element. FIGS. 20A, 20B and 21A, 21B show aberration curves of the entire system.

As can be seen from these figures, all embodiments maintain excellent performance with the disk thickness changed.

As described above, although the objective lens system with a variable disk thickness feature of the present invention is of a quite simple construction with less lens count, the objective lens system complies with a continuous variation in thickness of the disk in the course of recording and reproducing information on a high-density and mass storage optical information medium while providing excellent performance. The present invention may be considered as a zoom objective lens system with the thickness of the disk as a variable, and it is capable of covering a wide range of disk thickness while being free from light quantity loss arising from diffraction.

Tables 9 through 16 list data of embodiments 9 through 16, respectively, of the objective lens system with a variable disk thickness feature according to the second type of the present invention. The following symbols are used in the tables.

| | |
|---|---|
| $r_i$ | Radii of curvature of spherical surfaces or vertex radii of curvature of aspheric surfaces arranged in sequence on the optical axis |
| $d_i$ | Thicknesses of lenses or air gaps in sequence on the optical axis |
| $n_i$ | Refractive indices of lens materials in sequence at a wavelength of 650 nm |
| t | Thickness of a disk on the optical axis |
| $n_b$ | Refractive index of the disk material at a wavelength of 650 nm |
| WD | Working distance |
| f | Focal length of the entire system |
| $f_{C1}$ | Focal length of the first negative lens element |
| $f_{C2}$ | Focal length of the second positive lens element |
| $f_M$ | Focal length of the objective lens |
| NA | NA of the entire system |
| $NA_M$ | NA of the objective lens |
| $L_{IM}$ | Object distance used in the design of the objective lens (t = 0.6 mm) (negative when the objective lens receives divergent light rays from an object at a finite distance) |

The configuration of the aspheric surface is expressed as follows:

$$X = \frac{Ch^2}{1+\sqrt{1-(1+K)C^2h^2}} + \sum_{i=2}^{9} A_{2i}h^{2i}$$

where

- x Distance of one point on the aspheric surface to the tangential surface touching at the vertex point of the lens
- h Height from the optical axis
- C Curvature of the vertex point of the aspheric surface (C=1/r)
- K Conic constant
- $A_{2i}$ Aspheric coefficient In this case, the effective aperture of the objective lens at a disk thickness of t=0.6 mm is used as the one for disk thicknesses of t=0.5 mm and 0.7 mm, but at a disk thickness of t=1.2 mm, the effective aperture is calculated based on the diaphragm.

TABLE 9

Embodiment 9

$f_{C1} = -16.810$   $f_{C2} = 25.942$   $f_M = 4.5$   $NA_M = 0.6$   $L_{1M} = \infty$

| | | | |
|---|---|---|---|
| $r_1 = -16.180$ | | | |
| | $d_1 = 1.5$ | | $n_1 = 1.58642$ |
| $r_2 = 26.093$ | | | |
| | $d_2$ = variable | | |
| $r_3 = 108.978$ | | | |
| | $d_3 = 2.0$ | | $n_2 = 1.58642$ |
| $r_4 = -17.561$ | | | |
| | $d_4 = 5.0$ | | |
| $r_5 = 2.75$ | | | |
| | $d_5 = 3.4$ | | $n_3 = 1.49936$ |
| $r_6 = -7.228$ | | | |
| | WD = variable | | |
| $r_7 = \infty$ | | | |
| | t = variable | | $n_b = 1.57747$ |
| $r_8 = \infty$ | | | |

| t | 0.5 | 0.6 | 0.7 | 1.2 |
|---|---|---|---|---|
| $d_2$ | 9.52 | 7.55 | 6.02 | 1.46 |
| f | 2.712 | 2.907 | 3.078 | 3.734 |
| NA | 0.605 | 0.600 | 0.596 | 0.375 |
| WD | 2.272 | 2.264 | 2.249 | 2.118 |

Aspherical Surface Coefficient

| | $r_5$ | $r_6$ |
|---|---|---|
| K | $-7.59018 \times 10^{-1}$ | $-2.89545 \times 10$ |
| $A_4$ | $1.31123 \times 10^{-3}$ | $5.04544 \times 10^{-4}$ |
| $A_6$ | $2.39974 \times 10^{-5}$ | $1.34683 \times 10^{-6}$ |
| $A_8$ | $-6.00326 \times 10^{-7}$ | $-1.10963 \times 10^{-5}$ |
| $A_{10}$ | $1.49845 \times 10^{-9}$ | $-2.16471 \times 10^{-6}$ |
| $A_{12}$ | $1.19194 \times 10^{-9}$ | $-2.39574 \times 10^{-7}$ |
| $A_{14}$ | $-8.33804 \times 10^{-10}$ | $4.79899 \times 10^{-9}$ |
| $A_{16}$ | $-3.63570 \times 10^{-10}$ | $9.88653 \times 10^{-9}$ |
| $A_{18}$ | $-9.18546 \times 10^{-11}$ | $-5.23731 \times 10^{-10}$ | diaphragm 2.0 from the front of the objective lens
$|r_3|/r_2 = 4.177$
$-f_{C1}/f_M = 3.736$

TABLE 10

Embodiment 10

$f_{C1} = -16.841$   $f_{C2} = 26.053$   $f_M = 4.5$   $NA_M = 0.6$   $L_{1M} = \infty$ $r_1 = -13.927$
$\quad d_1 = 1.5 \qquad n_1 = 1.58642$

TABLE 10-continued

Embodiment 10

| | | | |
|---|---|---|---|
| $r_2 = 35.306$ | | | |
| | $d_2$ = variable | | |
| $r_3 = 52.148$ | | | |
| | $d_3 = 2.0$ | | $n_2 = 1.58642$ |
| $r_4 = -21.302$ | | | |
| | $d_4 = 5.0$ | | |
| $r_5 = 2.75$ | | | |
| | $d_5 = 3.4$ | | $n_3 = 1.49936$ |
| $r_6 = -7.228$ | | | |
| | WD = variable | | |
| $r_7 = \infty$ | | | |
| | t = variable | | $n_b = 1.57747$ |
| $r_8 = \infty$ | | | |

| | | | | |
|---|---|---|---|---|
| t | 0.5 | 0.6 | 0.7 | 1.2 |
| $d_2$ | 9.98 | 8.05 | 6.52 | 2.02 |
| f | 2.682 | 2.866 | 3.031 | 3.648 |
| NA | 0.606 | 0.601 | 0.597 | 0.375 |
| WD | 2.266 | 2.255 | 2.238 | 2.096 |

Aspherical Surface Coefficient

| | $r_5$ | $r_6$ |
|---|---|---|
| K | $-7.59018 \times 10^{-1}$ | $-2.89545 \times 10$ |
| $A_4$ | $1.31123 \times 10^{-3}$ | $5.04544 \times 10^{-4}$ |
| $A_6$ | $2.39974 \times 10^{-5}$ | $1.34683 \times 10^{-6}$ |
| $A_8$ | $-6.00326 \times 10^{-7}$ | $-1.10963 \times 10^{-5}$ |
| $A_{10}$ | $1.49845 \times 10^{-9}$ | $-2.16471 \times 10^{-6}$ |
| $A_{12}$ | $1.19194 \times 10^{-9}$ | $-2.39574 \times 10^{-7}$ |
| $A_{14}$ | $-8.33804 \times 10^{-10}$ | $4.79899 \times 10^{-9}$ |
| $A_{16}$ | $-3.63570 \times 10^{-10}$ | $9.88653 \times 10^{-9}$ |
| $A_{18}$ | $-9.18546 \times 10^{-11}$ | $-5.23731 \times 10^{-10}$ | diaphragm 2.0 from the front of the object lens
$|r_3|/r_2 = 1.477$
$-f_{C1}/f_M = 3.742$

TABLE 11

Embodiment 11

$f_{C1} = -11.967$  $f_{C2} = 18.026$  $f_M = 4.5$  $NA_M = 0.6$  $L_{1M} = \infty$

| | | | |
|---|---|---|---|
| $r_1 = -16.307$ | | | |
| | $d_1 = 1.5$ | | $n_1 = 1.82793$ |
| $r_2 = 26.298$ | | | |
| | $d_2$ = variable | | |
| $r_3 = 106.757$ | | | |
| | $d_3 = 2.0$ | | $n_2 = 1.82793$ |
| $r_4 = -17.203$ | | | |
| | $d_4 = 2.0$ | | |
| $r_5 = 2.75$ | | | |
| | $d_5 = 3.4$ | | $n_3 = 1.49936$ |
| $r_6 = -7.228$ | | | |
| | WD = variable | | |
| $r_7 = \infty$ | | | |
| | t = variable | | $n_b = 1.57747$ |
| $r_8 = \infty$ | | | |

| | | | | |
|---|---|---|---|---|
| t | 0.5 | 0.6 | 0.7 | 1.2 |
| $d_2$ | 5.51 | 4.54 | 3.78 | 1.35 |
| f | 2.833 | 3.000 | 3.146 | 3.722 |
| NA | 0.606 | 0.600 | 0.595 | 0.375 |
| WD | 2.277 | 2.271 | 2.258 | 2.140 |

Aspherical Surface Coefficient

| | $r_5$ | $r_6$ |
|---|---|---|
| K | $-7.59018 \times 10^{-1}$ | $-2.89545 \times 10$ |
| $A_4$ | $1.31123 \times 10^{-3}$ | $5.04544 \times 10^{-4}$ |
| $A_6$ | $2.39974 \times 10^{-5}$ | $1.34683 \times 10^{-6}$ |
| $A_8$ | $-6.00326 \times 10^{-7}$ | $-1.10963 \times 10^{-5}$ |

TABLE 11-continued

Embodiment 11

| | | |
|---|---|---|
| $A_{10}$ | $1.49845 \times 10^{-9}$ | $-2.16471 \times 10^{-6}$ |
| $A_{12}$ | $1.19194 \times 10^{-9}$ | $-2.39574 \times 10^{-7}$ |
| $A_{14}$ | $-8.33804 \times 10^{-10}$ | $4.79899 \times 10^{-9}$ |
| $A_{16}$ | $-3.63570 \times 10^{-10}$ | $9.88653 \times 10^{-9}$ |
| $A_{18}$ | $-9.18546 \times 10^{-11}$ | $-5.23731 \times 10^{-10}$ | diaphragm 1.0 from the front of the objective lens
$|r_3|/r_2 = 4.060$
$-f_{C1}/f_M = 2.659$

TABLE 12

Embodiment 12

$f_{c1} = -11.966$  $f_{c2} = 18.643$  $f_M = 4.5$  $NA_M = 0.6$  $L_{1M} = \infty$

| | | | |
|---|---|---|---|
| $r_1 = -15.05$ | $d_1 = 1.5$ | | $n_1 = 1.82793$ |
| $r_2 = 30.30$ | $d_2$ = variable | | |
| $r_3 = -500.00$ | $d_3 = 2.0$ | | $n_2 = 1.82793$ |
| $r_4 = -15.00$ | $d_4 = 2.0$ | | |
| $r_5 = 2.75$ | $d_5 = 3.4$ | | $n_3 = 1.49936$ |
| $r_6 = -7.228$ | WD = variable | | |
| $r_7 = \infty$ | t = variable | | $n_b = 1.57747$ |
| $r_8 = \infty$ | | | |

| | | | | |
|---|---|---|---|---|
| t | 0.5 | 0.6 | 0.7 | 1.2 |
| $d_2$ | 5.99 | 4.93 | 4.11 | 1.53 |
| f | 2.731 | 2.902 | 3.050 | 3.633 |
| NA | 0.606 | 0.600 | 0.595 | 0.375 |
| WD | 2.276 | 2.271 | 2.259 | 2.141 |

Aspherical Surface Coefficient

| | $r_5$ | $r_6$ |
|---|---|---|
| K | $-7.59018 \times 10^{-1}$ | $-2.89545 \times 10$ |
| $A_4$ | $1.31123 \times 10^{-3}$ | $5.04544 \times 10^{-4}$ |
| $A_6$ | $2.39974 \times 10^{-5}$ | $1.34683 \times 10^{-6}$ |
| $A_8$ | $-6.00326 \times 10^{-7}$ | $-1.10963 \times 10^{-5}$ |
| $A_{10}$ | $1.49845 \times 10^{-9}$ | $-2.16471 \times 10^{-6}$ |
| $A_{12}$ | $1.19194 \times 10^{-9}$ | $-2.39574 \times 10^{-7}$ |
| $A_{14}$ | $-8.33804 \times 10^{-10}$ | $4.79899 \times 10^{-9}$ |
| $A_{16}$ | $-3.63570 \times 10^{-10}$ | $9.88653 \times 10^{-9}$ |
| $A_{18}$ | $-9.18546 \times 10^{-11}$ | $-5.23731 \times 10^{-10}$ | diaphragm 1.0 from the front of the objective lens
$|r_3|/r_2 = 16.502$
$-f_{c1}/f_M = 2.659$

TABLE 13

Embodiment 13

$f_{c1} = -11.955$  $f_{c2} = 18.062$  $f_M = 4.5$  $NA_M = 0.6$  $L_{1M} = \infty$

| | | | |
|---|---|---|---|
| $r_1 = -20.13$ | $d_1 = 1.5$ | | $n_1 = 1.82793$ |
| $r_2 = 20.13$ | $d_2$ = variable | | |
| $r_3 = 43.67$ | $d_3 = 2.0$ | | $n_2 = 1.82793$ |
| $r_4 = -22.27$ | $d_4 = 2.0$ | | |
| $r_5 = 2.75$ | $d_5 = 3.4$ | | $n_3 = 1.49936$ |
| $r_6 = -7.228$ | WD = variable | | |
| $r_7 = \infty$ | t = variable | | $n_b = 1.57747$ |
| $r_8 = \infty$ | | | |

| | | | | |
|---|---|---|---|---|
| t | 0.5 | 0.6 | 0.7 | 1.2 |
| $d_2$ | 6.03 | 5.06 | 4.28 | 1.78 |
| f | 2.801 | 2.962 | 3.106 | 3.679 |
| NA | 0.606 | 0.600 | 0.595 | 0.375 |
| WD | 2.268 | 2.261 | 2.248 | 2.131 |

TABLE 13-continued

Embodiment 13

Aspherical Surface Coefficient

| | $r_5$ | $r_6$ |
|---|---|---|
| K | $-7.59018 \times 10^{-1}$ | $-2.89545 \times 10$ |
| $A_4$ | $1.31123 \times 10^{-3}$ | $5.04544 \times 10^{-4}$ |
| $A_6$ | $2.39974 \times 10^{-5}$ | $1.34683 \times 10^{-6}$ |
| $A_8$ | $-6.00326 \times 10^{-7}$ | $-1.10963 \times 10^{-5}$ |
| $A_{10}$ | $1.49845 \times 10^{-9}$ | $-2.16471 \times 10^{-6}$ |
| $A_{12}$ | $1.19194 \times 10^{-9}$ | $-2.39574 \times 10^{-7}$ |
| $A_{14}$ | $-8.33804 \times 10^{-10}$ | $4.79899 \times 10^{-9}$ |
| $A_{16}$ | $-3.63570 \times 10^{-10}$ | $9.88653 \times 10^{-9}$ |
| $A_{18}$ | $-9.18546 \times 10^{-11}$ | $-5.23731 \times 10^{-10}$ | diaphragm 1.0 from the front of the objective lens
$|r_3|/r_2 = 2.169$
$-f_{c1}/f_M = 2.657$

TABLE 14

Embodiment 14

$f_{c1} = -11.994$  $f_{c2} = 17.912$  $f_M = 4.5$  $NA_M = 0.6$  $L_{1M} = \infty$

| $r_1 = -35.682$ | $d_1 = 1.5$ | $n_1 = 1.82793$ |
|---|---|---|
| $r_2 = 14.021$ | $d_2 =$ variable | |
| $r_3 = 29.20$ | $d_3 = 2.0$ | $n_2 = 1.82793$ |
| $r_4 = -29.20$ | $d_4 = 2.0$ | |
| $r_5 = 2.75$ | $d_5 = 3.4$ | $n_3 = 1.49936$ |
| $r_6 = -7.228$ | WD = variable | |
| $r_7 = \infty$ | t = variable | $n_b = 1.57747$ |
| $r_8 = \infty$ | | |

| t | 0.5 | 0.6 | 0.7 | 1.2 |
|---|---|---|---|---|
| $d_2$ | 6.12 | 5.1 | 4.3 | 1.53 |
| f | 2.846 | 3.019 | 3.171 | 3.839 |
| NA | 0.606 | 0.60 | 0.595 | 0.375 |
| WD | 2.271 | 2.269 | 2.259 | 2.176 |

Aspherical Surface Coefficient

| | $r_5$ | $r_6$ |
|---|---|---|
| K | $-7.59018 \times 10^{-1}$ | $-2.89545 \times 10$ |
| $A_4$ | $1.31123 \times 10^{-3}$ | $5.04544 \times 10^{-4}$ |
| $A_6$ | $2.39974 \times 10^{-5}$ | $1.34683 \times 10^{-6}$ |
| $A_8$ | $-6.00326 \times 10^{-7}$ | $-1.10963 \times 10^{-5}$ |
| $A_{10}$ | $1.49845 \times 10^{-9}$ | $-2.16471 \times 10^{-6}$ |
| $A_{12}$ | $1.19194 \times 10^{-9}$ | $-2.39574 \times 10^{-7}$ |
| $A_{14}$ | $-8.33804 \times 10^{-10}$ | $4.79899 \times 10^{-9}$ |
| $A_{16}$ | $-3.63570 \times 10^{-10}$ | $9.88653 \times 10^{-9}$ |
| $A_{18}$ | $-9.18546 \times 10^{-11}$ | $-5.23731 \times 10^{-10}$ | diaphragm 1.0 from the front of the objective lens
$|r_3|/r_2 = 2.083$
$-f_{c1}/f_M = 2.665$

TABLE 15

Embodiment 15

$f_{c1} = -11.945$  $f_{c2} = 19.430$  $f_M = 4.3$  $NA_M = 0.6$  $L_{1M} = -300$

| $r_1 = -13.0$ | $d_1 = 1.5$ | $n_1 = 1.82793$ |
|---|---|---|
| $r_2 = 43.5$ | $d_2 =$ variable | |
| $r_3 = -400.0$ | $d_3 = 2.0$ | $n_2 = 1.82793$ |
| $r_4 = -15.5$ | $d_4 = 2.0$ | |
| $r_5 = 2.7$ | $d_5 = 3.7$ | $n_3 = 1.49936$ |
| $r_6 = -5.702$ | WD = variable | |
| $r_7 = \infty$ | t = variable | $n_b = 1.57747$ |
| $r_8 = \infty$ | | |

TABLE 15-continued

Embodiment 15

| t | 0.5 | 0.6 | 0.7 | 1.2 |
|---|---|---|---|---|
| $d_2$ | 5.43 | 4.44 | 3.65 | 1.03 |
| f | 2.687 | 2.845 | 2.986 | 3.569 |
| NA | 0.605 | 0.60 | 0.596 | 0.375 |
| WD | 2.035 | 2.025 | 2.009 | 1.887 |

Aspherical Surface Coefficient

| | $r_5$ | $r_6$ |
|---|---|---|
| K | $-7.98962 \times 10^{-1}$ | $-2.19588 \times 10$ |
| $A_4$ | $1.49179 \times 10^{-3}$ | $3.20305 \times 10^{-4}$ |
| $A_6$ | $1.91505 \times 10^{-5}$ | $-1.75942 \times 10^{-5}$ |
| $A_8$ | $-1.69235 \times 10^{-6}$ | $-1.73427 \times 10^{-5}$ |
| $A_{10}$ | $-5.72618 \times 10^{-8}$ | $-3.39889 \times 10^{-6}$ |
| $A_{12}$ | $-3.85959 \times 10^{-9}$ | $-3.79829 \times 10^{-7}$ |
| $A_{14}$ | $-1.41481 \times 10^{-9}$ | $2.69263 \times 10^{-8}$ |
| $A_{16}$ | $-4.57411 \times 10^{-10}$ | $1.33962 \times 10^{-8}$ |
| $A_{18}$ | $-1.12038 \times 10^{-10}$ | $7.53364 \times 10^{-11}$ | diaphragm 1.0 from the front of the objective lens
$|r_3|/r_2 = 9.195$
$-f_{c1}/f_M = 2.778$

TABLE 16

Embodiment 16

$f_{c1} = -11.952$  $f_{c2} = 17.835$  $f_M = 4.5$  $NA_M = 0.6$  $L_{1M} = 300$

| $r_1 = -22.2$ | $d_1 = 1.5$ | $n_1 = 1.82793$ |
|---|---|---|
| $r_2 = 18.4$ | $d_2 =$ variable | |
| $r_3 = 58.0$ | $d_3 = 2.0$ | $n_2 = 1.82793$ |
| $r_4 = -19.5$ | $d_4 = 2.0$ | |
| $r_5 = 2.8$ | $d_5 = 3.3$ | $n_3 = 1.49936$ |
| $r_6 = -6.913$ | WD = variable | |
| $r_7 = \infty$ | t = variable | $n_b = 1.57747$ |
| $r_8 = \infty$ | | |

| t | 0.5 | 0.6 | 0.7 | 1.2 |
|---|---|---|---|---|
| $d_2$ | 6.93 | 5.8 | 4.92 | 2.16 |
| f | 2.654 | 2.825 | 2.974 | 3.564 |
| NA | 0.606 | 0.6 | 0.595 | 0.375 |
| WD | 2.291 | 2.287 | 2.275 | 2.163 |

Aspherical Surface Coefficient

Figure 23:
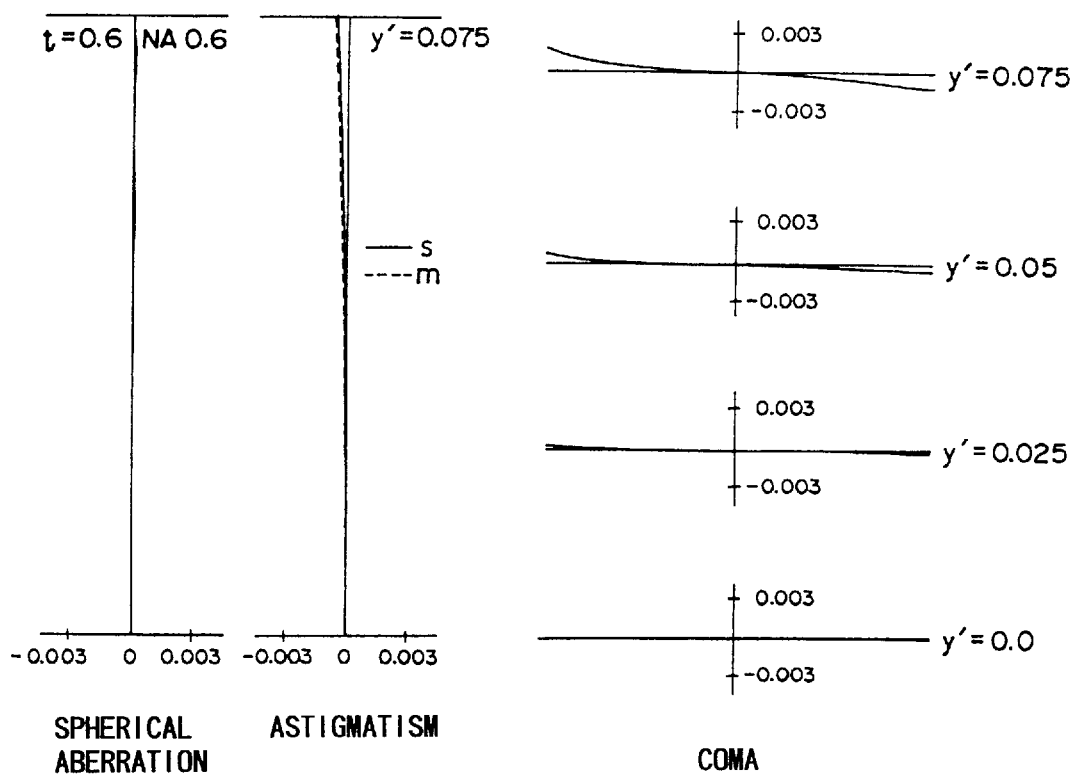
FIG. 23 shows aberration curves in embodiments 9 through 14 with a disk thickness of 0.6 mm to the objective lens.
Figure 29A:
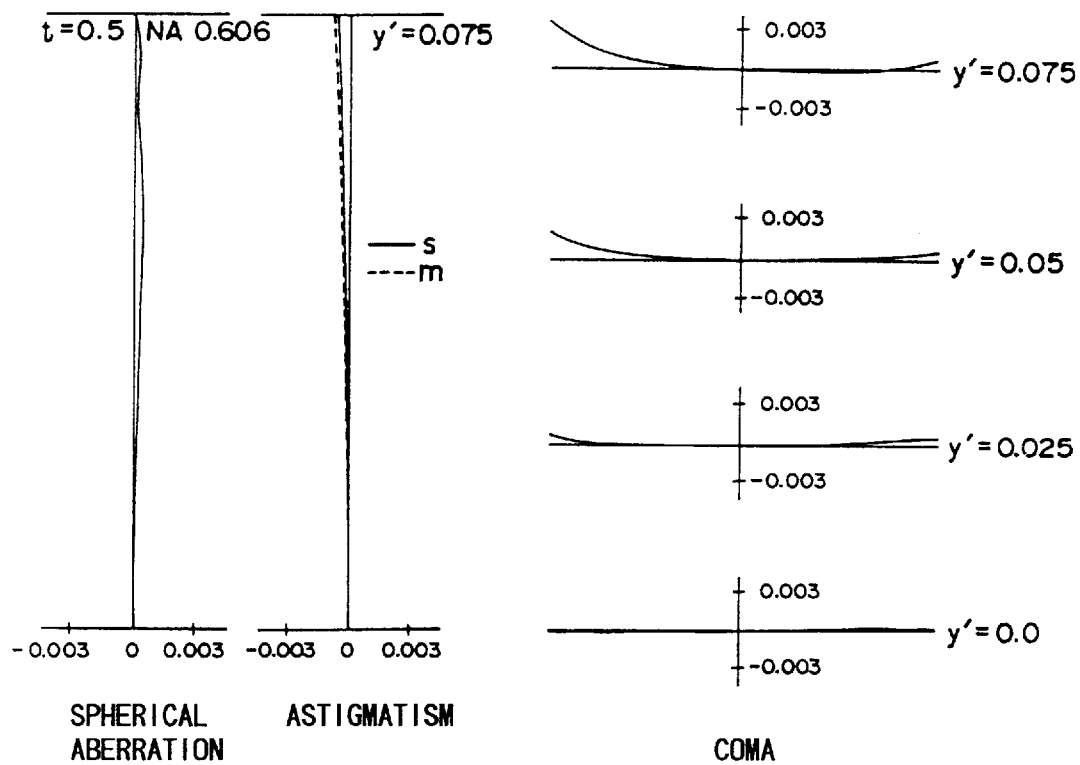
Figure 32A:
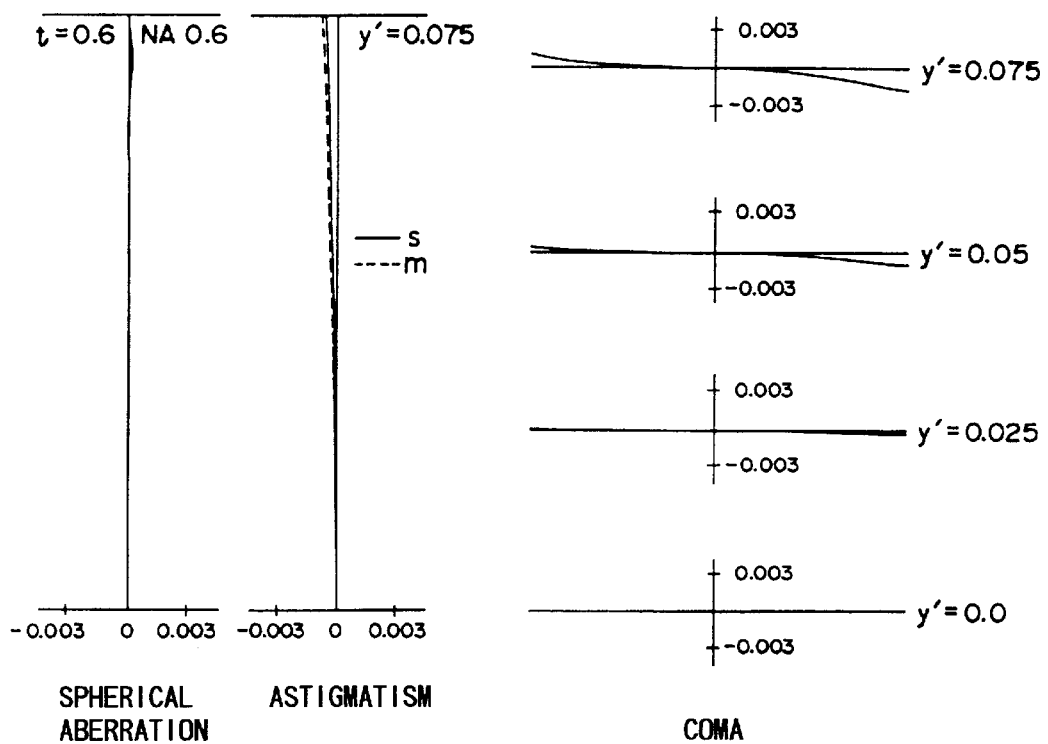
Figure 33A:
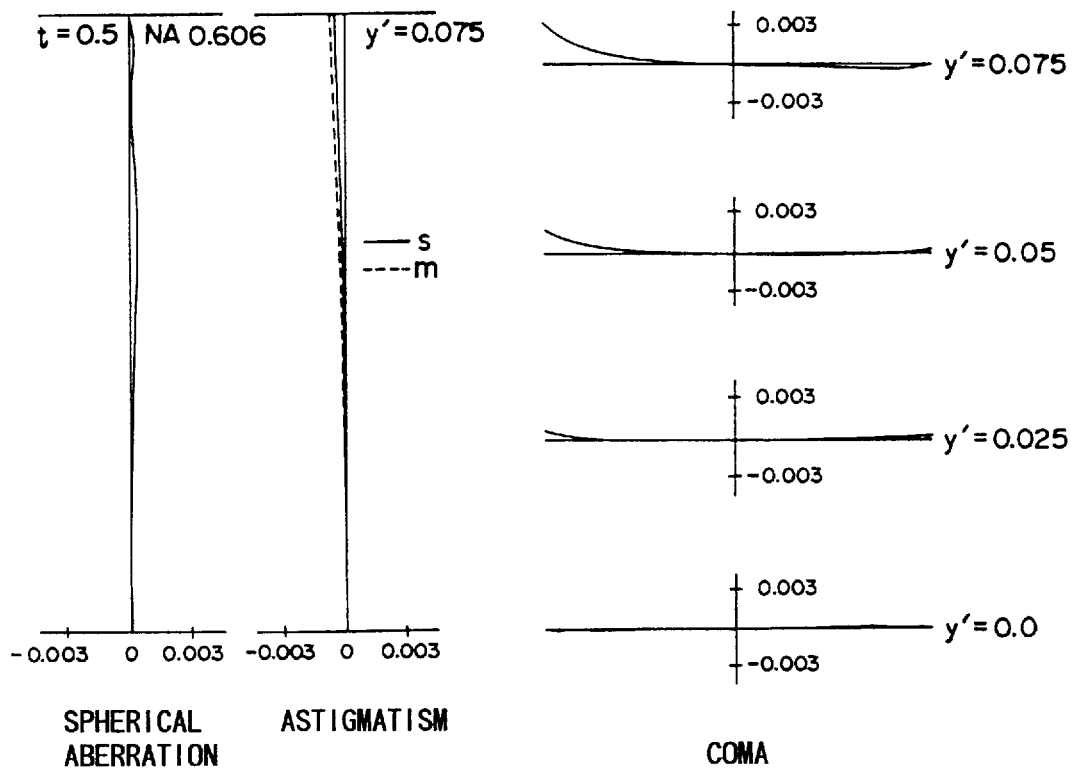
Figure 35A:
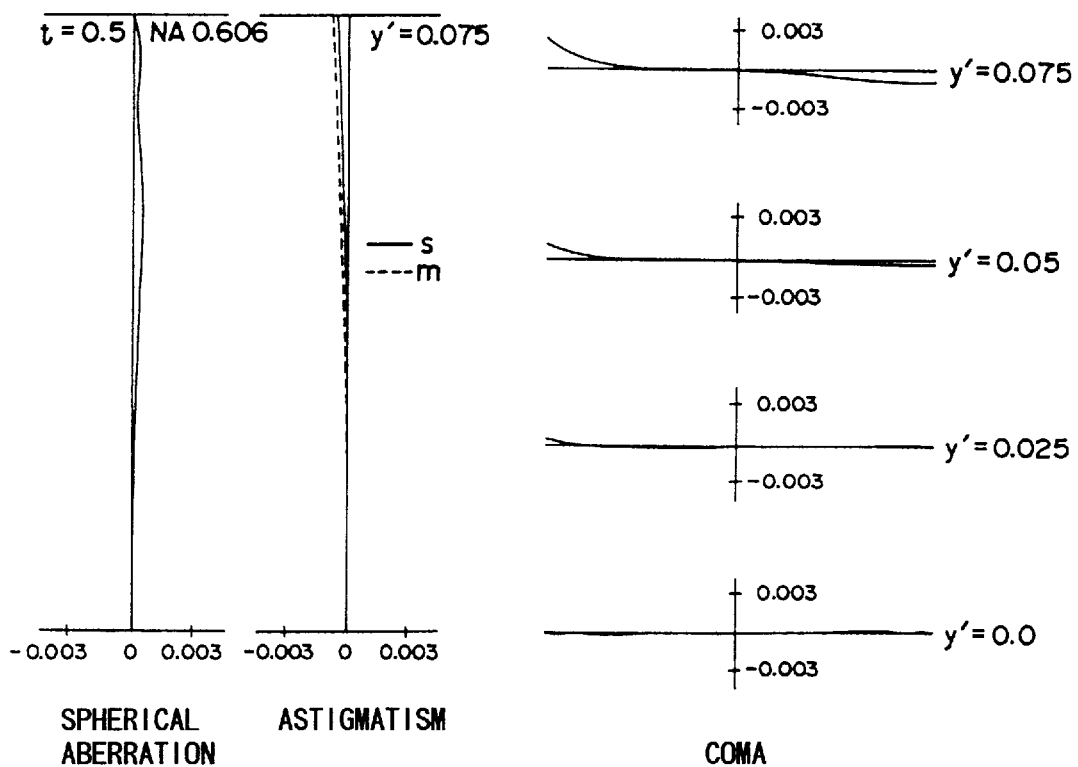

| | $r_5$ | $r_6$ |
|---|---|---|
| K | $-1.08974$ | $-2.35194 \times 10$ |
| $A_4$ | $2.88628 \times 10^{-3}$ | $-6.16199 \times 10^{-4}$ |
| $A_6$ | $3.16847 \times 10^{-6}$ | $-1.32179 \times 10^{-4}$ |
| $A_8$ | $-6.03541 \times 10^{-6}$ | $-2.76214 \times 10^{-5}$ |
| $A_{10}$ | $-5.03967 \times 10^{-7}$ | $-2.33274 \times 10^{-6}$ |
| $A_{12}$ | $-6.87062 \times 10^{-8}$ | $-1.20936 \times 10^{-7}$ |
| $A_{14}$ | $-6.17509 \times 10^{-9}$ | $4.53476 \times 10^{-8}$ |
| $A_{16}$ | $-8.18994 \times 10^{-10}$ | $1.49463 \times 10^{-8}$ |
| $A_{18}$ | $-2.01841 \times 10^{-10}$ | $-1.93636 \times 10^{-9}$ | diaphragm 1.0 from the front of the objective lens
$|r_3|/r_2 = 3.152$
$-f_{c1}/f_M = 2.656$ The objective lens, common to embodiments 9 through 14, is intended to improve aberration to an object at infinity ($L_{IM}=\infty$) at a reference disk thickness of 0.6 mm. FIG. 23 shows resulting aberration curves.

Aberration curves resulting from the embodiment 9 are shown in FIGS. 24A, 24B and 25A, 25B, those from the embodiment 10 in FIGS. 26A, 26B and 27A, 27B, those from the embodiment 11 in FIGS. 28A, 28B and 29A, 29B, those from the embodiment 12 in FIGS. 30A, 30B and 31A, 31B, those from the embodiment 13 in FIGS. 32A, 32B and 33A, 33B, and those from the embodiment 14 in FIGS. 34A, 34B and 35A, 35B.

Figure 36:
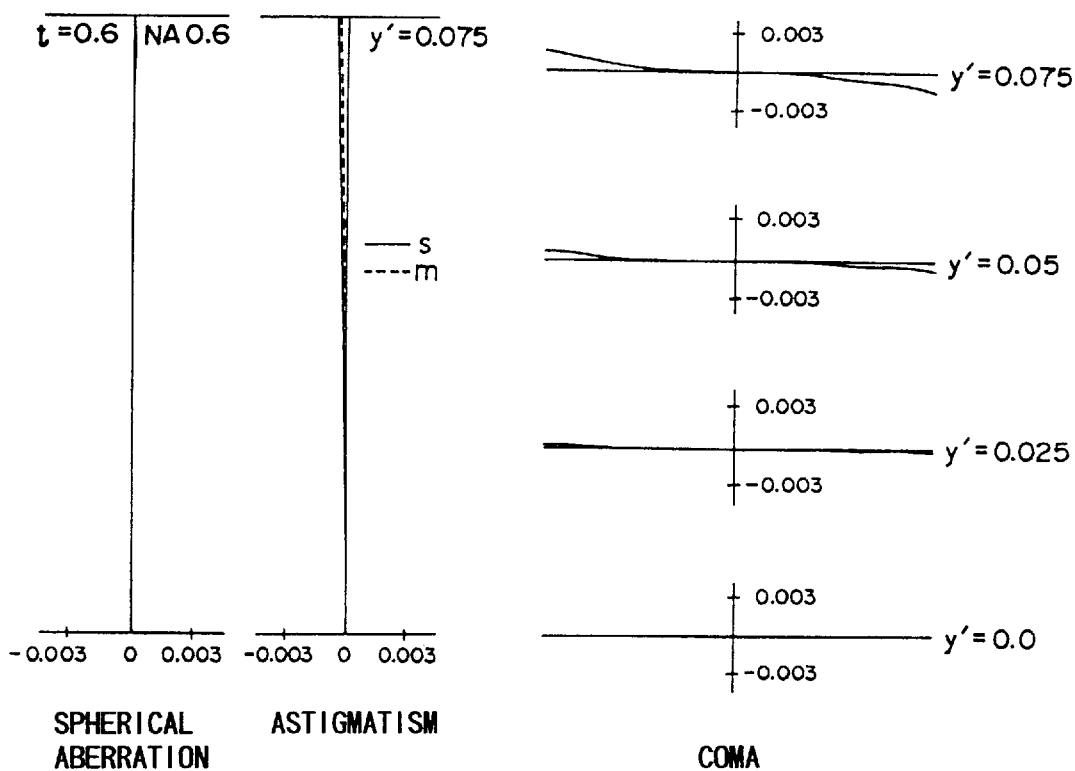
FIG. 36 shows aberration curves in the embodiment 15 with a disk thickness of 0.6 mm to the objective lens.
Figure 38B:
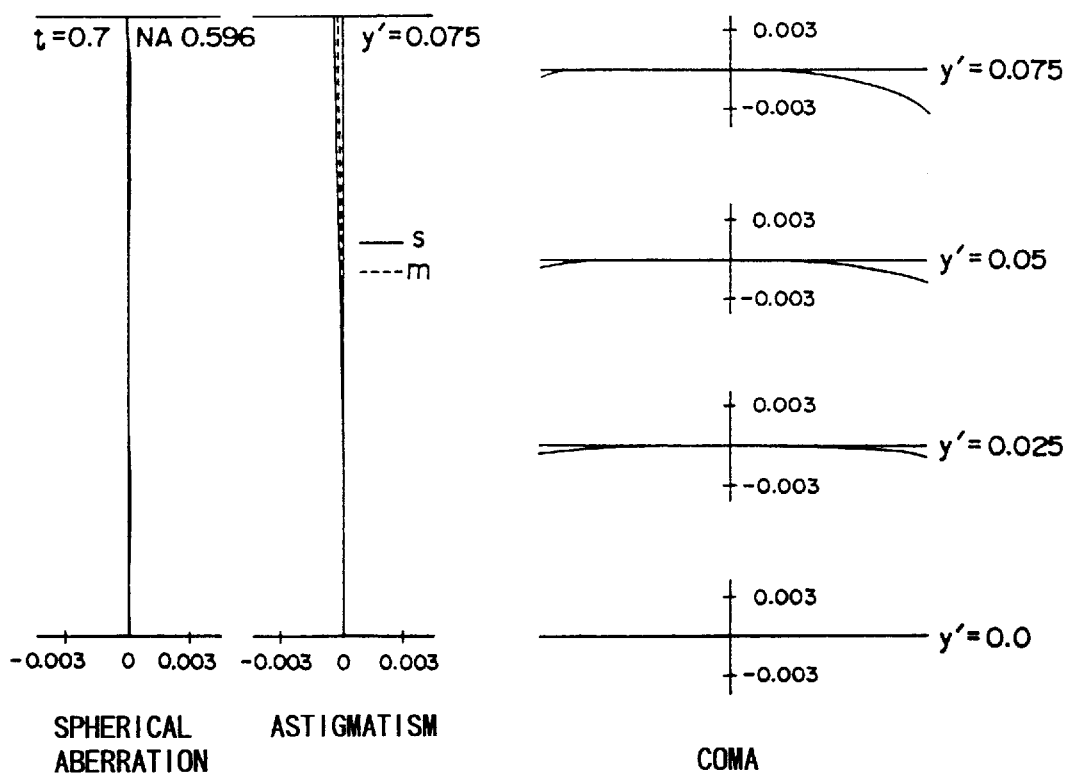

The objective lens in the embodiment 15 is intended to improve aberration to divergent light rays ($L_{IM}=-300$) from an object at a distance of 300 m from the first surface of the objective lens at the reference disk thickness of 0.6 mm. FIG. 36 shows aberration curves, and FIGS. 37A, 37B and 38A, 38B show aberration curves of the entire system.

Figure 39:
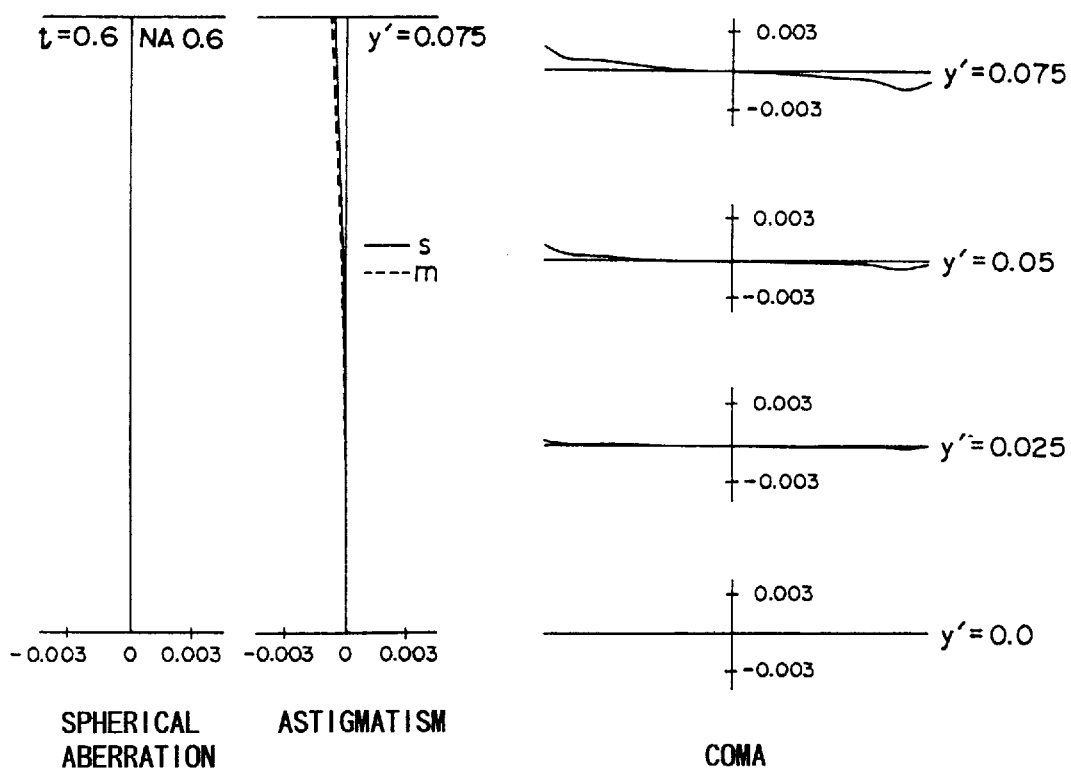
FIG. 39 shows aberration curves in the embodiment 16 with a disk thickness of 0.6 mm to the objective lens.
Figure 45A:
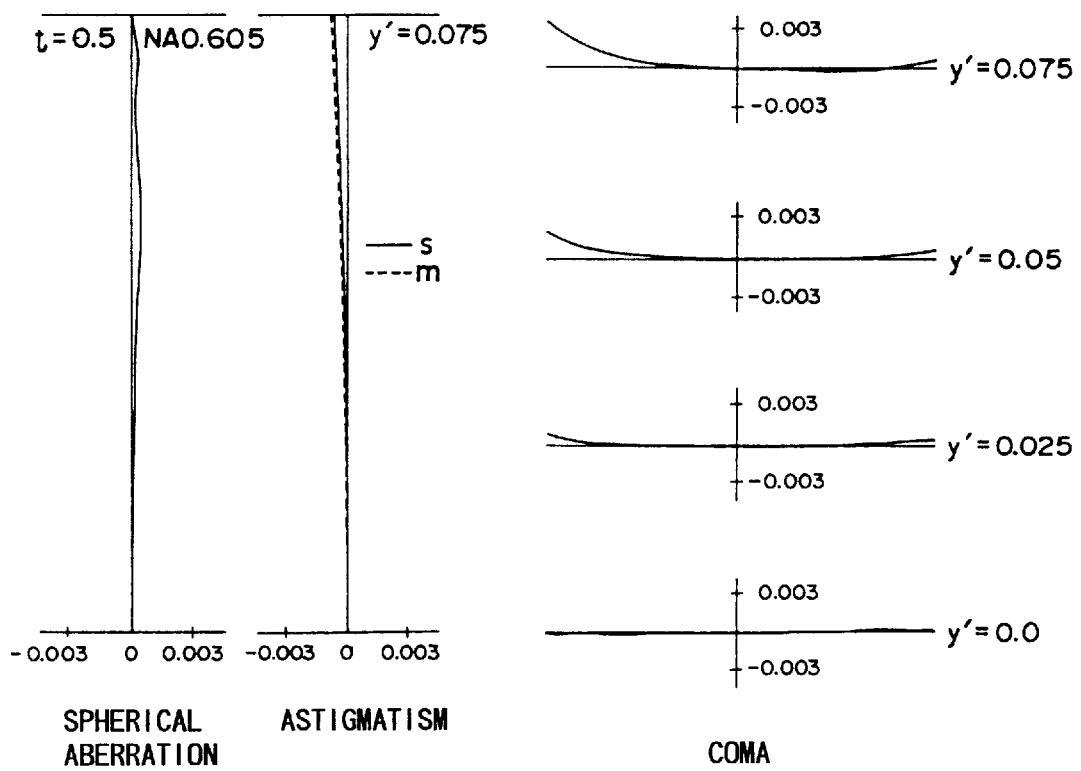
Figure 47A:
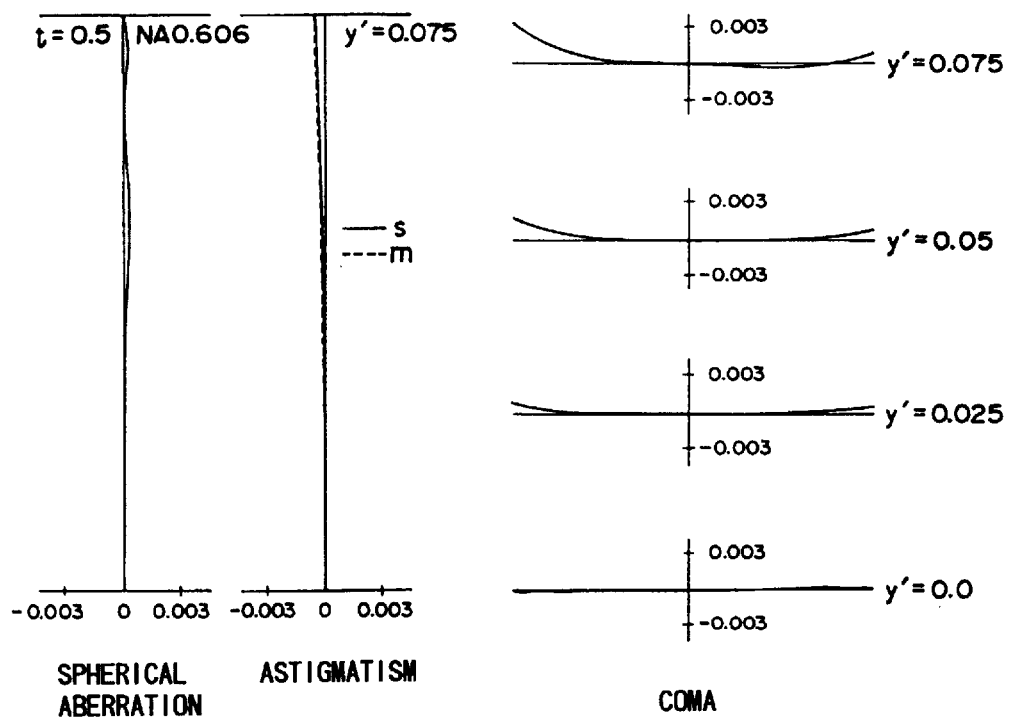
Figure 49A:
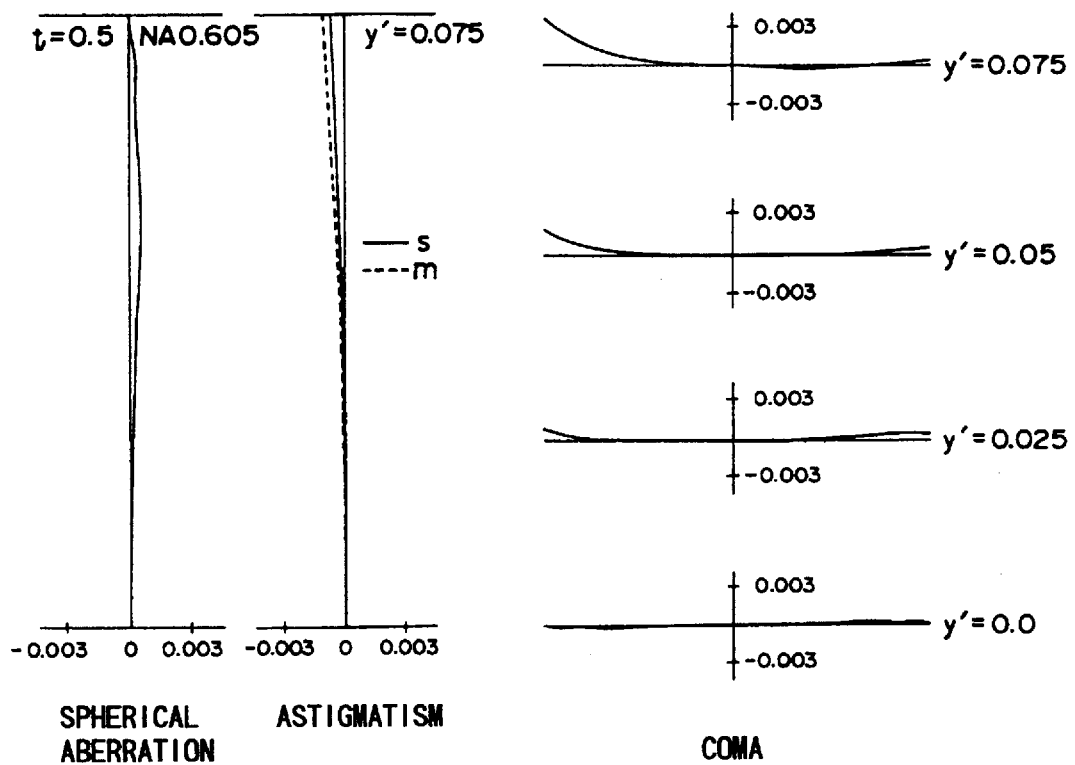
FIG. 49A and 49B show aberration curves in the embodiment 19 with a disk thickness of 0.5 mm in FIG. 49A and a disk thickness of 0.7 mm in FIG. 49B.
Figure 49B:
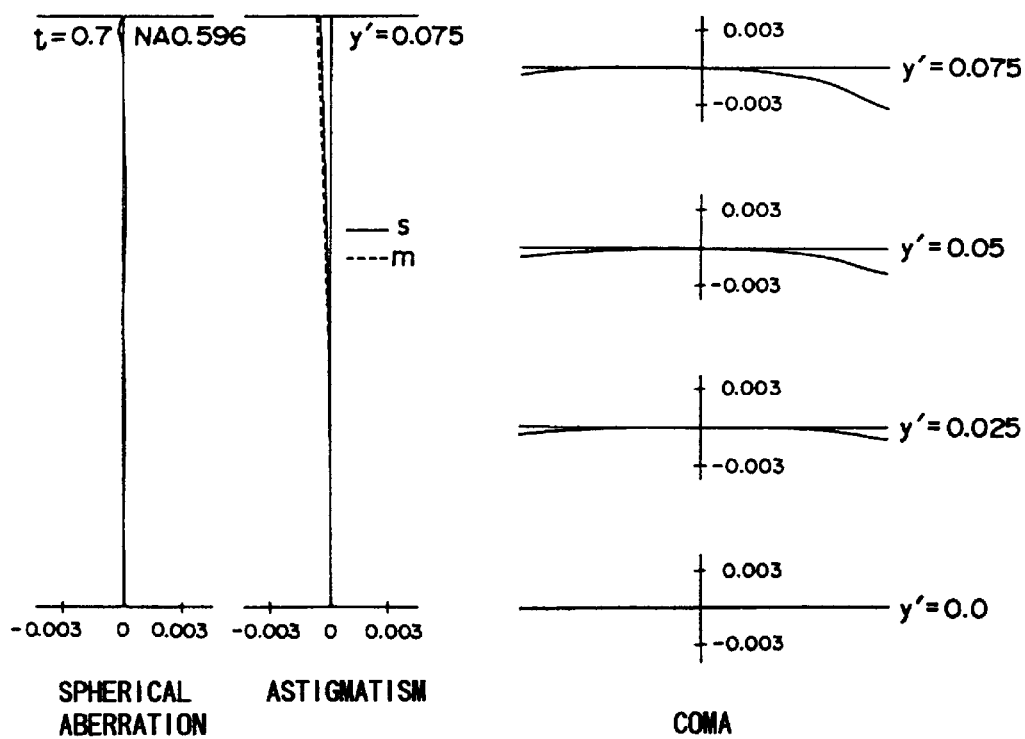
Figure 50B:
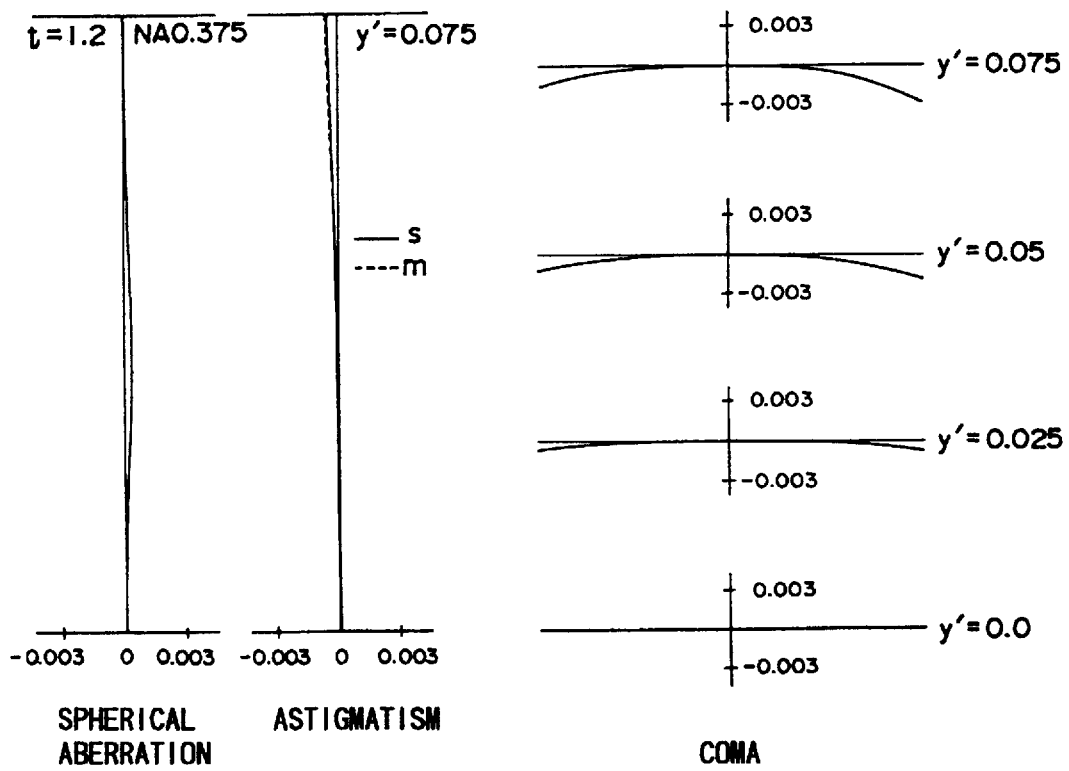

The objective lens in the embodiment 16 is intended to improve aberration to convergent light rays (super infinity light rays) ($L_{IM}=300$) that travel to an object on the image side at distance of 300 mm from the first surface of the objective lens at the reference disk thickness of 0.6 mm. FIG. 39 shows aberration curves, and FIGS. 40A, 40B and 41A, 41B show aberration curves of the entire system.

As can be seen from these figures, all these embodiments maintain excellent performance with the disk thickness changed.

As described above, although the objective lens system of variable disk thickness feature of the present invention is of a quite simple construction with less lens count, the objective lens system complies with a continuous variation in thickness of the disk in the course of recording and reproducing information on a high-density and mass storage optical information medium while providing excellent performance. The present invention may be considered as a zoom objective optical system capable of complying with the variation in the thickness of the disk, in which the correction lens system composed of the first negative and second positive lens element functions as a zoom converter. The present invention is free from performance drop even with the first negative lens element or the second positive lens element decentered.

The degree of freedom is large in the selection of NA of the collimator provided on the light source side. Thus, a sufficient light quantity is assured, a great deal of design flexibility is allowed, and light quantity drop due to diffraction is prevented.

Tables 17 through 23 list test data obtained in the embodiments 17 through 23, respectively, of the objective lens system of variable disk thickness feature in the third type of the present invention. The following symbols are used in the tables.

| | |
|---|---|
| $r_i$ | Radii of curvature of spherical surfaces or vertex radii of curvature of aspheric surfaces arranged in sequence on the optical axis |
| $d_i$ | Thicknesses of lenses or air gaps in sequence on the optical axis |
| $n_i$ | Refractive indices of lens materials in sequence at a wavelength of 650 nm |
| t | Thickness of a disk on the optical axis |
| $n_b$ | Refractive index of the disk material at a wavelength of 650 nm |
| WD | Working distance |
| f | Focal length of the entire system |
| $f_{C1}$ | Focal length of the first positive lens element |
| $f_{c2}$ | Focal length of the second negative lens element |
| $f_M$ | Focal length of the objective lens |
| NA | NA of the entire system |
| $NA_M$ | NA of the objective lens |
| $L_{IM}$ | Object distance used in the design of the objective lens (t = 0.6 mm) (negative when the objective lens receives divergent light rays from an object at a finite distance) |

The configuration of the aspheric surface is expressed as follows:

$$X = \frac{Ch^2}{1 + \sqrt{1 - (1+K)C^2h^2}} + \sum_{i=2}^{9} A_{2i} h^{2i}$$

where x Distance of one point on the aspheric surface to the tangential surface touching at the vertex point of the lens h Height from the optical axis C Curvature of the vertex point of the aspheric surface (C=1/r)

K Conic constant $A_{2i}$ Aspheric coefficient

In this case, the effective aperture of the objective lens at a disk thickness of t=0.6 mm is used as the one for disk thicknesses of t=0.5 mm and 0.7 mm, but at a disk thickness of t=1.2 mm, the effective aperture is calculated based on the diaphragm.

TABLE 17

Embodiment 17

| $f_{c1} = 27.0$ | $f_{c2} = -19.0$ | $f_M = 4.5$ | $NA_M = 0.6$ | $L_{1M} = \infty$ |
|---|---|---|---|---|
| $r_1 = 24.0$ | | $d_1 = 2.0$ | | $n_1 = 1.82793$ |
| $r_2 = -313.659$ | | $d_2$ = variable | | |
| $r_3 = -50.0$ | | $d_3 = 1.5$ | | $n_2 = 1.82793$ |
| $r_4 = 23.263$ | | $d_4 = 5.0$ | | |
| $r_5 = 2.75$ | | $d_5 = 3.4$ | | $n_3 = 1.49936$ |
| $r_6 = -7.228$ | | WD = variable | | |
| $r_7 = \infty$ | | t = variable | | $n_b = 1.57747$ |
| $r_8 = \infty$ | | | | |

| t | 0.5 | 0.6 | 0.7 | 1.2 |
|---|---|---|---|---|
| $d_2$ | 7.32 | 6.36 | 5.48 | 1.36 |
| f | 6.736 | 6.371 | 6.069 | 4.968 |
| NA | 0.605 | 0.6 | 0.596 | 0.375 |
| WD | 2.277 | 2.270 | 2.254 | 2.107 |

Aspherical Surface Coefficient

| | $r_5$ | $r_6$ |
|---|---|---|
| K | $-7.59018 \times 10^{-1}$ | $-2.89545 \times 10$ |
| $A_4$ | $1.31123 \times 10^{-3}$ | $5.04544 \times 10^{-4}$ |
| $A_6$ | $2.39974 \times 10^{-5}$ | $1.34683 \times 10^{-6}$ |
| $A_8$ | $-6.00326 \times 10^{-7}$ | $-1.10963 \times 10^{-5}$ |
| $A_{10}$ | $1.49845 \times 10^{-9}$ | $-2.16471 \times 10^{-6}$ |
| $A_{12}$ | $1.19194 \times 10^{-9}$ | $-2.39574 \times 10^{-7}$ |
| $A_{14}$ | $-8.33804 \times 10^{-10}$ | $4.79899 \times 10^{-9}$ |
| $A_{16}$ | $-3.63570 \times 10^{-10}$ | $9.88653 \times 10^{-9}$ |
| $A_{18}$ | $-9.18546 \times 10^{-11}$ | $-5.23731 \times 10^{-10}$ | diaphragm 2.0 from the front of the objective lens
$1/r_1 + 1/r_2 = 0.038$
$1/f_{c2} = -0.053$  $1/r_3 = -0.020$
$-f_{c2}/f_M = 4.222$

TABLE 18

Embodiment 18

| $f_{c1} = 27.0$ | $f_{c2} = -18.8$ | $f_M = 4.5$ | $NA_M = 0.6$ | $L_{1M} = \infty$ |
|---|---|---|---|---|
| $r_1 = 20.0$ | | $d_1 = 2.0$ | | $n_1 = 1.82793$ |
| $r_2 = 181.314$ | | $d_2$ = variable | | |
| $r_3 = -76.0$ | | $d_3 = 1.5$ | | $n_2 = 1.82793$ |
| $r_4 = 19.749$ | | $d_4 = 5.0$ | | |
| $r_5 = 2.75$ | | $d_5 = 3.4$ | | $n_3 = 1.49936$ |
| $r_6 = -7.228$ | | WD = variable | | |
| $r_7 = \infty$ | | t = variable | | $n_b = 1.57747$ |
| $r_8 = \infty$ | | | | |

| t | 0.5 | 0.6 | 0.7 | 1.2 |
|---|---|---|---|---|
| $d_2$ | 7.4 | 6.41 | 5.51 | 1.41 |
| f | 6.883 | 6.492 | 6.174 | 5.046 |
| NA | 0.606 | 0.6 | 0.595 | 0.375 |
| WD | 2.265 | 2.262 | 2.248 | 2.106 |

TABLE 18-continued

Embodiment 18

Aspherical Surface Coefficient

|   | $r_5$ | $r_6$ |
|---|---|---|
| K | $-7.59018 \times 10^{-1}$ | $-2.89545 \times 10$ |
| $A_4$ | $1.31123 \times 10^{-3}$ | $5.04544 \times 10^{-4}$ |
| $A_6$ | $2.39974 \times 10^{-5}$ | $1.34683 \times 10^{-6}$ |
| $A_8$ | $-6.00326 \times 10^{-7}$ | $-1.10963 \times 10^{-5}$ |
| $A_{10}$ | $1.49845 \times 10^{-9}$ | $-2.16471 \times 10^{-6}$ |
| $A_{12}$ | $1.19194 \times 10^{-9}$ | $-2.39574 \times 10^{-7}$ |
| $A_{14}$ | $-8.33804 \times 10^{-10}$ | $4.79899 \times 10^{-9}$ |
| $A_{16}$ | $-3.63570 \times 10^{-10}$ | $9.88653 \times 10^{-9}$ |
| $A_{18}$ | $-9.18546 \times 10^{-11}$ | $-5.23731 \times 10^{-10}$ | diaphragm  2.0 from the front of the objective lens
$1/r_1 + 1/r_2 = 0.056$
$1/f_{c2} = -0.053$   $1/r_3 = -0.013$
$-f_{c2}/f_M = 4.178$

TABLE 19

Embodiment 19

$f_{c1} = 30.0$   $f_{c2} = -21.1$   $f_M = 4.5$   $NA_M = 0.6$   $L_{1M} = \infty$

| $r_1 = 40.0$ | $d_1 = 2.0$ | $n_1 = 1.82793$ |
|---|---|---|
| $r_2 = -64.042$ | $d_2$ = variable | |
| $r_3 = -26.5$ | $d_3 = 1.5$ | $n_2 = 1.82793$ |
| $r_4 = 52.577$ | $d_4 = 5.0$ | |
| $r_5 = 2.75$ | $d_5 = 3.4$ | $n_3 = 1.49936$ |
| $r_6 = -7.228$ | WD = variable | |
| $r_7 = \infty$ | t = variable | $n_b = 1.57747$ |
| $r_8 = \infty$ | | |

| t | 0.5 | 0.6 | 0.7 | 1.2 |
|---|---|---|---|---|
| $d_2$ | 8.73 | 7.58 | 6.51 | 1.33 |
| f | 6.666 | 6.279 | 5.958 | 4.776 |
| NA | 0.605 | 0.6 | 0.596 | 0.375 |
| WD | 2.293 | 2.283 | 2.264 | 2.111 |

Aspherical Surface Coefficient

|   | $r_5$ | $r_6$ |
|---|---|---|
| K | $-7.59018 \times 10^{-1}$ | $-2.89545 \times 10$ |
| $A_4$ | $1.31123 \times 10^{-3}$ | $5.04544 \times 10^{-4}$ |
| $A_6$ | $2.39974 \times 10^{-5}$ | $1.34683 \times 10^{-6}$ |
| $A_8$ | $-6.00326 \times 10^{-7}$ | $-1.10963 \times 10^{-5}$ |
| $A_{10}$ | $1.49845 \times 10^{-9}$ | $-2.16471 \times 10^{-6}$ |
| $A_{12}$ | $1.19194 \times 10^{-9}$ | $-2.39574 \times 10^{-7}$ |
| $A_{14}$ | $-8.33804 \times 10^{-10}$ | $4.79899 \times 10^{-9}$ |
| $A_{16}$ | $-3.63570 \times 10^{-10}$ | $9.88653 \times 10^{-9}$ |
| $A_{18}$ | $-9.18546 \times 10^{-11}$ | $-5.23731 \times 10^{-10}$ | diaphragm  2.0 from the front of the objective lens
$1/r_1 + 1/r_2 = 0.009$
$1/f_{c2} = -0.047$   $1/r_3 = -0.038$
$-f_{c2}/f_M = 4.689$

TABLE 20

Embodiment 20

$f_{c1} = 25.0$   $f_{c2} = -17.8$   $f_M = 4.5$   $NA_M = 0.6$   $L_{1M} = \infty$

| $r_1 = 26.0$ | $d_1 = 2.0$ | $n_1 = 1.82793$ |
|---|---|---|
| $r_2 = -97.969$ | $d_2$ = variable | |
| $r_3 = -35.0$ | $d_3 = 1.5$ | $n_2 = 1.82793$ |
| $r_4 = 25.95$ | $d_4 = 5.0$ | |
| $r_5 = 2.75$ | $d_5 = 3.4$ | $n_3 = 1.49936$ |

TABLE 20-continued

Embodiment 20

| $r_6 = -7.228$ | WD = variable | |
|---|---|---|
| $r_7 = \infty$ | t = variable | $n_b = 1.57747$ |
| $r_8 = \infty$ | | |

| t | 0.5 | 0.6 | 0.7 | 1.2 |
|---|---|---|---|---|
| $d_2$ | 6.59 | 5.71 | 4.93 | 1.32 |
| f | 6.614 | 6.262 | 5.979 | 4.947 |
| NA | 0.606 | 0.6 | 0.596 | 0.375 |
| WD | 2.281 | 2.276 | 2.260 | 2.114 |

Aspherical Surface Coefficient

|   | $r_5$ | $r_6$ |
|---|---|---|
| K | $-7.59018 \times 10^{-1}$ | $-2.89545 \times 10$ |
| $A_4$ | $1.31123 \times 10^{-3}$ | $5.04544 \times 10^{-4}$ |
| $A_6$ | $2.39974 \times 10^{-5}$ | $1.34683 \times 10^{-6}$ |
| $A_8$ | $-6.00326 \times 10^{-7}$ | $-1.10963 \times 10^{-5}$ |
| $A_{10}$ | $1.49845 \times 10^{-9}$ | $-2.16471 \times 10^{-6}$ |
| $A_{12}$ | $1.19194 \times 10^{-9}$ | $-2.39574 \times 10^{-7}$ |
| $A_{14}$ | $-8.33804 \times 10^{-10}$ | $4.79899 \times 10^{-9}$ |
| $A_{16}$ | $-3.63570 \times 10^{-10}$ | $9.88653 \times 10^{-9}$ |
| $A_{18}$ | $-9.18546 \times 10^{-11}$ | $-5.23731 \times 10^{-10}$ | diaphragm  2.0 from the front of the objective lens
$1/r_1 + 1/r_2 = 0.028$
$1/f_{c2} = -0.056$   $1/r_3 = -0.029$
$-f_{c2}/f_M = 3.956$

TABLE 21

Embodiment 21

$f_{c1} = 22.5$   $f_{c2} = -15.9$   $f_M = 4.5$   $NA_M = 0.6$   $L_{1M} = \infty$

| $r_1 = 20.5$ | $d_1 = 2.0$ | $n_1 = 1.82793$ |
|---|---|---|
| $r_2 = -195.027$ | $d_2$ = variable | |
| $r_3 = -41.0$ | $d_3 = 1.5$ | $n_2 = 1.82793$ |
| $r_4 = 19.711$ | $d_4 = 5.0$ | |
| $r_5 = 2.75$ | $d_5 = 3.4$ | $n_3 = 1.49936$ |
| $r_6 = -7.228$ | WD = variable | |
| $r_7 = \infty$ | t = variable | $n_b = 1.57747$ |
| $r_8 = \infty$ | | |

| t | 0.5 | 0.6 | 0.7 | 1.2 |
|---|---|---|---|---|
| $d_2$ | 5.70 | 4.95 | 4.3 | 1.41 |
| f | 6.662 | 6.321 | 6.053 | 5.092 |
| NA | 0.606 | 0.6 | 0.596 | 0.375 |
| WD | 2.276 | 2.275 | 2.261 | 2.120 |

Aspherical Surface Coefficient

|   | $r_5$ | $r_6$ |
|---|---|---|
| K | $-7.59018 \times 10^{-1}$ | $-2.89545 \times 10$ |
| $A_4$ | $1.31123 \times 10^{-3}$ | $5.04544 \times 10^{-4}$ |
| $A_6$ | $2.39974 \times 10^{-5}$ | $1.34683 \times 10^{-6}$ |
| $A_8$ | $-6.00326 \times 10^{-7}$ | $-1.10963 \times 10^{-5}$ |
| $A_{10}$ | $1.49845 \times 10^{-9}$ | $-2.16471 \times 10^{-6}$ |
| $A_{12}$ | $1.19194 \times 10^{-9}$ | $-2.39574 \times 10^{-7}$ |
| $A_{14}$ | $-8.33804 \times 10^{-10}$ | $4.79899 \times 10^{-9}$ |
| $A_{16}$ | $-3.63570 \times 10^{-10}$ | $9.88653 \times 10^{-9}$ |
| $A_{18}$ | $-9.18546 \times 10^{-11}$ | $-5.23731 \times 10^{-10}$ | diaphragm  2.0 from the front of the objective lens
$1/r_1 + 1/r_2 = 0.044$
$1/f_{c2} = -0.063$   $1/r_3 = -0.024$
$-f_{c2}/f_M = 3.533$

TABLE 22

Embodiment 22

$f_{c1} = 26.0$   $f_{c2} = -16.8$   $f_M = 4.3$   $NA_M = 0.6$   $L_{1M} = -300$

| | | |
|---|---|---|
| $r_1 = 22.0$ | $d_1 = 2.0$ | $n_1 = 1.82793$ |
| $r_2 = -958.33$ | $d_2$ = variable | |
| $r_3 = -60.0$ | $d_3 = 1.5$ | $n_2 = 1.82793$ |
| $r_4 = 18.312$ | $d_4 = 5.0$ | |
| $r_5 = 2.7$ | $d_5 = 3.7$ | $n_3 = 1.49936$ |
| $r_6 = -5.702$ | WD = variable | |
| $r_7 = \infty$ | t = variable | $n_b = 1.57747$ |
| $r_8 = \infty$ | | |

| | | | | |
|---|---|---|---|---|
| t | 0.5 | 0.6 | 0.7 | 1.2 |
| $d_2$ | 7.42 | 6.45 | 5.56 | 1.11 |
| f | 6.617 | 6.221 | 5.898 | 4.680 |
| NA | 0.606 | 0.6 | 0.595 | 0.375 |
| WD | 2.026 | 2.022 | 2.007 | 1.871 |

Aspherical Surface Coefficient

| | $r_5$ | $r_6$ |
|---|---|---|
| K | $-7.98962 \times 10^{-1}$ | $-2.19588 \times 10$ |
| $A_4$ | $1.49179 \times 10^{-3}$ | $3.20305 \times 10^{-4}$ |
| $A_6$ | $1.91505 \times 10^{-5}$ | $-1.75942 \times 10^{-5}$ |
| $A_8$ | $-1.69235 \times 10^{-6}$ | $-1.73427 \times 10^{-5}$ |
| $A_{10}$ | $-5.72618 \times 10^{-8}$ | $-3.39889 \times 10^{-6}$ |
| $A_{12}$ | $-3.85959 \times 10^{-9}$ | $-3.79829 \times 10^{-7}$ |
| $A_{14}$ | $-1.41481 \times 10^{-9}$ | $2.69263 \times 10^{-8}$ |
| $A_{16}$ | $-4.57411 \times 10^{-10}$ | $1.33962 \times 10^{-8}$ |
| $A_{18}$ | $-1.12038 \times 10^{-10}$ | $7.53364 \times 10^{-11}$ | diaphragm   2.0 from the front of the objective lens
$1/r_1 + 1/r_2 = 0.044$
$1/f_{c2} = -0.060$   $1/r_3 = -0.017$
$-f_{c2}/f_M = 3.907$

TABLE 23

Embodiment 23

$f_{c1} = 25.0$   $f_{c2} = -19.0$   $f_M = 4.5$   $NA_M = 0.6$   $L_{1M} = 300$

| | | |
|---|---|---|
| $r_1 = 27.0$ | $d_1 = 2.0$ | $n_1 = 1.82793$ |
| $r_2 = -85.707$ | $d_2$ = variable | |
| $r_3 = -32.5$ | $d_3 = 1.5$ | $n_2 = 1.82793$ |
| $r_4 = 31.124$ | $d_4 = 5.0$ | |
| $r_5 = 2.8$ | $d_5 = 3.3$ | $n_3 = 1.49936$ |
| $r_6 = -6.913$ | WD = variable | |
| $r_7 = \infty$ | t = variable | $n_b = 1.57747$ |
| $r_8 = \infty$ | | |

| | | | | |
|---|---|---|---|---|
| t | 0.5 | 0.6 | 0.7 | 1.2 |
| $d_2$ | 6.59 | 5.71 | 4.92 | 1.37 |
| f | 6.618 | 6.266 | 5.980 | 4.964 |
| NA | 0.606 | 0.6 | 0.596 | 0.375 |
| WD | 2.301 | 2.296 | 2.280 | 2.132 |

Aspherical Surface Coefficient

| | $r_5$ | $r_6$ |
|---|---|---|
| K | $-1.08974$ | $-2.35194 \times 10$ |
| $A_4$ | $2.88628 \times 10^{-3}$ | $-6.16199 \times 10^{-4}$ |
| $A_6$ | $3.16847 \times 10^{-6}$ | $-1.32179 \times 10^{-4}$ |
| $A_8$ | $-6.03541 \times 10^{-6}$ | $-2.76214 \times 10^{-5}$ |
| $A_{10}$ | $-5.03967 \times 10^{-7}$ | $-2.33274 \times 10^{-6}$ |
| $A_{12}$ | $-6.87062 \times 10^{-8}$ | $-1.20936 \times 10^{-7}$ |
| $A_{14}$ | $-6.17509 \times 10^{-9}$ | $4.53476 \times 10^{-8}$ |
| $A_{16}$ | $-8.18994 \times 10^{-10}$ | $1.49463 \times 10^{-8}$ |
| $A_{18}$ | $-2.01841 \times 10^{-10}$ | $-1.93636 \times 10^{-9}$ | diaphragm   2.0 from the front of the objective lens
$1/r_1 + 1/r_2 = 0.025$
$1/f_{c2} = -0.053$   $1/r_3 = -0.031$
$-f_{c2}/f_M = 4.222$ The objective lens, common to embodiments 17 through 21, is intended to improve aberration to an object at infinity ($L_{IM}=\infty$) at a reference disk thickness of 0.6 mm. FIG. 43 shows resulting aberration curves.

Aberration curves resulting from the embodiment 17 are shown in FIGS. 44A, 44B and 45A, 45B, those from the embodiment 18 in FIGS. 46A, 46B and 47A, 47B, those from the embodiment 19 in FIGS. 48A, 48B and 49A, 49B, those from the embodiment 20 in FIGS. 50A, 50B and 51A, 51B, and those from the embodiment 21 in FIGS. 52A, 52B and 53A, 53B.

Figure 54:
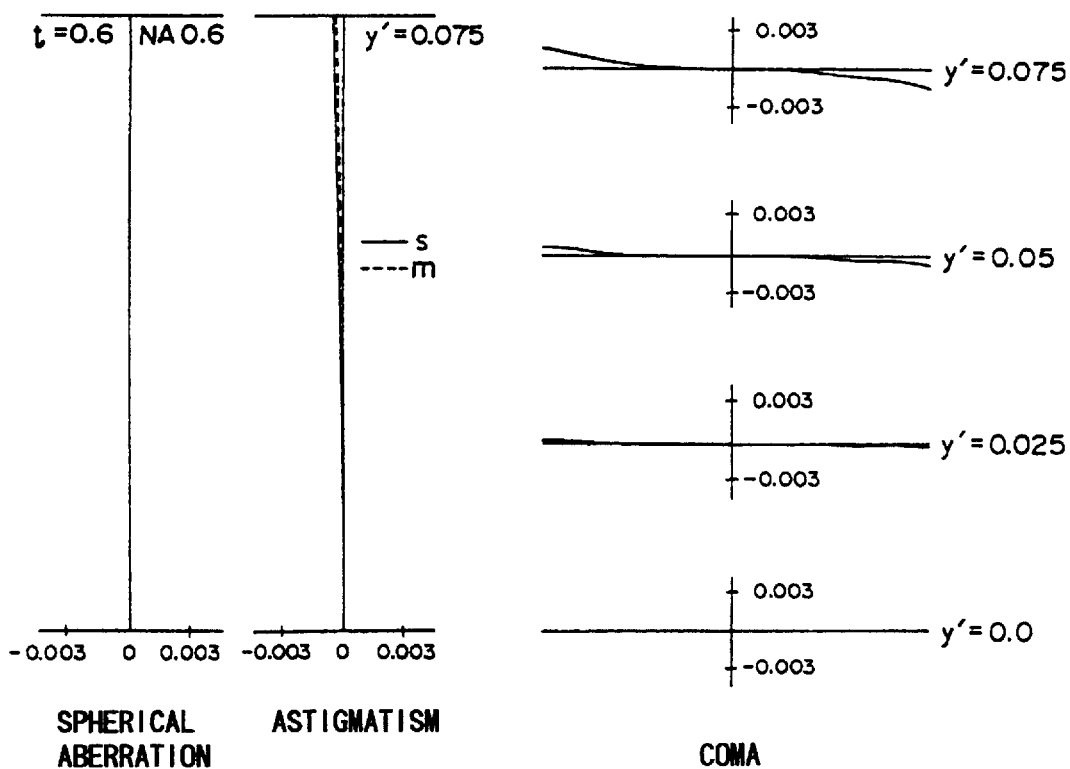
FIG. 54 shows aberration curves in the embodiment 22 with a disk thickness of 0.6 mm to the objective lens.
Figure 58A:
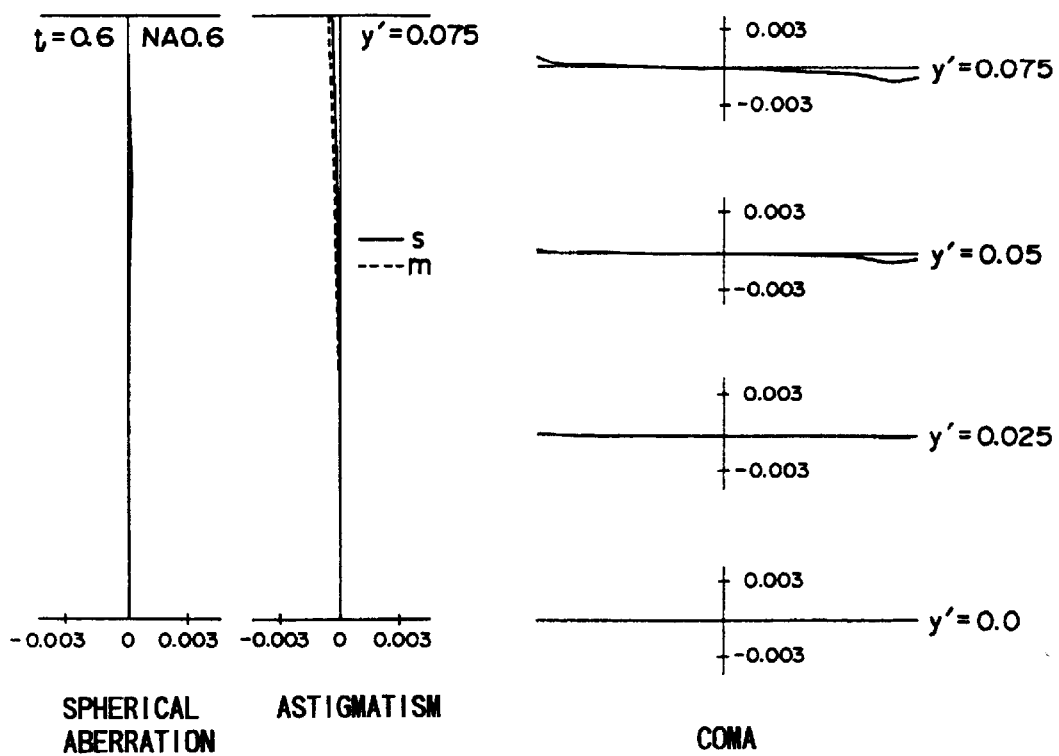
Figure 59A:
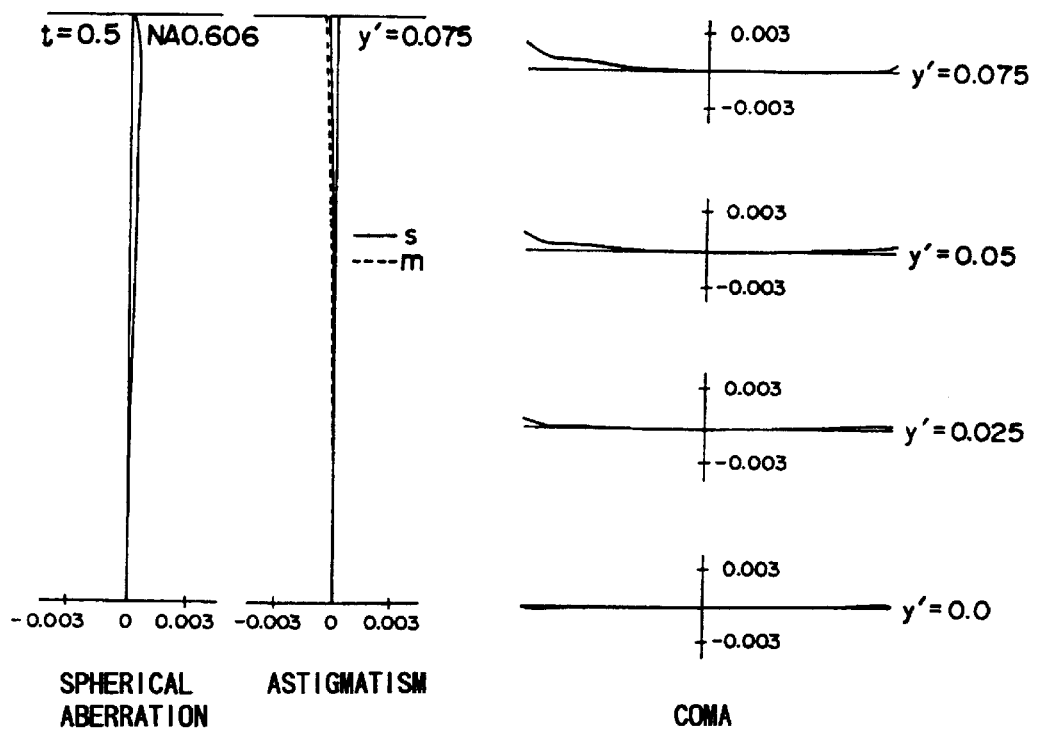

The objective lens in the embodiment 22 is intended to improve aberration to divergent light rays ($L_{IM}=-300$) from an object at a distance of 300 mm before the first surface of the objective lens at the reference disk thickness of 0.6 mm. FIG. 54 shows aberration curves, and FIGS. 55A, 55B and 56A, 57B show aberration curves of the entire system.

The objective lens in the embodiment 23 is intended to improve aberration to convergent light rays (super infinity light rays) ($L_{IM}=300$) that travel to an object on the image side at distance of 300 mm from the first surface of the objective lens at the reference disk thickness of 0.6 mm. FIG. 57 shows aberration curves, and FIGS. 58A, 58B and 59A, 59B show aberration curves of the entire system.

As can be seen from these figures, all these embodiments maintain excellent performance with the disk thickness changed.

As described above, although the objective lens system of variable disk thickness feature of the present invention is of a quite simple construction with fewer lenses, count the objective lens system complies with a continuous variation in thickness of the disk in the course of recording and reproducing information on a high-density and mass storage optical information medium while providing excellent performance. The present invention may be considered as a zoom objective optical system capable of complying with the variation in the thickness of the disk, in which the correction lens system composed of the first positive and second negative lens element functions as a zoom converter. The present invention is free from performance drop even with the first positive lens element or the second negative lens element decentered.

The degree of freedom is large in the selection of NA of the collimator provided on the light source side. Thus, a sufficient light quantity is assured, a great deal of design flexibility is allowed, and light quantity drop due to diffraction is prevented.

What is claimed is:

1. An optical objective lens system with a variable disk thickness feature comprising a correction lens system having one or more lens elements, a positive objective lens and a disk arranged in that order from the side of a light source, in which one or more lens elements of the correction lens system are moved on an optical axis to improve an aberration that has increased as a result of a variation in thickness of the disk and the objective lens is moved by a slight distance on the optical axis to be in-focus state in response to the movement of the image point resulting from the variation in the thickness of the disk, whereby the objective lens improves the aberration with a combination of a reference disk thickness and a reference object distance, in which the object distance $L_{IM}$ with respect to the objective lens is based on infinity light rays ($L_{IM}=\infty$) that are parallel light rays, finite light rays ($L_{IM}<0$) that are divergent light rays, or convergent light rays ($L_{IM}>0$), wherein the correction lens system comprising a single positive lens element to divergent light rays coming from the light source, whereby the single positive lens element is moved toward the light source when the thickness of the disk increases, while the single positive lens element is moved toward an image point when the thickness of the disk decreases, and wherein the following relationships are required, $$f_C > 5 f_M \qquad \qquad 1$$

$$r_2 < 0 \qquad \qquad 2$$

where $f_C$ represents the focal length of the single positive lens element, $f_M$ represents the focal length of the objective lens, and $r_2$ represents the radius of curvature of the single positive lens element on the image side.

2. An optical objective lens system with a variable disk thickness feature comprising a correction lens system having one or more lens elements, a positive objective lens and a disk arranged in that order from the side of a light source, in which one or more lens elements of the correction lens system are moved on an optical axis to improve an aberration that has increased as a result of a variation in thickness of the disk and the objective lens is moved by a slight distance on the optical axis to be in-focus state in response to the movement of the image point resulting from the variation in the thickness of the disk, whereby the objective lens improves the aberration with a combination of a reference disk thickness and a reference object distance, in which the object distance $L_{IM}$ with respect to the objective lens is based on infinity light rays ($L_{IM}=\infty$) that are parallel light rays, finite light rays ($L_{IM}<0$) that are divergent light rays, or convergent light rays ($L_{IM}>0$), wherein the correction lens system comprising two positive lens elements to divergent light rays coming from the light source, whereby the two positive lens elements are moved toward the light source when the thickness of the disk increases, while the two positive lens elements are moved toward an image point when the thickness of the disk decreases, and wherein the correction lens system comprises two positive lens elements, whereby the following relationships are required, $$f_{CT} > 4 f_M \qquad \qquad 3$$

$$r_2 < 0, r_4 < 0 \qquad \qquad 4$$

where $f_{CT}$ represents the focal length of the compound lens of the two lens elements, $r_1$, $r_2$, $r_3$, and $r_4$ represent radii of curvature of the spherical surfaces of the compound lens in that order from the light source, and $f_M$ represents the focal length of the objective lens.

3. An optical objective lens system with a variable disk thickness feature comprising a correction lens system having one or more lens elements, a positive objective lens and a disk arranged in that order from the side of a light source, in which one or more lens elements of the correction lens system are moved on an optical axis to improve an aberration that has increased as a result of a variation in thickness of the disk and the objective lens is moved by a slight distance on the optical axis to be in-focus state in response to the movement of the image point resulting from the variation in the thickness of the disk, whereby the objective lens improves the aberration with a combination of a reference disk thickness and a reference object distance, in which the object distance $L_{IM}$ with respect to the objective lens is based on infinity light rays ($L_{IM}=\infty$) that are parallel light rays, finite light rays ($L_{IM}<0$) that are divergent light rays, or convergent light rays ($L_{IM}>0$), wherein the collection lens system comprises a first negative lens element and a second positive lens element to parallel light rays coming in from a collimator, and the aberration is improved by moving the first negative lens element and/or the second positive lens element on the optical axis, thus by modifying the distance on the optical axis between the first negative lens element and the second positive lens element and the objective lens is moved by a slight distance on the optical axis to be in-focus state in response to the movement of the image point resulting from the variation in the thickness of the disk, and wherein the following relationships are required, $$-f_{C1} < f_{C2} \qquad \qquad 5$$

$$r_1 < 0 \qquad \qquad 6$$

$$1.3 \, r_2 \leq |r_3| \qquad \qquad 7$$

$$2 f_M < -f_{C1} \qquad \qquad 8$$

where $f_{C1}$ is the focal length of the first negative lens element, $f_{C2}$ is the focal length of the second positive lens element, $f_M$ is the focal length of the objective lens, and $r_1$, $r_2$, $r_3$, and $r_4$ are radii of curvature of the first negative lens element and the second positive lens element in that order.

4. An optical objective lens system with a variable disk thickness feature comprising a correction lens system having one or more lens elements, a positive objective lens and a disk arranged in that order from the side of a light source, in which one or more lens elements of the correction lens system are moved on an optical axis to improve an aberration that has increased as a result of a variation in thickness of the disk and the objective lens is moved by a slight distance on the optical axis to be in-focus state in response to the movement of the image point resulting from the variation in the thickness of the disk, whereby the objective lens improves the aberration with a combination of a reference disk thickness and a reference object distance, in which the object distance $L_{IM}$ with respect to the objective lens is based on infinity light rays ($L_{IM}=\infty$) that are parallel light rays, finite light rays ($L_{IM}<0$) that are divergent light rays, or convergent light rays ($L_{IM}>0$), wherein the collection lens system comprises a first positive lens element and a second negative lens element to parallel light rays coming in from a collimator, and the aberration is improved by moving the first positive lens element and/or the second negative lens element on the optical axis, thus by modifying the distance on the optical axis between the first positive lens element and the second negative lens element and the objective lens is moved by a slight distance on the optical axis to be in-focus state in response to the movement of the image point resulting from the variation in the thickness of the disk.

5. An optical objective lens system with a variable disk thickness feature according to claim 4, the distance on the optical axis between the first positive lens element and the second negative lens element is shortened when the thickness of the disk increases, while the distance on the optical axis between the first positive lens element and the second negative lens element, constituting the correction lens system, is lengthened when the thickness of the disk decreased.

6. An optical objective lens system with a variable disk thickness feature according to claim 4, the following relationships are required, $$f_{C1} > -f_{C2} \qquad \qquad 9$$

$$1/r_1 + 1/r_2 > 0 \qquad \qquad 10$$

$$1/f_{C2} < 1/r_3 < 0 \qquad (11)$$

$$3.4 f_M < -f_{C2} \qquad (12)$$

where $f_{C1}$ is the focal length of the first positive lens element, $f_{C2}$ is the focal length of the second negative lens element, $f_M$ is the focal length of the objective lens, and $r_1$, $r_2$, $r_3$, and $r_4$ are radii of curvature of the first positive lens element and the second negative lens element in that order.

* * * * *